US009959694B2

(12) United States Patent  
Lindsay

(10) Patent No.: US 9,959,694 B2  
(45) Date of Patent: *May 1, 2018

(54) SECURITY SYSTEMS FOR PROTECTING AN ASSET

(76) Inventor: Jeffrey Dean Lindsay, Appleton, WI (US)

( * ) Notice: Subject to any disclaimer, the term of this patent is extended or adjusted under 35 U.S.C. 154(b) by 2117 days.

This patent is subject to a terminal disclaimer.

(21) Appl. No.: 12/489,416

(22) Filed: Jun. 22, 2009

(65) Prior Publication Data

US 2009/0259588 A1 Oct. 15, 2009

Related U.S. Application Data

(63) Continuation of application No. 11/739,021, filed on Apr. 23, 2007, now Pat. No. 7,552,467.

(60) Provisional application No. 60/745,461, filed on Apr. 24, 2006, provisional application No. 60/889,540, filed on Feb. 13, 2007.

(51) Int. Cl.
   *G07F 7/10* (2006.01)
   *G06F 21/31* (2013.01)
   *G06Q 20/10* (2012.01)

(52) U.S. Cl.
   CPC .......... *G07F 7/1025* (2013.01); *G06F 21/31* (2013.01); *G06Q 20/102* (2013.01); *G07F 7/1008* (2013.01); *G06F 2221/2113* (2013.01); *G06F 2221/2133* (2013.01); *G06F 2221/2149* (2013.01)

(58) Field of Classification Search
   CPC ..................................................... G07F 7/1025
   USPC ................. 705/58, 64, 76, 43; 726/1–15
   See application file for complete search history.

(56) References Cited

U.S. PATENT DOCUMENTS

| 3,166,625 | A | 1/1965 | Brumley |
| 3,579,186 | A | 5/1971 | Johnson |
| 3,620,590 | A | 11/1971 | Barker |
| 3,676,000 | A | 7/1972 | Mayer, Jr. et al. |
| 3,781,109 | A | 12/1973 | Mayer, Jr. et al. |
| 3,806,704 | A | 4/1974 | Shinal |
| 3,955,178 | A | 5/1976 | Warfel |
| 4,375,032 | A | 2/1983 | Uchida |

(Continued)

OTHER PUBLICATIONS

Kessler, G. "An Overview of Cryptography." Dec. 16, 2004. All pages. Retrieved on May 10, 2010 via Wayback Machine. http://web.archive.org/web/20050203023027/http://www.garykessler.net/library/crypto.html.*

(Continued)

*Primary Examiner* — Calvin Cheung
(74) *Attorney, Agent, or Firm* — Jeffrey Dean Lindsay

(57) ABSTRACT

Security systems for protecting assets are described, including password-based security systems that can provide different levels of access responsive to entry of a primary or secondary password. In some versions, user-configurable security rules can provide customized responses to entry of primary or secondary passwords, including feigned or limited access, security alerts, etc. Passwords comprising overt and covert components can be used to provide enhanced security and improved user control over system response. Improved security systems involving transactions between multiple parties are also considered, with options for user-customized security rules including primary and secondary passwords, and reverse challenge and response methods. Systems for Limited Use Credentials are also disclosed to reduce the risk of identity theft.

21 Claims, 20 Drawing Sheets

(56) References Cited

U.S. PATENT DOCUMENTS

| | | | |
|---|---|---|---|
| 4,532,870 A | 8/1985 | Hayman | |
| 4,675,815 A | 6/1987 | Kuroki | |
| 5,042,067 A | 8/1991 | Moriyama | |
| 5,195,133 A | 3/1993 | Kapp et al. | |
| 5,241,600 A | 8/1993 | Hillis | |
| 5,326,960 A | 7/1994 | Tannenbaum | |
| 5,350,906 A | 9/1994 | Brody | |
| 5,354,974 A | 10/1994 | Eisenberg | |
| 5,478,994 A | 12/1995 | Rahman et al. | |
| 5,627,355 A | 6/1997 | Rahman et al. | |
| 5,647,017 A | 7/1997 | Smithies | |
| 5,680,470 A | 10/1997 | Moussa | |
| 5,731,575 A | 3/1998 | Zingher | |
| 5,778,072 A | 7/1998 | Samar | |
| 5,818,955 A | 10/1998 | Smithies | |
| 5,847,656 A | 12/1998 | Dawson et al. | |
| 6,006,333 A | 12/1999 | Nielsen | |
| 6,021,203 A * | 2/2000 | Douceur et al. | 380/252 |
| 6,064,751 A | 5/2000 | Smithies | |
| 6,091,835 A | 7/2000 | Smithies et al. | |
| 6,182,229 B1 | 1/2001 | Nielsen | |
| 6,250,549 B1 | 6/2001 | DeFabio, Jr. | |
| 6,381,344 B1 | 4/2002 | Smithies | |
| 6,496,111 B1 | 12/2002 | Hosack | |
| 6,609,197 B1 | 8/2003 | Ketcham | |
| 6,679,422 B2 | 1/2004 | Brown et al. | |
| 6,685,087 B2 | 2/2004 | Brown et al. | |
| 6,691,089 B1 | 2/2004 | Su | |
| 6,691,231 B1 | 2/2004 | Lloyd et al. | |
| 6,715,672 B1 | 4/2004 | Tetro | |
| 6,732,277 B1 | 5/2004 | Vandergeest | |
| 6,732,278 B2 * | 5/2004 | Baird et al. | 726/7 |
| RE38,572 E | 8/2004 | Tetro | |
| 6,857,073 B2 | 2/2005 | French | |
| 6,871,288 B2 | 3/2005 | Russikoff | |
| 6,902,116 B2 | 6/2005 | Finkelstein | |
| 6,975,727 B1 | 12/2005 | Vandergeest | |
| 6,996,547 B1 | 2/2006 | Tugenberg et al. | |
| 7,003,991 B2 | 2/2006 | Alizade | |
| 7,039,812 B2 | 5/2006 | Kawan et al. | |
| 7,103,912 B2 | 9/2006 | Xia | |
| 7,117,359 B2 | 10/2006 | Wood et al. | |
| 7,127,088 B1 | 10/2006 | Grajewski | |
| 7,136,835 B1 | 11/2006 | Flitcroft | |
| 7,149,296 B2 | 12/2006 | Brown et al. | |
| 7,149,899 B2 * | 12/2006 | Pinkas et al. | 713/182 |
| 7,152,693 B2 | 12/2006 | Man et al. | |
| 7,155,390 B2 | 12/2006 | Fukada et al. | |
| 7,155,416 B2 | 12/2006 | Shatford | |
| 7,161,468 B2 | 1/2007 | Hwang | |
| 7,165,051 B2 | 1/2007 | Ronning | |
| 7,165,182 B2 | 1/2007 | Excoffier | |
| 7,165,267 B1 | 1/2007 | Utsumi et al. | |
| 7,167,924 B1 | 1/2007 | Symonds et al. | |
| 7,170,391 B2 | 1/2007 | Lane | |
| 7,178,025 B2 | 2/2007 | Scheidt et al. | |
| 7,194,762 B2 | 3/2007 | Challener | |
| 7,200,761 B1 | 4/2007 | Freeman et al. | |
| 7,205,883 B2 | 4/2007 | Bailey | |
| 7,221,258 B2 | 5/2007 | Lane et al. | |
| 7,224,261 B2 | 5/2007 | Shimomura | |
| 7,237,117 B2 | 6/2007 | Weiss | |
| 7,167,553 B2 | 7/2007 | Shaffer | |
| 7,266,681 B1 * | 9/2007 | Janes | 713/151 |
| 7,370,351 B1 * | 5/2008 | Ramachandran et al. | 726/8 |
| 7,383,570 B2 | 6/2008 | Pinkas | |
| 7,499,899 B2 * | 3/2009 | Siegel et al. | 706/47 |
| 7,559,084 B2 * | 7/2009 | Komai | 726/19 |
| 7,594,120 B2 * | 9/2009 | Brown et al. | 713/183 |
| 7,603,565 B2 * | 10/2009 | Baird et al. | 713/184 |
| 7,603,706 B2 * | 10/2009 | Donnelly et al. | 726/22 |
| 7,653,944 B2 * | 1/2010 | Chellapilla et al. | 726/27 |
| 7,698,549 B2 * | 4/2010 | Thornton et al. | 713/156 |
| 7,739,744 B2 * | 6/2010 | Burch et al. | 726/26 |
| 2002/0129283 A1 * | 9/2002 | Bates et al. | 713/202 |
| 2002/0169988 A1 | 11/2002 | Vandergeest et al. | |
| 2002/0171546 A1 * | 11/2002 | Evans et al. | 340/540 |
| 2003/0097331 A1 * | 5/2003 | Cohen | 705/39 |
| 2003/0141362 A1 * | 7/2003 | Brown et al. | 235/380 |
| 2003/0144952 A1 * | 7/2003 | Brown et al. | 705/40 |
| 2004/0005914 A1 | 1/2004 | Dear | |
| 2004/0059951 A1 * | 3/2004 | Pinkas et al. | 713/202 |
| 2005/0022005 A1 * | 1/2005 | McKeeth | 713/200 |
| 2005/0166263 A1 | 7/2005 | Nanopoulos | |
| 2005/0193208 A1 | 9/2005 | Charrette | |
| 2005/0239447 A1 * | 10/2005 | Holzman et al. | 455/414.3 |
| 2005/0245229 A1 * | 11/2005 | Brown et al. | 455/404.1 |
| 2006/0070125 A1 * | 3/2006 | Pritchard et al. | 726/18 |
| 2006/0075230 A1 | 4/2006 | Baird | |
| 2006/0117389 A1 | 6/2006 | Pool | |
| 2006/0236120 A1 * | 10/2006 | Jones et al. | 713/186 |
| 2006/0248330 A1 * | 11/2006 | Randle et al. | 713/155 |
| 2006/0253388 A1 | 11/2006 | Newton | |
| 2006/0294390 A1 * | 12/2006 | Navratil et al. | 713/182 |
| 2006/0294392 A1 * | 12/2006 | Veprek et al. | 713/183 |
| 2007/0005964 A1 | 1/2007 | Gross | |
| 2007/0006301 A1 * | 1/2007 | Nickell et al. | 726/22 |
| 2007/0061266 A1 | 3/2007 | Moore | |
| 2007/0130618 A1 * | 6/2007 | Chen | 726/8 |
| 2007/0143624 A1 | 6/2007 | Steeves | |
| 2007/0156592 A1 * | 7/2007 | Henderson | 705/51 |
| 2008/0066014 A1 * | 3/2008 | Misra | 715/846 |
| 2008/0068183 A1 * | 3/2008 | Diamant | 340/574 |
| 2008/0072293 A1 * | 3/2008 | D'Urso | 726/4 |
| 2009/0012855 A1 * | 1/2009 | Jamal et al. | 705/14 |
| 2009/0077628 A1 * | 3/2009 | Elson et al. | 726/2 |
| 2009/0094687 A1 * | 4/2009 | Jastrebski et al. | 726/6 |
| 2009/0150986 A1 * | 6/2009 | Foreman | 726/9 |
| 2009/0260068 A1 * | 10/2009 | Hariharan et al. | 726/7 |
| 2009/0307765 A1 * | 12/2009 | Mardikar et al. | 726/7 |
| 2010/0077210 A1 * | 3/2010 | Broder et al. | 713/168 |
| 2010/0095350 A1 * | 4/2010 | Lazar et al. | 726/3 |
| 2010/0162404 A1 * | 6/2010 | Dawson et al. | 726/26 |
| 2010/0185871 A1 * | 7/2010 | Scherrer et al. | 713/186 |

OTHER PUBLICATIONS

Toub, S., "An asp.net Framework for Human Interactive Proofs", Microsoft, Sep. 2004, all pages. <http://msdn.microsoft.com/en-us/library/ms972952.aspx#hip_aspnet_topic1>.*

Unknown, "Enabling Compliance with Password Policies," MandyLion Labs, http://www.mandylionlabs.com/news/WSJ_pr_10_24_05.htm, as viewed Mar. 24, 2007.

Leslie Lamport, "Password Authentication with Insecure Communication," Communications of the ACM, vol. 24, No. 11, Nov. 1981, p. 770-772.

Kaschko, PeerToPatent.Org submission regarding Lotus Notes, http://www.peertopatent.org/prior_art/167/detail, as viewed Jul. 17, 2008.

Kaschko, PeerToPatent.Org submission regarding ADT, http://www.peertopatent.org/prior_art/166/detail, as viewed Jul. 18, 2008.

ADT Security Services, Security System User's Manual Security Manager 2000, ADT Security Services, dated Apr. 1999, http://www.adt.com/wps/wcm/resources/file/ebf98d0b491b218/manual_security_manager_2000.pdf, downloaded Jul. 18, 2008.

Naumov, Igor, PeerToPatent.Org submission regarding True Crypt Drive, http://www.peertopatent.org/prior_art/99/detail, as viewed Jul. 18, 2008.

Truecrypt Foundation, TrueCrypt Foundation Web page, Dec. 10, 2004, http://www.truecrypt.org/docs/?s=hidden-volume, as viewed Jul. 18, 2008.

Bider, Denis, PeerToPatent.Org submission regarding RubberHose disk encryption system, http://www.peertopatent.org/prior_art/98/detail, as viewed Jul. 18, 2008.

Rubberhose, Rubberhose cryptographically deniable transparent disk encryption system, Aug. 22, 2000, http://iq.org/~proff/rubberhose.org/, as viewed Jul. 18, 2008.

Kaschko et al., PeerToPatent.org discussion on validity of the present patent application, http://www.peertopatent.org/patent/20070250920/discussion, as viewed Jul. 18, 2008.

(56) References Cited

OTHER PUBLICATIONS

Cover, Robin, Security Standard ANSI INCITS 359-2004 for Role Based Access Control (RBAC), dated Apr. 2, 2004, http://xml.coverpages.org/RBAC-ANSI.html, as viewed Jul. 18, 2008.

Unknown, "Open Specifications Integrate One-Time Passwords with Enterprise Applications," RSA Security, http://www.rsa.com/rsalabs/otps/datasheets/OTP_WP_0205.pdf, as viewed Feb. 6, 2007.

Kevin Bullis, "Smart Cards with Built-In Fingerprint Scanners," Technology Review, MIT, Cambridge, Mass., Jun. 27, 2006, available online at http://www.technologyreview.com/read_article.aspx?id=17040&ch=biztech, as viewed Jun. 27, 2006.

Unknown, "Mobile Processing Solutions," eProcessing Network, available online at http://www.eprocessingnetwork.com/mobile.html, as viewed Jan. 20, 2007.

B. Aboba, "Extensible Authentication Protocol (EAP)," Network Working Group, The Internet Engineering Task Force, available online at http://www.ietf.org/rfc/rfc3748.txt, as viewed Apr. 23, 2006.

Deb Shinder, "Passwords:the Weak Link in Network Security," Jul. 22, 2004, WindowSecurity.com, available online at http://www.windowsecurity.com/articles/Passwords_Network_Security.html, as viewed Jul. 14, 2007.

Michelle Speir Haase, "Mandylion Takes Password Tokens to Next Level," Nov. 21, 2005, FCW.com, available online at http://www.fcw.com/article91511-11-21-05-Print.

Unknown, "ARM Report," Division of Banking, Illinois Department of Financial and Professional Regulation, State of Illinois, 2002, available online at http://www.obre.state.il.us/AGENCY/News/atmrpt.htm.

Unknown, "Keystroke Dynamics," Wikipedia, http://en.wikipedia.org/wiki/Keystroke_dynamics, as viewed Jul. 14, 2007.

Wael Chatila, "Using AJAX for Image Passwords—AJAX Security Part 1 of 3," http://waelchatila.com/2005/09/18/1127075317148.html as viewed Jan. 7, 2007.

Unknown, "Factotum System of Bell Labs," http://plan9.bell-labs.com/magic/man2html/4/factotum as viewed Mar. 24, 2007.

Unknown, "AuthEngine: Embedding Strong Authentication in Existing Applications," CRYPTOCard, Ottawa, Ontario, available at http://www.cryptocard.com/uploads/Documents%2FSolutionSheets%2FSSNewAuthEngine20070704.pdf, as viewed Jul. 14, 2007.

Unknown, "nC AudioCard: Simplify and Secure Multi-channel Electronic Exchanges," nCryptone, Boulogne-Billancourt, France, available online at http://www.ncryptone.com/produits/ncaudiocard.asp as viewed Jan. 19, 2007.

Tom Mashberg, "Smart Pages," Technology Review, vol. 109, No. 4, Sep./Oct. 2006 p. 15, available online at http://www.technologyreview.com/printer_friendly_article.aspx?id=17403.

H. Guan, J. Chang, L. Chen, R. Feris and M. Turk, "Multi-View Appearance-Based 3D Hand Pose Estimation," IEEE Workshop on Vision for Human Computer Interaction, New York, NY, Jun. 2006, available at http://ilab.cs.ucsb.edu/publications/GuanV4HCI06.pdf, as viewed Jan. 6, 2007.

Unknown, "Mobile 2×2☐: A Mobile, Strong Two-Way and Two-Factor Authentication," Deep Net Security, London, England, available online at http://www.deepnettechnologies.com/products/mobile2x2.asp, as viewed Jul. 14, 2007.

Uknown, "One-Time Password," Wikipedia, http://en.wikipedia.org/wiki/One-time_password, as viewed Jul. 14, 2007.

* cited by examiner

Telephone-based Security System

SECURITY SYSTEMS FOR PROTECTING AN ASSET

CROSS-REFERENCE TO RELATED APPLICATIONS

This is a continuation of U.S. patent application Ser. No. 11/739,021, "Security Systems for Protecting an Asset," filed Apr. 23, 2007, issued Jun. 23, 2009 as U.S. Pat. No. 7,552,467, which in turn claims priority to U.S. Patent Appl. Ser. No. 60/745,461, filed Apr. 24, 2006, and U.S. Patent Appl. Ser. No. 60/889,540, filed Feb. 13, 2007, all of which are hereby incorporated by reference in their entireties for all purposes.

BACKGROUND

Field of the Invention

This invention pertains to security systems that restrict access to an account or other asset. The invention also pertains to computerized systems and user interfaces for configuring access criteria and security rules responsive to primary and secondary passwords. The invention also relates to improved means for reducing the risk of theft or misuse of assets, and for protecting related accounts, including measures to reduce identity theft and other forms of fraud.

Description of the Related Art

Passwords have been described as the weak link in modern computer security. In many cases, all that stands between would-be thieves and a bank account, email account, corporate records, or even control of many aspects of a business is a string of several characters. The growing problem of identify theft is exacerbated by inadequate password security. Guidelines for "strong passwords" have been promulgated to make it more difficult for others to guess passwords. Unfortunately, even complex, hard-to-guess passwords can be stolen or discovered in many ways, such as by spyware that monitors keystrokes on a computer, keystroke logging devices attached to a computer, by guessing or brute-force techniques to discover simple passwords, by careless actions of the password owner who may write a password down and leave it available for others to see, by an observer simply watching to see what password is typed, and so forth.

Further, even security-conscious users may sometimes face situations in which they feel they must use their passwords in insecure settings where the password may be exposed to others. In addition to these threats, there is also the risk of criminal intimidation to force a person to reveal a password, PIN, or other security code in order for the thief to gain access to an account, to a safe, a secured vehicle, or other secured item. In other situations, an account owner may face a need to voluntarily share a password or other credential with another party, with the risk that it may be obtained by others and misused. In all these cases, there is a need to add new levels of security to password-protected assets or to security-related information to prevent problems such as account hijacking and identify theft, or to reduce the risks of misusing an account or information from an account.

Security theft is a growing problem that requires increased security means on many fronts. Protection of passwords and other personal information is a vital concern, and previous attempts to improve security associated with a user's assets and identity have a variety of shortcomings, often failing to provide users with the flexibility they need to control access and establish rules for protecting their assets while allowing access under various circumstances.

One aspect of identify theft involves the abuse of basic account information such as a Social Security numbers, which can in turn be used to access still other information to gain access to accounts or commit other acts of fraud against a person. Indeed, thieves can use Social Security numbers in a variety of ways to commit identity theft. For example, the customer service operators of some companies associated with user assets (e.g., banks, online brokerages, credit card companies, etc.) treat SSNs as if they were passwords or shared secrets to authenticate the identify of a user, often allowing a person armed with an SSN and perhaps a few easily obtained facts (address, zip code, full name, birthdate, etc.) to be authenticated as the account owner, and thus be allowed to make major transactions, for example. SSNs are requested and stored by employers, banks, insurers, universities, various non-profit organizations, etc., and may appear printed on insurance cards and numerous mailings from employers or other institutions, making them easy to be stolen from a person's trash. Numerous people may see and handle such information, providing many routes for theft. U.S. Pat. No. RE38572, "System and Method for Enhanced Fraud Detection in Automated Electronic Credit Card Processing," issued Aug. 31, 2004 to Tetro et al., as well as U.S. Pat. No. 6,715,672 of the same name, issued Apr. 6, 2004 to Tetro, discuss separation of an SSN database from a credit card user database to reduce the risks, but the very use of SSNs or even partial SSNs to be given over a telephone in such systems poses risk. There is a need for improved means for users to protect account information, including information related to SSNs or other personal identifying information to reduce the threat of identity theft.

One step toward improved security involves the use of hardware-based authentication for gaining access to an account, typically in the form of two-part authentication (hardware authentication plus a user-provided password) as opposed to single-factor authentication. Such approaches can include the use of smart cards, which have an embedded chip that can hold a digital certificate allowing authentication to be accomplished through a public key infrastructure (PKI). In addition to entering the user's password or PIN, the user's smart card must be read by a smart-card reader. Reading of the chip can be achieved using a variety of devices that can communicate with a network or computer, including USB devices, such as the Gem e-Seal® of GemPlus International SA (Luxemburg), a USB token with an embedded smart card. Biometric authentication is another approach, requiring hardware and software for scanning and analyzing a unique physiological characteristic. While biometric authentication is often proposed as a one-part authentication scheme, it can be a hardware-based component of a two-part authentication scheme in combination with a user-supplied password or PIN.

Another hardware-related solution involves password synchronization, in which a hardware "token" meant to be in the possession of an authorized user generates an alphanumeric string that changes periodically (e.g., every 15 seconds, 30 seconds, or 60 seconds) according to a secret algorithm. Typically, the time is combined with user credentials to generate the seemingly random string. To gain access the user must enter the currently displayed string and, typically but not necessarily in all system, also enter a fixed or static password. A central server can then determine if the temporary string is correct and also verify that the correct password is entered. In this manner, even if the entered password is observed or intercepted, it will no longer be valid after a brief interval of time, resulting in a two-part authentication scheme that provides a one-time password (OTP). One example of password synchronization to provide an OTP is the RSA SecurID® system of RSA Security Inc. (Bedford, Mass.). Another example is the VeriSign® One-Time Password Token of VeriSign (Mountain View, Calif.) and related payment gateway systems, such as the system being used by PayPal and Ebay in partnership with Verisign.

Password synchronization (also known as time synchronous OTP) is not the only OTP method. Event synchronous and challenge-response schemes are among other approaches to consider. In each approach, an algorithm is applied to the credentials of the user (e.g., a unique key) to generate a string that can serve as an OTP (or be coupled with a PIN to form the OTP). In event synchronous schemes, an OTP is generated in response to an event such as inserting a USB device, pressing a button, entering a keystroke or clicking on a button on a graphical user interface. In challenge-response schemes, a challenge is entered or sent to the token, and an OTP is generated in response based on a combination of the challenge with the user credential according to an algorithm. Various hybrid approaches are also known based on combinations of these schemes. General principles for OTP systems are described in the white paper from RSA Security, "Open Specifications Integrate One-Time Passwords with Enterprise Applications" available at http://www.rsa.com/rsalabs/otps/datasheets/OTP_WP_0205.pdf, as viewed Feb. 6, 2007. Also see the "Extensible Authentication Protocol (EAP)" described in by B. Aboba et al., available at http://www.ietf.org/rfc/rfc3748.txt, as viewed Apr. 23, 2006. Further information is provided in United States Application 20050166263, "System and Method Providing Disconnected Authentication," published Jul. 28, 2005 by Nanopoulos et al., parts of which are herein incorporated by reference to the extent that they is noncontradictory herewith, said parts being the description found in paragraphs 21 to 35 of one-time password verification systems, with associated figures. (In general, incorporation by reference of other documents, as practice herein, is intended to provide useful background information for implementing technical aspects of methods and systems described herein, and is not meant to limit any definitions or descriptions given herein.)

The variable or machine-generated component of a two-part authentication scheme can be provided by a dedicated physical device with the user's credentials such as key fob, card, PIN pad, a USB-connected device, and the like. Alternatively, a multifunctional tool can be provided with software to also provide the changing machine-generated component. In this case, the hardware-generated component of the two-part authentication scheme is actually provided through proprietary software installed on an electronic device such as another computer, a Pocket PC, personal digital assistants (PDAs) such as Palm Powered® handhelds (Palm, Sunnyvale, Calif.), BlackBerry® (Research in Motion, Charlotte, N.C.) handhelds and wireless phones marketed by Ericsson (Stockholm, Sweden), Nokia (Helsinki, Finland), and others.

A related tool is the Aladdin eToken Pro system of Aladdin Knowledge Systems Ltd. (Kiryat Arye, Petach Tikva, Israel), and the related eToken NG-OTP, a hybrid USB and One-Time Password (OTP) token that can be used to provide access when the USB device is connected to a computer or in detached mode can display one component of a two-component OTP.

Even with hardware-assisted two-part authentication schemes, there is the risk of theft and account hijacking. For example, a thief may use physical intimidation to compel a user to hand over a hardware token and provide the PIN and instructions for use, or in an insecure environment a thief may observe how the hardware component is used, observe or detect the PIN, and then physically steal the hardware component to gain access to an account.

In the art for automated teller machines (ATM), one security system is that of R. K. Russikoff in U.S. Pat. No. 6,871,288, "Computerized Password Verification System and Method for ATM Transactions," issued Mar. 22, 2005, FIGS. 1 through 3 thereof and columns 3-5 thereof being herein incorporated by reference in a manner that is non-contradictory herewith. In the ATM system of Russikoff, after reading the personal access card (ATM card) and verifying the personal identification number of the customer, the system then generates and displays a plurality of transaction acceptance passwords in the central computer, wherein one of the passwords has been pre-assigned to the customer. If a password other than the pre-assigned password is selected, the requested cash is still dispensed, but the authorities are alerted to indicate that the customer request for cash withdrawal is being made under duress. A related system is that of Brown et al. in U.S. Pat. No. 6,679,422, "Automatic Teller System and Method of Marking Illegally Obtained Cash," issued Jan. 20, 2004. See also U.S. Pat. No. 5,354,974, "Automatic Teller System and Method of Operating Same," issued Oct. 11, 1994 to Eisenberg, which describes an automatic teller system that can receive a personalized normal PIN number and emergency PIN number from a user. Also see U.S. Pat. No. 5,731,575, "Computerized System for Discreet Identification of Duress Transaction and/or Duress Access," issued Mar. 24, 1998 to Zingher and Zingher, from which FIGS. 2, 3, 4, and 6 and the associated description of said figures are herein incorporated by reference for the purpose of describing examples of duress PIN implementation for ATM machines that can be adapted for use according to present invention, to the extent that such description is noncontradictory herewith. The Zingher and Zingher patent describes a system and method for the discrete identification of a duress transaction at an ATM banking machine.

For both one-part and multi-part authentication schemes, there is a need to provide improved security to reduce the potential for harm when a password is stolen. In particular, there is a need to provide password authentication schemes that can help a user in an emergency or provide added security features in an insecure setting, without the risk of losing highly valuable assets. Further, there is a need to allow users to have new levels of security, such that at least some security measures can be in place should another party obtain the user's password.

Regarding credit card security, an authorization system in which a duress signal can be sent by a vendor to authorities when the vendor suspects that a crime is in progress is described in U.S. Pat. No. 6,685,087, "Security System for Validation of Credit Card Transactions," issued Feb. 3, 2004 to Brown et al., the portions dealing with an Interactive Voice Response System (IVRS) and other methods for conveying information to authorities being herein incorporated by reference to the extent that they are noncontradictory herewith.

In spite of the many efforts made to increase the security of password-accessible systems, there remains a need to provide more flexible, convenient systems in which users can configure security rules for access to secured assets.

Further, for many users there is a need to provide customizable means to provide primary and secondary password schemes with associated security rules. Further, there is a need for some users to be able to protect their assets with security systems having primary and secondary passwords with varying security-related rules and actions associated therewith, including options for the primary and secondary passwords to be differentiated via a variety of means, including schemes with both overt and covert components (e.g., hidden secret actions coupled with the entry of conventional passwords). In some security-related situations, there is also a need to provide a user improved security means to placate a thief or appear to provide access to an asset, without actually jeopardizing the asset or selected components of the asset. One or more of these needs may be addressed in the various aspects of the invention described below, but it should be recognized that particular aspects of the invention as defined by the claims may provide utility in a variety of other areas and need not specifically address any of the needs previously set forth or any objectives or advantages explicitly or implicitly found elsewhere in the specification.

SUMMARY

The present invention is directed toward improving the security of protected assets, particularly assets protected with a password system, including personal identification numbers. In one aspect of the invention, users are provided with primary and secondary passwords for controlling access to an asset, with a primary access providing more complete access (e.g., privileges regarding the asset or use of the asset or its components) relative to the more limited access provided when a secondary password is used. In some cases, the secondary password can be a secondary password that can be used when under duress or in emergencies (e.g., a thief forcing the user to reveal or enter a security code to gain access to an account, a safe, etc.) or in other insecure situations (e.g., using a public computer where entered passwords may be monitored). The secondary password may provide temporary access, limited access, or feigned (simulated) access to the asset, while optionally also providing other security measures. Through preconfigured systems for limited or simulated access, a would-be thief can be placated by the appearance that full access has been provided, but wherein key assets still remain secure.

Thus, in one aspect, a security system is provided for controlling access to an asset, the system comprising a password-protected access interface and asset access means, the access interface comprising means for receiving user credentials comprising a password, wherein the access interface accepts user credentials in which the password is one of a recognized primary password and one or more recognized secondary passwords, the asset access means being operably associated with the access interface such that when the accepted user credentials comprise the primary password, the asset access means provides access to the asset, and when the accepted user credentials comprise one of the one or more secondary passwords, the asset access means provides relatively limited or feigned access to the asset, and when the user credentials do not comprise one of the primary password and the one or more secondary passwords, the asset access means denies access to the asset. In stating that the system accepts user credentials comprising a password that is a primary password or a secondary password, it is to be understood that the user credentials may also include a user ID or other information such as an account number, and that in such cases the password must be a recognized or valid password associated with that specific user ID or other information, as stored in a database or other memory associated with the security system. In accepting credentials, the system from a user's perspective behaves at least in appearance as if valid credentials have been entered, and indeed, the primary and secondary passwords (or in other words, the valid passwords for that user) are recognized as credentials properly associated with the asset, but the degree of access provided may range from full access to merely feigned access, in contrast to unrecognized user credentials that may, for example, result in denied access indicated by an error message, a readily recognized denial of service (e.g., being logged off by a system, the inability to operate a device, the inability to open a door or container, etc.), a request to re-enter credentials, an alarm signal, etc. The asset access means may be customizable by the user (e.g., the asset owner), either directly or indirectly by an administrator on behalf of the user, via an administrative interface for establishing preconfigured security rules, wherein said access interface is operably associated with asset access means responsive to said preconfigured security rules, wherein said security rules may also include means for specifying a security alert or invoking other security-related actions to be executed in response to subsequent entry of one or more secondary passwords.

In another aspect of the invention, a tangible asset is protected by a password-based security system governing access to the asset, the security system comprising password input means in communication with stored password information, such that the system recognize input of a password matching stored password information, the password being selected from a primary password and at least one secondary password, the security system also comprising asset access means that provides full access to the asset in response to input of a primary password and one of limited and feigned access in response to input of one of the at least one secondary passwords, and, in response to input of an unrecognized password, the access means denying access to the asset, wherein at least one of the primary password and the at least one secondary password is a complex password comprising an overt password component and a covert password component. In one embodiment of this aspect, full access to the asset requires human passage through a door or other entryway that is closed to unauthorized users. In another embodiment, full access does results in an electronic signal that releases a lock. Alternatively, full access can result in the ability to operate a mechanical or electronic device, or a vehicle.

In another aspect of the invention, an administrative security system is provided to allow a user to configure security rules governing the behavior of the security system for an asset, such that customized rules can be established to configure the system's response to either a primary password or one or more secondary passwords. The means for custom configuration of the security system may comprise a graphical user interface, verbal interface, or other interface to receive user commands to configure the security system that protects an asset. In some embodiments, a Web-based system is provided with a graphical user interface that allows a user to configure on or more systems with primary and secondary passwords and rules governing system response to each, including options for security alerts in response to one or more secondary passwords.

Another aspect of the invention pertains to a security management system for providing controlled access to a secure electronic account accessible via an electronic account access interface in communication with an account server, the security management system comprising an administrative interface for defining security rules for governing account access via the account access interface, the security rules being stored on the account server or on a machine readable medium in electronic communication with the account server, wherein said administrative interface allows an authorized user to customize the security rules to provide different levels of account access responsive to entry via the electronic account access interface of user credentials comprising either a primary password or a secondary password. In a related embodiment, the security rules further define conditions for issuing a security alert in response to specific actions taken with the account access interface, and wherein the account access interface is in electronic communication with a security alert generation tool capable of issuing a security alert according to the defined conditions. The administrative interface may be, for example, a Web-based interface for communication between an electronic input device and an administrative server, the administrative server being in electronic communication with an account server managing the secure electronic account, wherein selection of security rules via the administrative interface results in a signal sent to the account server providing information about the security rules.

In some embodiments, the administrative interface can be used to configure security rules associated with one-time password devices, such as password synchronization devices for two-part or multi-part authentication, wherein the synchronization device displays a one-time password (OTP) that changes periodically. The customized security rules may be used to override system defaults and allow the user to define a primary password that comprises a modified form of the OTP, such as the currently displayed OTP wherein one or more of the characters displayed are incremented, transposed, duplicated or otherwise replicated, deleted, shifted, augmented with another string, etc., according to rules selected by the user. Thus, one aspect of the invention is the aforementioned administrative interface, wherein the account access means comprises a password synchronization system adapted to generate one-time password components for comparison with a component of passwords entered into the account access interface, and wherein the primary password is a multi-part password comprising the one-time password component and at least one other component, the one-time password component being different from but having a relationship to a one-time password root generated by a password synchronization device associated with the electronic account, the relationship being defined by an algorithm that modifies the one-time password root to yield the one-time password component, and wherein the account access means is adapted to recognize entry of a password comprising the one-time password root as a possible attempt at unauthorized access to the asset. The algorithm may be a simple one that can be readily executed by an adult human user of average intelligence, such as transposing the first two digits, deleting or adding a digit, subtracting one from the first digit that is not zero, etc.

For example, a user may configure rules in the administrative interface for a password synchronization devices for use with a PayPal or other payment account such that use of the displayed string (e.g., a six-digit string) will not be accepted as a primary password, specifying instead that the proper OTP to enter into an account access interface should be a modified form of the displayed OTP in which the second and third digits are transposed, or in which the first digit is replaced with the corresponding letter of the alphabet (1="A", 2="B", etc.), etc. In such cases, the user may wish to specify that use of the unmodified OTP as a component of a password will be recognized, either with or without the proper second component of the primary password, as a secondary password with specified limitations on the account and/or automatically invoked security measures, such as alerting authorities, freezing the account, or resetting the one-time password component to be unrelated to the one-time password root displayed by the password synchronization device. Since use of the unmodified OTP may be indicative of theft or attempted fraud, wherein someone has gained unauthorized access to the user's synchronization device or its principles of operation, specification of security-related actions in response to entry of the unmodified OTP can be helpful in some circumstances. The user may also wish to identify a class of secondary passwords comprising any entered password string that comprises the unmodified current OTP in either the leading or trailing portion of the password string (e.g., the first six characters or last six characters of the string, for the case of an OTP having a length of six), since entry of such a password may indicate that some has access to the synchronization device but does not know that static password component (PIN) that typically should be entered in combination with the OTP string. In some cases, more complex OTP rules can be created, such as rules requiring that two consecutively displayed OTPs be concatenated, added, have the digits intermeshed, or otherwise combined (e.g., commingled, compounded, or convolved) to yield a new OTP based on an algorithmic treatment of two or more displayed OTPs from different time periods.

In another aspect of the invention, a computerized password security system is provided for protecting access to an asset pertaining to a user, comprising:
 (a) a database on a server comprising account information for the user, said account information comprising a user ID, a primary password, at least one secondary password, and a rules record specifying actions to be taken if one of the least one secondary passwords is entered, said actions comprising the level of access to the asset to be granted, the at least one secondary password being other than a guest password or default password;
 (b) input means for a user to enter the user ID and a password into the security system;
 (c) account access means wherein the entered user ID and entered password are compared to the information in the database to determine the level of account access granted to the user according to the rules record based on the entry of a primary password or the at least one secondary password, and
 (d) security system administration means which allow the user to customize the rules record, including the option to specify that in response to entry of the at least one secondary password, the account access means will provide the user's choice of either partial account access or feigned account access.

In another aspect of the invention, a method is provided for securing sensitive information within a password-protected account controlled by a computer system, the account containing sensitive and less sensitive information, the method comprising:
 (a) a database on a server comprising account access information for a user's account, said account information comprising a user ID, a primary password, at least one secondary password, and configuration information for distinguishing sensitive and less sensitive information, and optionally wherein the primary password comprises an overt component and a covert component;

(b) a configuration interface for identifying sensitive information (e.g., by manual selection of sensitive items, creation of heuristics to define sensitive items, or manual selection of sensitive items based on criteria entered by user or agent of the user), said identified information being stored as configuration information in the database; and (c) an account access interface in which a party can gain access to the account by entering a password, wherein use of the primary password provides full account access to both sensitive and less sensitive information, and wherein use of a secondary password provides access limited account access only to less sensitive information according to the configuration information, and wherein the interface for the limited account access simulates full account access, with no obvious indication to parties unfamiliar with details of the user's account that sensitive information has been concealed (e.g., there may be no apparent indication that folders are hidden, or that emails are hidden, etc.).

In another aspect of the invention, a security object is provided for use in a password-based security system for protecting an asset, the security system being adapted to recognize primary and secondary passwords for providing different levels of access to the asset, wherein the security object comprises a password revelation device for providing a one-time password, said security object being responsive to an external factor controllable by a user of the security object, such that the one-time password provided is either a primary password for providing full access to the account, or a secondary password for providing limited access to the account. In various versions of this aspect of the invention, the external factor may be based on a hidden action that can be executed by a user of the card at will. Alternatively or in addition, the external factor may selected from one of object orientation, mechanical pressure applied to a portion of the object, a physical motion made with the object, and the presence of light on one or more portions of the object. The object may be a device weighing between 5 and 300 grams, with a length of between about 1 cm and 20 cm, a width between about 1 cm and 15 cm, and a thickness less than 1 cm. In some versions, the password may be provided graphically or as a wireless signal.

In other aspects of the invention, any of the methods described herein can be implemented as a computer-readable medium having embodied thereon a computer program executable on a computer for implementing for implementing the selected method. Alternatively, the selected method can be embodied in a computer program resident in physical signals transmitted over a transmission medium, said computer program being executable on a computer for use in a security system, comprising the any or all of the steps of the selected method or compatible combinations or subcombinations of the steps in two or more aspects of the invention described herein.

In some embodiments of the invention, the security system is adapted to distinguish primary and secondary passwords that may be configured to have overt and/or covert components. In such systems, entry of the overt component can be recognized by an observer as entry of a password, whereas entry of the covert component is ordinarily difficult for an observer to recognize as an entry of security-related information. For example, in a computer login screen to access an account, the overt component may be entry of a password in a field clearly labeled as a password field, whereas the covert component may comprise a detail of timing in entering keystrokes or clicking a mouse, an action of a stylus, a specific form of contact with a touch-sensitive screen or other contact-sensitive device, or a detail of precisely where on a button the user clicks, or some other "hidden action" during, before, or after entry of the overt component of the password. In this manner, an observer such as a bystander looking over the shoulder of a user at a computer monitor or a hidden observer such as a hacker monitoring keystroke activity with a keylogger would be unlikely to readily recognize that security-related information was being entered, and might believe that the "normal" (primary) password of the user had been entered when, in fact, the hidden action or lack thereof conveys a signal to the security system that the entered password (with recognition of overt and covert components) is a secondary password that invokes application of the preconfigured security rules responsive to the secondary password, wherein the rules can include directions for providing limited or feigned access to the account, and may call for alerting authorities or providing other security alerts.

For example, the access interface of a brokerage or bank account may be configured to recognize a secondary password (e.g., a PIN) that appears to provide access to the user's account. Use of the secondary password, however, may be preconfigured to provide only limited access to a portion of the user's account (e.g., showing less than $1,000 available funds) or can provide access to a sham account (feigned access), wherein the amounts shown and any transactions apparently completed have no effect on the user's account. Alternatively, access to the user's account is provided, but all transactions or changes are purely simulated or, when possible, completed but then rescinded shortly thereafter before actual loss (beyond a predetermined threshold, if desired) can occur. Thus, a thief may be able to transfer up to $1000, for example, from the user's account to another account, but greater amounts may be simulated or rescinded after the apparent transfer command has been issued, while the account access interface (a graphical or other interface for account access) appears to confirm that the transaction has been completed. The user may be provided with several options as to what kind of access is provided and how transactions will be treated, depending on how the account is configured and optionally depending on details pertaining to the secondary password (e.g., a secondary password root of 4459 can be entered as 44590 to mean zero access, resulting a purely simulated account, while 44591 may be a signal calling for access to the real account but with simulated or rescinded transactions only, and so forth).

The establishment of such secondary passwords, or means for distinguishing primary and secondary passwords, and rules to be implemented in response to entry of a secondary password using the security system protecting an asset, can be preconfigured by a user or asset administrator using the previously mentioned administrative system to allow customization of a security system.

For access to a VPN (virtual private network) or other computer system, a secondary password can limit access to only "relatively safe" portions of the directories thereon, or can provide a simulated environment where little or no harm can be done, resulting in a "Potemkin village" desktop or LAN. For example, users or system administrators may preconfigure a set of directories and files free of sensitive information that can be accessed using a secondary password, or the system can show the presence of actual files (optionally with modified or nonsense file names), and simulate copying the files to media, if so directed, while only writing harmless information. In one embodiment, access to a user's computer can be complete except for pre-selected directories and files which remain invisible and inaccessible when the secondary password is used to gain entry. In related embodiments, use of the secondary password may automatically result in complete deletion of sensitive files, in addition to issuance of an alarm signal. In another embodiment, use of a secondary password not only prevents access to sensitive files, directories, or devices, while simulating full access, it also initiates a program that will, after a period of time, automatically destroy all files or even the entire hard disk or other components of the computer that has been stolen or accessed under duress, optionally simulating a "normal" disk error or hardware problem. One such hardware problem can be apparent failure of the power supply or battery, optionally occurring at the time of file erasure, making further access impossible until a hardware setting has been reset or a component replaced. Fuses, relays, and other electrical components can be used to achieve controlled failure of the computer in response to entry of a secondary PIN after a predetermined period of time.

For assets such as safes, use of a secondary password (combination) results in opening of the safe while also signaling an alarm, and in one embodiment can result in one portion of the safe remaining inaccessible, such as a false bottom or false back of the safe. Thus, the thief may think that access to the contents has been gained, but key documents or assets may remain hidden in response to using the secondary password.

For password-based access to a motorized vehicle or other mechanized device or vehicle, use of a secondary password may cause limitations in the performance of the device to reduce the harm that may be done. For example, use of a secondary password to gain access to an automobile may result in a simulated mechanical failure of the vehicle after a short distance, or cause the gas tank gauge to display a near-empty condition to be followed by a simulated out-of-gas even after a short distance has been traveled.

For access to PIN-protected billing features associated with cell phones, PDAs, smart cards, and other devices, a secondary password (PIN) can be provided that can create alarms when used, limit or cancel transactions, and so forth, optionally according to predetermined rules and selections from the user entered through a graphical user interface on the device itself or on a separate application such as a Web site in communication with a central computer operated by the service provider.

A secondary password may be preconfigured to be a one-time password, such that attempts to use it a second time fail. Alternatively, it may be a limited-used password, such that it can be used repeatedly during a fixed period of time such as 5 minutes, 10 minutes, or 30 minutes, allowing a thief to verify that it is not a one-time password. In another version of the invention, the password may be reused any number of times until the user changes the password scheme for the account, but with an unlimited-use password, access to the account or other assets may be restricted, limited, or simulated.

In another version, the secondary password is used in a single-factor authentication system and is a predetermined static password that will provide only one-time use or limited-time use. This allows the user to access a bank account, email account, or other secure account from a public computer that may have compromised security, without risk that a keylogger, password snooper or third party observing the entered password will be able to gain access to the system. This form of secondary password may provide full access to the account, or limited access. Limited access may include limitations on what data is displayed, on what size transactions can be made, what directories can be accessed, etc. The limitation may also be temporal, providing only, for example, 5 minutes of full access to the account. Such secondary passwords are intended for actual authorized account use but in insecure settings. Thus, they can be considered as static, memorizable, pre-approved OTPs.

In one version, a security system can comprise use of a text-based password coupled with a non-text-based authentication component such as biometrics or related means for identification of the user. An alarm signal can be sent by use of a secondary password or by a predetermined modification to the way the non-password authentication component is used. For example, a smart card or access portal with a finger pad for identifying the user through fingerprints or other biometric means can have a predetermined protocol to signify that the user is in a state of duress. For example, the finger pad may be set to authenticate the user based on contact with the right index finger, but may be configured to also recognize another finger such as the left index finger, right middle finger, etc., as an indication of duress. Systems that can be adapted for this version of the invention include the finger scanners of Nanoident Technologies (Linz, Austria), which detect patterns and blood content in the tissue within the finger, as described at http://www.technologyreview.com/read_article.aspx?id=17040&ch=biztech as viewed Jun. 27, 2006.

The security methods of the present invention can be adapted to any suitable combinations of hardware and software. For example, payment transaction systems of numerous kinds can be adapted to have any of the enhanced security features of the present invention. Such transaction systems may include, for example, dedicated wireless terminals, dedicated cell phone terminals, customer-owned cell phone and PDA systems, etc. Dedicated wireless terminals typically have a MagStripe reader and printer built into them, as well as a display and (optionally) a keyboard or other data entry means such as a touch-screen. Cell-phone terminals use cell phones for the required computing power and data entry and display. They may have MagStripe readers and PIN pads for PIN-debit transactions. They may have integrated printers or may communicate with a printer via infrared or RF technology. An example of a system for user-owned cell phones and PDAs is the ePNMobile system of eProcessing Network, LLC (Houston, Tex.) for use with the eProcessingNetwork Merchant Support Center, which requires Java® ME (J2ME) compatible cell phones and/or PDAs, as described at http://www.eprocessingnetwork.com/mobile.html as viewed Jan. 20, 2007.

Other systems involving PINs or other passwords, whose security features can be adapted according to aspects of the present invention, include security systems for automobiles (e.g., PINs for entry or starting of the vehicle), safes (including bank vaults, safety deposit boxes, home safes, lockboxes, etc.), gated entry systems, home security systems (PINs to gain entry, activate or deactivate features, etc.), gun cases, safety features on weapons and weapon systems, security portals in public or private buildings, airport security systems and aircraft access, computer-controlled systems of all kinds, document security systems, wireless locks such as the wireless locks of Schlage Lock (Colorado Springs, Colo.), and the like.

For embodiments in which login or access to an asset can be achieved through a single interface without the use or peripheral electronic or security devices such as additional OTP card or tokens, the use of primary and secondary passwords can be considered as two-part or multi-part authentication systems using a single hardware system (e.g., the system used for logging in or gaining access to asset), or, in other words, a "single device" multi-part authentication system.

In some other aspects of the present invention, relatively non-secure information such as a Social Security number is modified to serve as a limited-use password that can be configured by a user via a security administration system. In one approach, for example, a relationship between a government agency and a security administration system allows a new pseudo-Social Security number or pseudo-user credentials for limited use with third parties to be associated with the actual Social Security number or other user credential information required by the government agency, with substantially reduced risk that a hostile party gaining access to the pseudo-Social Security number or pseudo-user credentials could perpetrate fraud with such information, since it is not valid identity information per se and can only be recognized as valid according to rules and restrictions crafted by the user using, for example, an administrative security system of the present invention.

Thus, as an extension of the password protection aspects of the present invention, another aspect of the present invention includes a system for providing a user with a Limited Use Credential (e.g., a pseudo-Social Security number or Limited User Social Security number) from an authorizing agency (e.g., the IRS) to share with a third party in place of a permanent unique credential from the authorizing agency (e.g., to be used when accessing the account or associated services such as technical support or consumer services), comprising:

(a) a security service server;
(b) a user interface for accessing the security service server adapted to receive and transmit to the security service server personal user information and one or more specified third parties for whom a Limited Use Credential is requested;
(c) an authorizing agency server in communication with the security service server, the server adapted to operate a Limited Use Credential generator for assigning a Limited Use Credential to a user for use only with the one or more specified third parties; and
(d) an authorizing agency database in communication with the authorizing agency server for linking user information with the Limited Use Credential and the one or more specified third parties, wherein the user information comprises the permanent unique credential from the authorizing agency.

The system may further comprise fraud detection means wherein attempted transactions or reported information associated with the Limited Use Credential but not reported by one of the one or more specified third parties is flagged for investigation as a potentially fraudulent matter.

Also within the scope of the present invention is a method for providing a user with a Limited Use Credential from an authorizing agency to share with a third party in place of a permanent unique credential from the authorizing agency, comprising: providing a user with a permanent credential from the authorizing agency; receiving from the user a request to provide a Limited Use Credential for use with one or more specified third parties; generating a unique Limited Use Credential; storing the Limited Use Credential in an authorizing agency database, wherein the Limited Use Credential is also associated with user information, the permanent credential, and the one or more specified third parties; and providing the user with the Limited Use Credential for use with the specified third parties. Thus, within the scope of the present invention is a security management system for providing controlled access to a secure electronic account accessible via an electronic account access interface in communication with an account server, the security management system comprising an administrative interface for defining security rules for governing account access via the account access interface, the security rules being stored on the account server or on a machine readable medium in electronic communication with the account server, wherein the administrative interface allows an authorized user to customize the security rules to provide different levels of account access responsive to entry via the electronic account access interface of user credentials comprising a user ID and either a primary password or a secondary password selected from one more secondary passwords, and wherein the administrative interface provides the option for selecting a deliberate error to serve as a component of a primary password, wherein the administrative interface further comprises means for providing the authorized user with a Limited Use Credential from an authorizing agency to use in accessing the electronic account or associated services, the Limited Use Credential taking the place of a permanent unique credential from the authorizing agency.

The method may further comprise providing a fraud detection filter to identify attempted use of the Limited Use Credential with respect to a party other than one of the one or more specified third parties as a potential fraud. Thus, if the Limited Use Credential uniquely associated with, say, an employer of the user is stolen by someone within the company or a thief gaining access to company records, and the thief attempts to use it to gain access to a bank account or other assets of the user, the entry of Limited Use Credential into a banking system or other asset protection system can be recognized as an invalid Limited Use Credential possibly associated with fraudulent activities.

Another aspect of the systems and methods of the present invention pertains to means for improved credit card security involving the use of verification codes. In placing orders with credit cards, the user typically must provide the merchant with the user's name as written as displayed on the card, the account number, the expiration date, and optionally a non-embossed verification code (or verification number) on the back of the card known variously as the CVV2 (Visa), CVC2 (MasterCard), or CID (American Express) code, which may be a three- or four-digit number. The verification code is increasingly being used to provide added security for online transactions, telephone transactions, as well as some transactions at a retail establishment or other facility. Because credit card companies do not allow the verification code to be stored with other credit card information, it is much more difficult for thieves to obtain this number. Nevertheless, there is the possibility that a thief may obtain the code by stealing a card, observing a card, overhearing a telephone conversation, observing computer actions with spyware, or by conducting scams in which a cardholder is asked to give a purported credit card representative or government agent the verification code. To increase the level of security provided by the verification code, methods of the present invention may be applied.

In one version, the printed verification code on the rear of the credit card as printed actually serves as a secondary password to indicate that predetermined security measures may be needed, such as limiting the amount that can be spent, sending a security alert, or even inactivating the card immediately or after a period of time, or to provide feigned access in the sense that an apparently authorized transaction (from the perspective of a user) is not actually authorized. The primary password for full access by the card may require a hidden action in addition to entry of the verification code, or may comprise a covert password component not displayed or not readily recognizable on the card. The covert password may be used instead of, in addition to, or in conjunction with the printed verification code to create a primary password for full access. Further examples of the use of modified verification codes and related tools are described hereafter.

In other embodiment of the present invention, an administrative graphical user interface is provided by a central service for administering an electronic security system that provides an asset access graphical user interface controlling access to a protected asset through the use of a primary password, the administrative graphical user interface comprising:

a) user authentication means for entry of administrator credentials, wherein entry of valid administrator credentials identifies an authorized administrator of the security system;

b) a security rule editing function accessible after entry of valid user credentials by the user authentication means, wherein the security rule editing function provides a display of security rules governing the response of the security system to attempted user access via the asset access graphical user interface and provides means for customizing the security rules, wherein the security rules can be edited to define a response of the security system to an entry in the asset access graphical user interface of one or more of a covert password component required for acceptance of a primary password, the absence of a covert password component required for acceptance of the primary password, and at least one predetermined secondary password other than the primary password.

The aforementioned administrative graphical user interface may, for example, be used in managing security for a credit account, wherein the asset access interface is associated with a Web-based payment processing system, and wherein one or more of the primary password and the at least one predetermined secondary password comprises a covert password component. The aforementioned administrative graphical user interface may also be operable associated with a Limited Use Credential generation service, wherein the user credentials required by one or more of the asset protection services may contain sensitive information that must be shared with an external agency. In one embodiment, the administrative graphical interface is provided by a first party and the electronic security system is provided by a second party, the first party and the second party each having an independent relationship (which may be contractual, based on a legal requirement, or a collaborative agreement, etc.) with an external agency, and wherein the user credentials comprise a Limited Use Credential used in place of a sensitive information item that is normally shared by the second party with an external agency, wherein the Limited Use Credential is agreed upon between the first party and the external agency as an acceptable substitute in place of the sensitive information item if provided by the second party or other agreed-upon party, but wherein the Limited Use Credential is not accepted as a valid substitute in place of the sensitive information item if provided by a third party outside the scope of the agreement between the first party and the external agency.

DETAILED DESCRIPTION OF EXEMPLARY EMBODIMENTS OF THE INVENTION

Definitions

Figure 1:
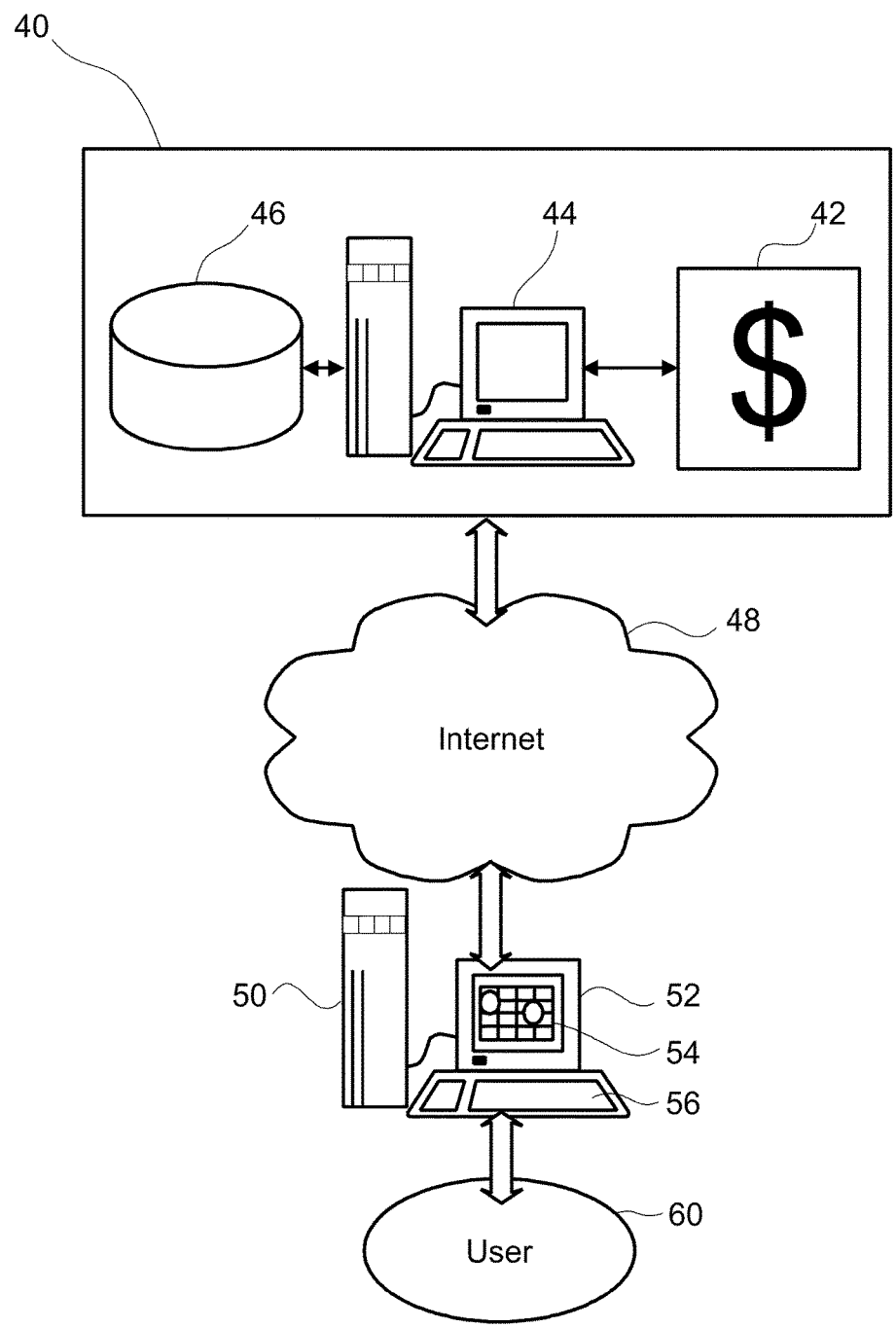
FIG. 1 depicts a security system operated by an agency for protecting an asset, according to the present invention.

As used herein, "password" refers to credential information comprising a shared secret that allows authentication of a user's security privileges regarding an asset by conveying the shared secret or related information to a security system.

A password can be or can include a PIN (personal identification number). Passwords are commonly entered as a string of alphanumeric characters, but can also include other means of authenticating a user or providing secure access For example, for the purposes of this invention, the combination used to access a safe or other lock system with numerical or alphanumeric input can be considered a password. Passwords can also be in the form of identifying sounds (e.g., spoken words or a predetermined tone or series of tones), identifying motions (e.g., hand gestures or facial expressions to be read by a machine vision system), or particular taps or motions of stylus, such as the Picture Password security software of SoftAva (Novosibirsk, Russia) for PDAs, which allows a user to tap certain points of picture to create a unique input that can serve as a password rather than alphanumeric strings. Passwords can include two or more components, such as a static user password plus a machine-generated password to form a single two-part string. Alternatively, the two-parts can be entered separately or can even comprise different input types, such as a machine-generated digital string and a speech-based password, or a machine-generated string plus a motion-based password or picture-based password (e.g., one that is tapped by a user on key parts of a picture). In one embodiment, however, passwords or any of the overt or covert components of password may be restricted to alphanumeric strings.

As used herein, a "primary password" is a password that, for a given user ID, can provide full or a relatively high level access to the user's asset (e.g., the user's account, etc.). Generally, a primary password provides the highest level of access normally available to the user for a particular mode of access (e.g., Internet access, live on-site access, telephone access, etc.). In many cases, the primary password is the password that the user would normally use when there is no security risk during access of the asset. "Access" in this context refers to the privileges granted relative to the asset, such as the ability to execute transactions including selling all or part of the asset, transferring it, transferring ownership, using it, entering it (where applicable), changing its location, viewing sensitive information, etc.

As used herein, a "secondary password" is a password that, for a given user ID, provides less than full access to the user's asset, and typically provides substantially limited access or may provide feigned access (simulated access).

As used herein, a "hidden action" refers to an action taken during login, account access, account use, or some other phase of accessing or attempting to access an asset, which covertly conveys information relative to user credentials or the security status of a user, such that an observer is unlikely to recognize that such information has been conveyed. The hidden action may be or may comprise part of a covert component of a primary password or secondary password. In some cases, the hidden action involves a detail in the use of graphical user interface, such as precisely where a cursor is with respect to a button when the mouse is clicked, or details of the time when the mouse if clicked (e.g., when the displayed seconds of an on-screen clock ends with the number "5"), or how the cursor is moved on the screen (e.g., making a loop around a graphical element before or after logging in), or how an error is made and corrected (or deliberately made and not corrected) in a challenge and response system, etc. For example, the hidden action may involve a response to an alert box that arises after login having "OK" and cancel buttons. The hidden action may require clicking on a particular region of the dialog box, or depressing a mouse button for a fixed period of time, or pressing another key on the keyboard, or making a particular motion of the cursor relative to some part of the screen, etc. The system may be configured to provide hidden authentication steps at random or determined intervals. In other cases, the hidden action can involve spoken commands, such as the choice of words in answering a question or some other secret convention that is expected to login with full access to an account, or can involve physical actions of many different kinds.

As used herein, "limited access" refers to access in response to a secondary password or in response to an alarm input such that the degree of access to an asset or functionality of the asset is less than when the primary password is used. An ATM that can dispense a maximum of $50 from an account accessed via a secondary password, for example, would represent a case of limited access if a greater amount could be withdrawn using the primary password. Access to an asset may be limited in terms of duration of access (e.g., a vehicle that malfunctions within a predetermined time or after a predetermined distance has been traveled), usability or performance (e.g., features disabled or limited, such as a vehicle that cannot accelerate above 20 miles per hour, or an email account that cannot display sent email, the address book, email in selected folders, email from selected parties or dealing with selected topics, or email sent or received during selected times or dates, etc.), type of transactions that may be executed (e.g., a credit card or ATM card with a limitation on what banks or companies the card may be used with, or a brokerage account that only allows selling of securities at limit prices above the current market price but does not allow purchases to be made), geographical restraints (e.g., a credit card that may only be used for businesses within a predetermined geographical region, such as the city of Austin, Tex. only), requirements for additional supervision or authentication (e.g., transactions that cannot be executed with a second authorization or without subsequent approval of an administrator, account owner, or of the user under access via a primary password), etc.

As used herein, "feigned access" refers to apparent or simulated access to an asset to induce a potentially unauthorized user to believe that a desired level of access has been granted, when in fact it has not. Feigned access can be provided in response to logging in with a secondary password or, during or after login, proving a security signal designating an insecure setting. Feigned access can include, for example, providing a computer interface for online account access that appears to permit access to sensitive information, when actual sensitive information has been concealed and what is displayed is less sensitive or bogus information (e.g., a sham account). Feigned access of an owner's account can also include an asset belonging to an owner accessible via a computer interface, by telephone, or by verbal or written commands to an agent, wherein, in response to a security signal, access by an attempted user appears to be provided, but wherein transactions that appear to be completed do not directly affect the owner's asset. This can include, for example, access to a blog or Website wherein a user employing a secondary password appears to have gained access sufficient to modify the performance of the site or to alter content (e.g., to upload, delete, modify, or create Web pages or blog entries, or any combination thereof), but wherein the apparent changes made are in fact not made to the actual Website (e.g., only displayed on the user's interface), or are made for only a brief period of time and then are automatically reversed to restore the site to its prior condition. Feigned access can also include the appearance of gaining access to the contents of safe, when selected items remain hidden or inaccessible.

As used herein, an "overt" password component refers to password information via an interface or password entry system in which an observer could readily recognize that a password is being used, even though the password itself may be difficult or impossible to identify. For example, a login page with a field marked "password" provides a clearly recognizable request for entry of password information, and when a user types a password string in that field, a nearby observer could readily detect that a password had been entered. Likewise, when a telephone operator for an account asks a caller for user identification information such as an account number, a Social Security number, and the mother's maiden name, an observer (in the audible sense, such as a listener using a wiretap, another party on the same phone line, or a nearby person overhearing the user's telephone conversation), would recognize the spoken text as credential information providing a shared "secret" (in spite of the low security often provided by the shared secret information many account administrators require for telephone access, with easily-available Social Security numbers or combinations of account number and home address being common examples) that could be used by an authorized party to gain access to an account using a telephone.

As used herein, a "covert" password component refers to security-related information that is not readily recognized as such by an observer. The covert password component can include hidden actions of the user that can be recognized by an automated system or human agent associated with the administration of the account, wherein recognition of the hidden action or other covert component can either provide additional credential information for the user or can convey security related information, such as information indicating that the account is being accessed under insecure conditions. In the latter case, the covert password component in combination with overt password components (overt credential information) can be recognized as a secondary password according to the present invention, and may thereby automatically invoke preconfigured security rules associated with the secondary password to reduce the potential risk of account access under insecure conditions.

As user herein, a password or user credentials in general can be "recognized" by an electronic device or automated system when the provided password or user credentials matches one that is stored in memory or otherwise stored in hardware or software, wherein the provided password or credentials are distinguished from other inputs that may be random, erroneous, or unauthorized. In one version, recognition need not involve electronics or computer memory, but can also involve mechanical devices such as the hardware of a combination lock that "recognizes" a correct combination, allowing a user to open the lock. Alternatively, in a partially automated system, recognition may nevertheless be done through interaction with a human operator who can distinguish correct and incorrect credentials or passwords.

As used herein, a "security input" is any input provided at least in part by a user to gain access to an account, complete a transaction, or authorize other actions. The security input can include a password, a physical signature, an electronic signature, or other means of identifying the user and verifying the action being authorized. An example of a non-password security input is a signature on an electronic signature pad used for credit card transactions. A security input can be a primary security input, such as when it includes a primary password to provide full access for a user, or it can be secondary security input when it includes a secondary password to provided limited or feigned access to an asset.

As used herein, an "asset" can refer to an object or group of objects such as one or more of the contents of a safe, a vehicle or home, money in either physical form or electronically or manually represented in an account, stocks, bonds, futures, financial derivatives, other electronic representations of value such as points or digital assets representing real or virtual items having value, etc. Assets can also comprise information such as financial data in an electronic account, email messages in an email account, multimedia content in a database, contractual information, business plans, business information, data in a database such as name and address information of clients, etc. An asset can also refer to a service that provides some form of value to a user, such as an online account providing music, movies, translation services, proprietary business or technical information, services for selling and buying, auction services, travel reservation services, administration of a Web site or blogging account, copyrighted information or digital content, works of art, consulting assistance, voice mail, etc. Assets can also refer to either tangible or intangible items, a mixture thereof, or items having both tangible and intangible aspects.

As used herein, a "secure system" can be any account or, more broadly, any asset, that is restricted in some way with a security system controlling access to the account or asset, such as in terms of who can gain access to the asset or in terms of the extent of access provided to others, typically with the objective of excluding unauthorized users completely or to some degree. Secure systems can be protected with passwords, including complex passwords comprising multiple items of information associated with user credentials, including shared secret information and optionally including covert components such as hidden actions forming or providing shared secret information and other measures to limit access or restrict the extent of access. Secure systems can include electronic accounts such as bank accounts, credit card accounts, brokerage accounts, email accounts, VPN systems, Internet accounts, Intranet systems, computers themselves such as laptops, other electronic devices such as PDAs and cellular phones, secure storage systems such as safes, vaults, and security boxes, particularly those requiring input of a combination or other form of password to gain entry (optionally in combination with use of a key or other physical security device), automobiles and other devices equipped with Electronic Combination Entry systems, and the like.

As used herein, a "safe" is meant to include any physically locked enclosure or container for securing goods, and can include vaults, security boxes, securely locked cabinets, and objects marketed as safes for home and business, particular containers requiring entry of mechanical or electronic combination. Examples of safes with electronic combinations locks are disclosed in U.S. Pat. No. 5,847,656, "Electronic Combination Lock with High Security Features," issued Dec. 8, 1998 to G. L. Dawson et al., the portions thereof describing electronic combination locks being herein incorporated by reference to the extent that they are noncontradictory herewith, and U.S. Pat. No. 7,003,991, "Security and Locking Mechanism for a Double Door Utilized in a Security Safe, Vault or Bunker," issued Feb. 28, 2006 to K. Alizade, the portions describing keypad locks, modular panels, a keypad combination members, and FIGS. 1A, 1B, and 1C being herein incorporated by reference to the extent that they are noncontradictory herewith. Mechanical combination locks are described in U.S. Pat. No. 4,532,870, "Safe Apparatus," issued Aug. 6, 1985 to G. D. Hayman, the portions of which describing mechanical locks being herein incorporated by reference to the extent that they are non-contradictory herewith.

As used herein, an "alarm input" can be a password or security input that deviates from the standard password or security input used by the user, wherein the deviation follows predetermined rules to automatically indicate that an exceptional situation is in force that requires special action. The alarm input can comprise acts or signals other than the password that is entered, and can include vocal cues, length of time spent or force applied when depressing a button on an entry pad, speed of entering the password (e.g., over 1 second pause between the first three keys entered followed by a very short pause before the last key), the pressing of a selected key such as the Windows button immediately after or before login, or failure to press a particular key immediately after or before login, and so forth. In one sense, the actual user password coupled with an alarm input can form a secondary password, or a standalone emergency password can be combined with additional alarm inputs. For the case of safes, an alarm input can be provided through the use of a secondary password (combination) or a standard combination coupled with an additional alarm input that can be conveyed, for example, by the length of time between two actions, the force used to open vault, the position of handle, etc. More than one alarm input may be available to allow the user to select available options (e.g., do or do not open back panel, turn power off, activate alarm, etc.).

As used herein, an "alert signal" can be any signal that conveys a message to one or more people or to potential bystanders indicative of an emergency, of a potential crime or unauthorized access, or of a situation requiring assistance. For example, an alert signal can an audible alarm such as a siren, whistle, or buzzer or it can be include flashing lights or other visible signals, as well as tactile signals such as an intense vibration of an object to alert a security guard of a security problem. An alert signal can also comprise an automated communication sent to a third party indicating a possible emergency situation (e.g., text messaging or other communication means), an electronic message sent to a designated recipient indicating a possible emergency situation, a signal sent to an electronic security system protecting other assets, and a surveillance activation signal sent to a surveillance system to request increased monitoring of the security system or its environs. An alert signal can also include a signal sent to another security system to limit escape of a thief, to prevent theft of other assets, to release guard dogs, etc.

Automated systems capable of providing an alert signal include those of U.S. Pat. No. 6,496,111, "Personal Security System," issued Dec. 17, 2002 to R. Hosack, herein incorporated by reference. As described therein, the security system of Hosack has a base unit that includes a wireless telephone transmitter and receiver and a computer unit. The computer unit has a memory for storing an emergency phone number and an outgoing message. The security system is activated by a voice command such as "fire", "help" or "police". When the voice command is detected, the computer unit will activate on audible alarm and cause the wireless telephone transmitter and receiver to connect to the location callable by the emergency phone number and to transmit the outgoing message.

As used herein, "transaction" refers to any action resulting in a change in status of an account or elements associated with the account, such as the transfer of funds, a purchase, a change in status of an item controlled through the account (e.g., canceling the "for sale" status of an item on the market, or a deadline, or other aspects of items in an account), the use of credits in an account, etc. When discussed in terms of assets rather than accounts, "transaction" may also refer more to a change in status of an asset that can affect the value of the asset, particularly the value available to the owner of the asset at the time the transaction is commenced, such as actions that physically alter the asset, change its location, its ownership, or its functionality.

As used herein, an "account" refers to a business relationship between two entities, and can include the record of the debits and credits pertaining to a person or business, or a means of managing assets and transactions of assets between two or more parties, such as an account with a stick brokerage to allow a user to purchase and sell equities, or an account with a bank holding funds of the user, or an account with an online business allowing the user to order work or make purchases. An account can also refer to a relationship that provides access to a service such as access to digital content or other information, restricted programs, consulting services, financial services, etc. In some versions of the present invention, an account requires some means of authentication the credentials of the user in order to provide access to account information or to make transactions pertaining to the account. In many cases, an account can be considered to be an asset or to provide access or control over assets.

As used herein, an "authorizing agency" is any agency that issues, controls, or regulates credentials for users (individuals, corporations, or other entities), wherein the credentials are used by third parties to identify the user and track user actions, typically with communication of user information back to the authorizing agency for regulatory, audit, enforcement, or other purposes. In the United States, the IRS is an example of an authorizing agency in which the Social Security number, for example, is a credential that is used by third parties (e.g., employers and banks) in reporting information back to the IRS for tax enforcement purposes.

In the following description, it is to be understood that when two or more options are listed as options for a feature of system, method, device, or other aspect of the invention as claimed, that it is within the scope of the invention to exclude any one or more of the listed options, whether the possibility of such an exclusion is specifically called out in the specification or not. For example, if a claim to a system of the present invention cites an access interface, and the specification indicates (as it does) that an access interface can include any of a graphical user interface (GUI) for a computer, a GUI for a cell phone, a GUI for an vehicular control system, a tactile interface, a verbal interface involving a human operator aided by a computer, and a verbal interface involving an automated telephony system, then it is to be understood that a claim expressly excluding the verbal interface involving a human operator, or any one or more of the listed options for the access interface, is also within the scope of the claims and should be considered as if express language had been included providing support for variations of the claim that exclude any one or more of the listed options. Therefore, it is to be so understood that for such a claim citing an access interface, one can find intrinsic support in the specification for a limitation such as "wherein said access interface is not a verbal interface involving a human operator" even if the excision of this option was not explicitly spelled out in the various embodiments of the specification as filed.

Likewise, in expressly providing a range of numerical values for an element of the invention as claimed, it is to be understood that every logically acceptable subset of parameters within that range should be implicitly considered as enabled by the recitation of the original range. Thus, if a text string is said to be anywhere from four to fifteen characters in length, it is to be understood that the range can also include various subsets of that range such as from four to ten, from six to fifteen, and from nine to twelve. Likewise, if the weight of an object is said to be from 10 to 500 grams, it is also to be understood that the stated range provides support for other ranges such as from 10 to 25, from 100 to 300. Such subsets naturally include integral values (whole numbers), but can also include other ranges, such as from 55.9 to 126.8.

DETAILED DESCRIPTION

Reference will now be made to several embodiments of the invention, with examples described herein and illustrated in the drawings. While the invention will be described with respect to these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention. Further, the advantages of any one embodiment or group of embodiments need not be realized by any single claim of the invention, but are described or implicitly indicated to express the potential of some aspects of the invention and should not be interpreted as implicit limitations to be necessarily applied to any one or more of the claims. Likewise, presentation of any specific detail in any described embodiment, example, or drawing should not be interpreted to limit the claimed invention beyond stated language of the claims, but should be understood to be merely one example of many examples within the scope of the invention as claimed.

In describing methods or other particular embodiments of the present invention, it will also be recognized that the invention can also be defined in terms of an apparatus or system, and/or as software code for implementing the method, or for use in the system, and/or as portions of such software code, in all their alternatives described herein.

Turning to the figures, FIG. 1 depicts a security system 40 operated by an agency for protecting an asset 42, here depicted with a symbolic representation of money, but understood to potentially be any asset that individuals, organizations, or other entities may wish to protect with a security system. The security system 40 comprises a security server 44 in electronic communication with a security database 46. The security server 44 controls access to the asset 42 using security software (not shown) on the security server 44. The security system 40 can be accessed by a user 60 over the Internet 48 or other network means. The user 60 can employ a an electronic device 50 (or other embodiment of a client) such as a computer comprising an electronic display 52 providing a graphical user interface 54 and user input means 56 such as a keyboard, though it is understood that other variations can be used instead such as a voice-recognition input system (not shown). To access the assets 42, the user 60 can provide a security input (not shown) via the graphical user interface 54 to convey the security input to the security server 44, the security input comprising user credentials (not shown) such as a user ID and a password. The user ID and password can be compared to information in the security database 46 to determine the level of access, if any, the user 60 may have to the asset 42. Specifically, according to predetermined security rules (not shown) in the security system 40, the password may be interpreted as a primary password for a first level of access (not shown), a secondary password for a second level of access substantially less than the first level of access, or an invalid password with access denied. (Denial of access does not require that an unauthorized user is physically removed or electronically completely cut off from the system, but that the level of access sought through entry of user credentials is not provided, and typically is a level of access no greater than is available to any unauthorized or unrecognized party, such as a "guest" account.) Further, in response to receiving a secondary password, various security actions may be automatically executed (not shown), according to preconfigured rules established by the user and stored in memory on the security server 44 or security database 46.

Figure 2:
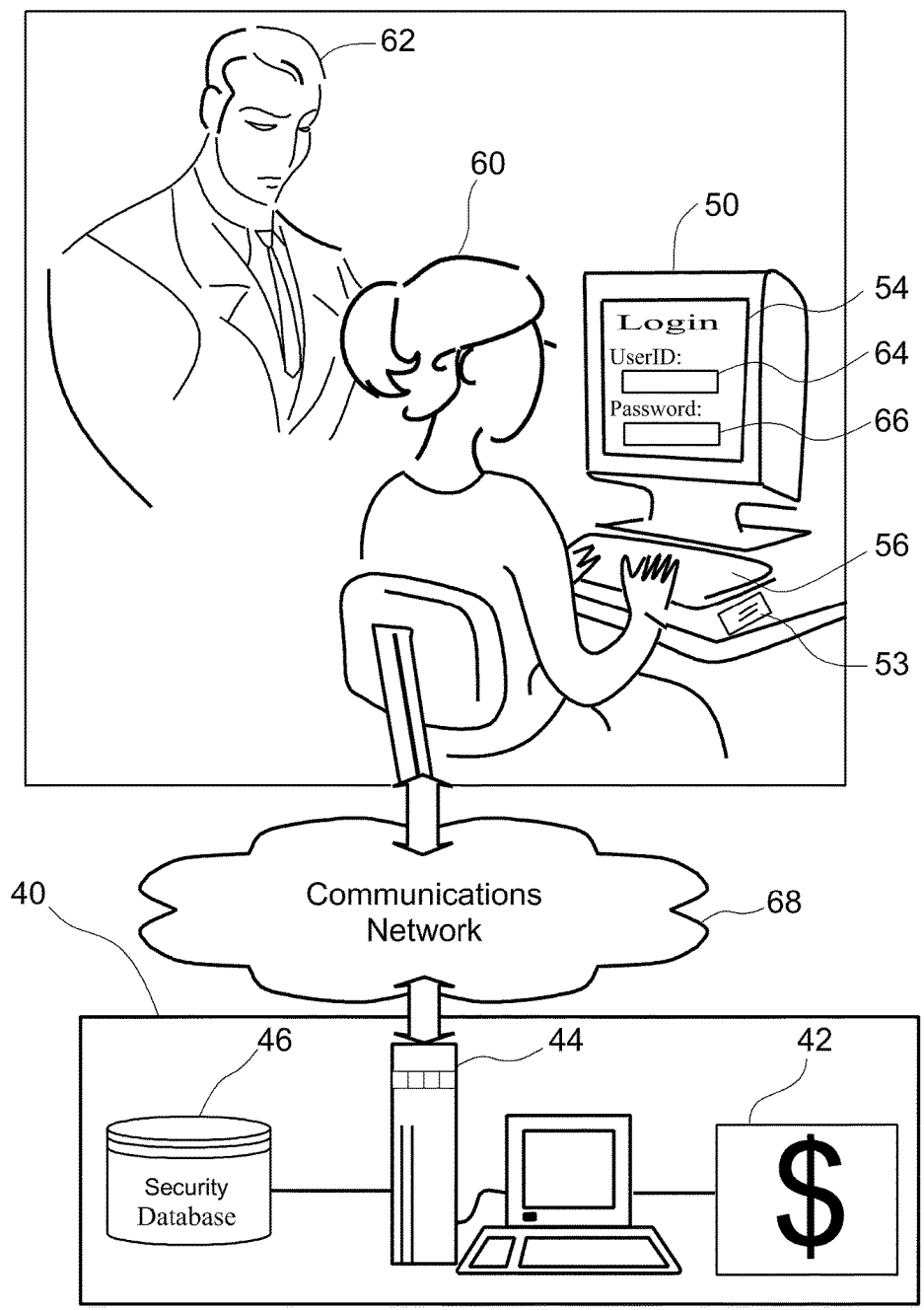
FIG. 2 depicts a setting in which some systems of the present invention may be useful in enhancing security

FIG. 2 depicts a setting in which some systems of the present invention may be useful in enhancing security. A user 60 interacts with the graphical user interface 54 presented by the electronic device 50, shown here as a computer but it is understood that it could also be a portable device such as a personal digital assistant, an iPod device of Apple Computer (Cupertino, Calif.), a cell phone (including smart phones with computer operating systems, contactless payment features, etc.), a terminal of any kind in communication with a client server, etc. As depicted, the graphical user interface 54 provides a user ID field 64 and a password field 66, wherein the user 60 can enter user credentials such as the user ID and a password, respectively, via user input means 56, shown here as a keyboard. The user 60 faces a security risk posed by the presence of a potential observer 62, shown here as a person in the immediate vicinity of the user 60, such as a coworker or peer looking over the shoulder of the user 60 as she types in user credentials. Alternatively, the observer 62 could be a remote party observing the user 60 via a hidden camera, or using electronic means to monitor keyboard input, or, in alternative cases in which the graphical user interface 54 is replaced with an audible interface (not shown) for interaction with a telephone system (also not shown), the observer could be an eavesdropper, a wiretapper, etc. The observer 62 also could be a hostile party placing the user 60 under duress, compelling the user 60 to use the security system 40 to access the asset 42.

The user 60 may wish to access the security system 40 to obtain proprietary information or make transactions related to the protected asset 42, without taking the risk that the observer 62 may be able to also gain access to the asset 42 (e.g., be able to make transactions or obtain proprietary information associated with the asset), or may wish to make only feigned access to the protected asset 42. According to some aspects of the present invention, the user 60 may be able to access the asset 42 or portion thereof via, or produced feigned access, via the security system 40 by entering a password in the password field 66 that is different than the password normally used by the user 60 in a more secure setting. The entered password can be a one-time password or a secondary password (not shown) that may also be a one-time password or limited-use password (e.g., a password that remains valid for a limited time period or limited number of uses), and that provides limited or feigned access to the asset 42, according to rules defined in a security database 46 (labeled as a PIN Safety Database) accessible via a security server 44 that the user 60 communicates with from the electronic device 50 via a communications network 68, which may be the Internet or other network system. In one embodiment, entry of the user credentials via the graphical user interface 54 may also comprise the option of providing a covert password component (not shown) in addition to the overt act of entering a password in the password field 66. The covert component may involve details of mouse motion (not shown), timing of keystrokes, deliberate correction of an error, or other hidden actions not readily perceived by the observer 62 as a means of providing additional information to the security server 44. The covert component or lack thereof can be interpreted to indicate that the user 60 is accessing the system in an insecure setting, and to accordingly invoke security measures defined in preconfigured security rules previously entered by the user 62 and stored in the security database 46. Such security measures can include decommissioning of the overt password entered in the password field 66, requiring the user 62 to later access an account administrator (not shown) or take other measures to reset the overt component of a password. Alternatively, the security measures can include providing limited or feigned account access, or having the security server 44 provide a feigned system failure shortly after logging in, etc.

In one embodiment, the user 60 may optionally use a portable electronic device 53 capable of generating a one-time password that can be displayed on the electronic device 53 and then entered manually in the password field 66, optionally in combination with a memorized password component, for two-factor authentication. In one version (not shown), the electronic device displays a secondary password component or invalid password by default, but can temporarily display a component of a primary password in response to an external factor provided by the user 60, such as depressing a specific region of the portable electronic device, entering a PIN into PIN input means on the device, holding the device in a predetermined manner, applying a finger tip for a fingerprint read, shielding a photosensitive region of the card, and so forth. The portable electronic device may be a battery-powered electronic card, a fob or other small device with digital display such as an LCD screen, or a portable computer device such as a personal digital assistant, cell phone, or laptop computer. However, in one embodiment, the electronic device is not a portable computer device such as a personal digital assistant, cell phone, or laptop computer.

Figure 3:
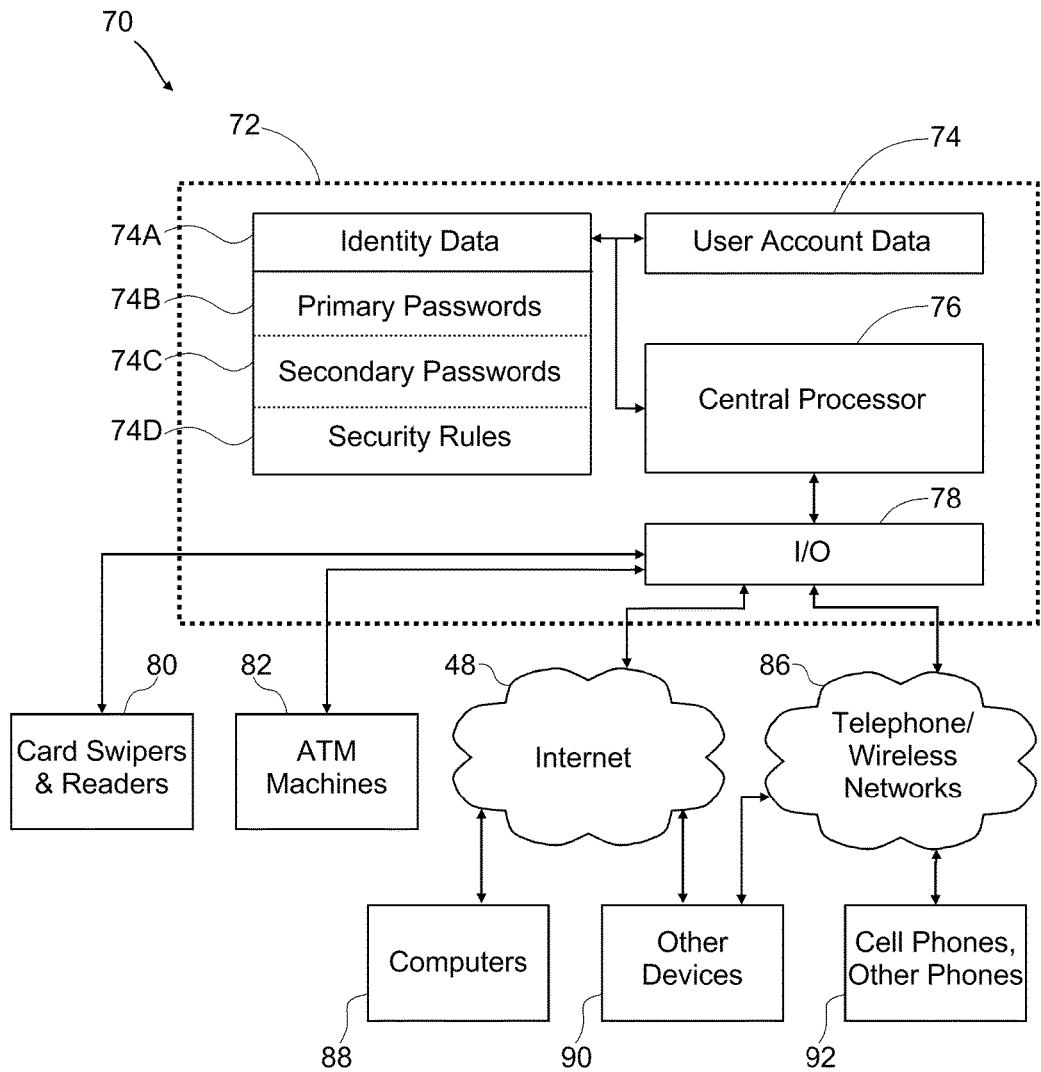
FIG. 3 depicts a central security system for protecting an asset and for managing a variety of means for accessing the accessing, wherein primary and secondary passwords can be used.

FIG. 3 is a block diagram depicting objects involved in a security system 70 of the present invention, including a central system 72 comprising user account data 74 readable by a central processor 76 operably associated with an I/O device 78 for communicating with other objects and systems. The user account data 74 includes records comprising identity data 74A (e.g., user account numbers, user name, user address, user telephone numbers, Social Security number, etc.), one or more primary passwords 74B, one or more secondary passwords 74C, and security rules 74D to be implemented in response to use of the one or more secondary passwords 74C and/or the one or more primary passwords 74B. The security rules 74D can be provided as directions through the central processor to govern the degree of access it permits relative to an asset (not shown). The I/O device 78 can receive and transmit information with a variety of other objects and services, such as card swipers and readers 80, ATM machines 82, computers 88 or other devices 90 via the Internet 48 (or other communication networks), and cell phones or other phones 92 and other devices 90 via telephone or wireless networks.

In the security system 68, the central processor 76 may govern acceptance of user credentials presented by any means to the central system 72, including interpretation of user credentials as primary or secondary passwords according to the information in the user account data 74, and can then implement corresponding security rules 74D.

Figure 4:
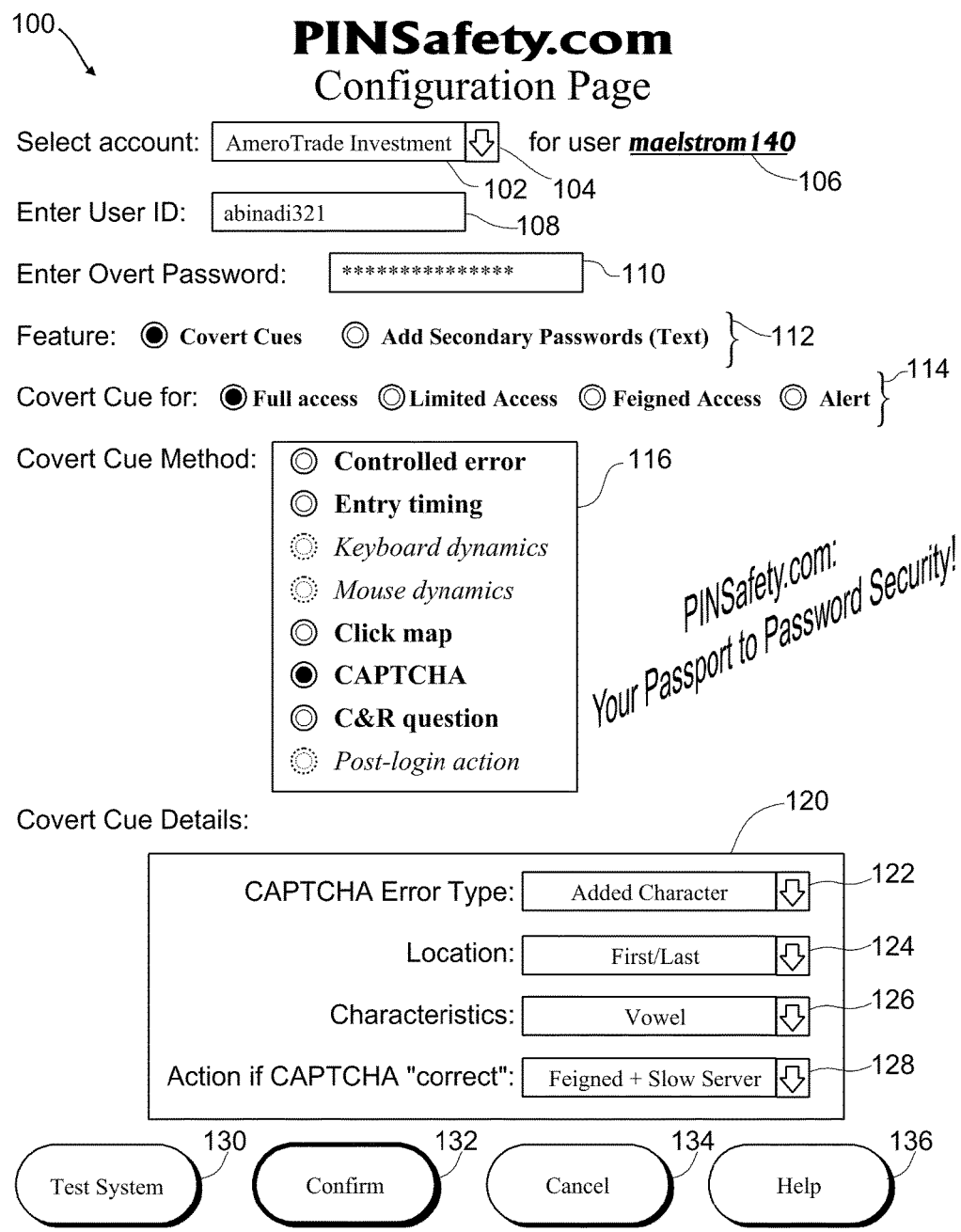
FIG. 4 depicts a portion of an administrative interface showing a configuration page for a security management system for defining security rules for a secure electronic account.

FIG. 4 depicts one portion of an administrative interface showing a configuration page 100 for a security management system for defining security rules for a secure electronic account. Though innumerable interface designs could be considered, the depicted embodiment shows a configuration page 100 of a Web-based administrative interface accessed through a proposed Website, PINSafety.com. The portion of the administrative interface shown contains account selection means 102, shown here as a dropdown box with a variety of predetermined accounts to select, wherein a button 104 on the dropdown box provides access to alternate choices. Here a hypothetical account, "AmeroTrade Investment" has been selected, indicating that the user has selected a particular online brokerage account, for example, for customization of security rules. The configuration page 100 may provide control over an arbitrarily large number of accounts belonging to or accessibly by the user, or may be for a single account. A PINSafety.com user ID field 106 shows the user ID used to login to the administrative service, here hypothetically depicted as maelstrom 140. For the selected account, there is an account-specific user ID shown in the user ID field 108. This field may be automatically populated from stored information when the account is selected by account selection means 102, or may be entered by the user to provide or update that information. For the particular user ID for the selected account, there is an overt password that is entered into the overt password field 110. The overt password represents the text string that the selected account requires to be entered for access by the user using the designated user ID. Using the configuration page 100, the overt password may be coupled with covert components to define primary or secondary passwords, in effect, or may be one of several passwords each assigned various access levels. Display of the actual characters of the overt password may be suppressed, as shown, or, if desired, the overt password can be displayed or provided by email or other means if forgotten. For security purposes, overt display of the password in the overt password field 110 may generally be undesirable.

Beneath the overt password field 110 is a feature selection area 112 in which the user can select security features to add to the security system associated with the selected account. Though many such features are possible, two are shown are provided with radio buttons for selection, namely, an "covert cues" feature and a "add secondary passwords" feature. The "covert cues" button has been selected in the features selection area.

In response to selecting "covert cues", additional content has been displayed on the configuration page 100 of the administrative interface, providing a covert cue specification area 114 with various radio buttons to specify what the covert cue will signify when coupled with the primary password. These significations include "full access" (meaning that use of the specified covert cue coupled with the overt password will constitute a primary password providing full access or a relatively high level of access to the asset), "limited access", "feigned access", and "alert" (indicating that a security alert should be issued should the covert cue be received). Here, "full access" has been selected in the covert cue specification area 114.

Also shown is a covert cue method selection box 116, allowing the user to select from a variety of covert cue methods. The methods depicted in this particular version of the covert cue method selection box 116 include controlled error (meaning a deliberate error and correction scheme), entry timing (meaning, for example, that additional information is conveyed by the timing of an action during login), keyboard dynamics (shown in italics suggesting that it is not available for the selected account, or perhaps not available until the user downloads additional software, obtains required hardware or modified other settings), mouse dynamics (referring to actions of the mouse before, during, or after login, also shown as not available for the selected account), a click map (referring to clicking the mouse when the cursor is over a particular element on the screen), CAPTCHA (referring to covert information conveyed in the use of a CAPTCHA system, such as entering a deliberate error of a predetermined kind in the response to a CAPTCHA system), a C&R questions (challenge and response, also possibly dealing with a deliberate error or other hidden actions associated with a response), and a post-login action (referring to actions taken by the user immediately or shortly after logging in to confirm identity and ensure full access). Naturally, many other options could be considered, and a much longer list could be envisioned. The list shown here is for illustrative purposes only.

The selected item in the covert cue method box 116 of this example is the CAPTCHA radio button. In response, the covert cue details region 120 is populated with CAPTCHA-specific information such as a drop-down box to select the CAPTCHA error type 122, showing "added character" as the selected option, indicating that in entering covert information in a CAPTCHA response, an added character is to be inserted rather than entering the "correct" text matching the displayed CAPTCHA image. A location field 124 allows the user to specify where the added character should be placed. The selection of "first/last" indicates, for example, that the added character may be either at the beginning or end of the correct CAPTCHA string. The characteristics field 126 specifies further information about the added character. The selection of "vowel" indicates that any vowel may be used as the added character in the first or last place of the modified CAPTCHA string. Of course, numerous possibilities can be envisioned, such as any specific alphanumeric character, members of various groups of characters, specific digits, etc. A security action field 128 shows what action or actions the user has selected to invoke if a user should enter a "correct" CAPTCHA (in combination with the correct overt password, forming a secondary password, in effect, rather than the primary password formed by combining the overt password with the required modified CAPTCHA). Here the selected actions indicated "feigned+slow server", meaning that feigned account access is provided in combination with an apparent account server slow down to hinder activity by a presumably unauthorized user, without making it easy for the unauthorized user to detect that the full access has not been granted.

Additional buttons below the covert cue details region 120 include a button to test the system 130, allowing the user to see how the selected security rules will perform when the selected account receives and implements the rules defined by the user. The "test system" feature can allow trials to be conducted to debug settings or evaluate the level of security provided. A "confirm" button overwrites previous settings for the selected account with the criteria entered on the configuration page, making the new settings go live relative to the selected account. The "cancel" button cancels the settings without changing what has previously been established in the security rules, and the "help" button provides access to instructions, manuals, online training, live chat help, or other resources to assist a user in implementing a customized security system comprising primary and secondary passwords, optionally with covert and overt components and corresponding security rules responsive to the primary and secondary passwords.

Figure 5:
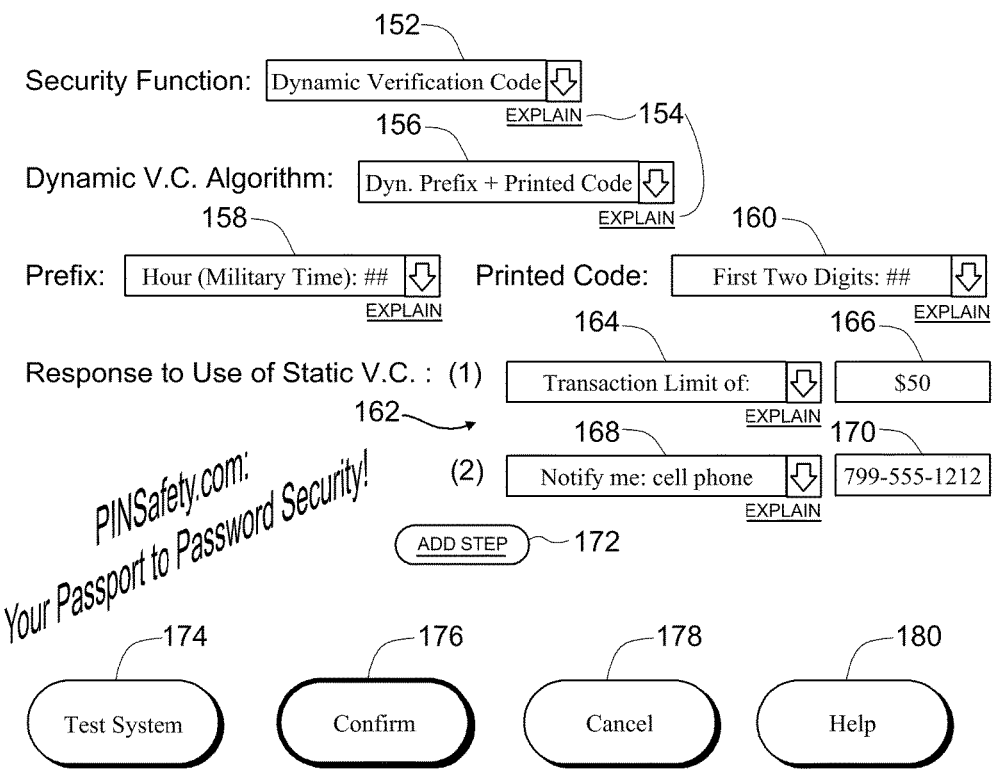
FIG. 5 depicts an administrative interface featuring a credit card security configuration Web page for configuring security rules associated with a credit card, according to some aspects of the present invention.

FIG. 5 depicts a hypothetical embodiment of an administrative interface featuring a credit card security configuration page 150 for configuring security rules associated with a particular credit card (here shown as the "Appleton Bank Card"). A security function selection means 152 (here depicted as a drop down box, though own skilled in the art will recognize that many other controls and input tools can be used instead) allows the user to select which of a plurality of security options will be configured for the card. Here a selection of "Dynamic Verification Code" has been made, indicating that the static verification code printed on the back of the credit card will be replaced with a dynamic or variable verification code for full access to the assets (financial privileges) associated with the card. In other words, the primary password for the card in situations where a verification code is required will comprise a secret verification code not identical to that printed on the back of the card. Such a selection will generally also indicate that use of the printed verification code will be recognized as a component of a secondary password, with associated access restrictions an optional security measures being executed automatically, as configured by the user or other agent on behalf of the user (generally, within the scope of the present disclosure, to say that a security rule is established "by the user" can be understood to comprise the case when an administrator or authorized representative of the user establishes the rule on behalf of the user).

A dynamic verification code algorithm selection means 156 (also depicted as a drop-down box) allows the user to specify which of several algorithms will be used to create the dynamic verification code, which may or may not be directly related to the printed verification code. The selection depicted is "Dyn. Prefix+Printed Code", meaning that the dynamic verification code required for use a primary password component comprises a variable prefix followed by the printed verification code. For selection means 152 and 156, as well as other selection means on the configuration page 150, explanation buttons 154 are shown which can be clicked by the user to bring up information explaining the meaning and use of selections in the selection means 152 and 156. The information may be presented in a pop-up window or any other known means.

Details of the prefix for the dynamic verification code can be selected using prefix selection means 158. The displayed selection is "Hour (Military Time)", meaning that the variable prefix is taken as the current hour in military time (additional selection means, not shown, may specify which time zone is used, or the default may be the time displayed on the user's computer for online account access). Details regarding the use of the printed verification code in the dynamic verification code can be selected in the printed code selection means 160, here shown as "First Two Digits: ##", indicating that the first two digits of the printed verification code are to be used. Thus, in using the credit card at 9:15 pm, with a printed verification code of 4371, the proper dynamic verification code to use would be 2143, based on the military time of 21 hours and the first two digits of 4371. Other options for the dynamic verification code made specify, for example, that minutes rather than hours are used, or any of a large number of options for selection of dynamic strings, including options using digits from prince information to be charged to the account.

In the event that somebody seeks to use the credit card and the static printed verification code rather than the secret preconfigured dynamic verification code, the user can specify what rules to apply to handle what in effect would be entry of secondary rather than a primary password. Since such a case may occur under duress or as a result of theft of a card, it can be helpful to apply measures other than simple denial of access, as would be the default case for unauthorized use of a credit card with failure to provide recognized credentials. In such a case—in essence the receipt of secondary password—the user can enter information in a secondary password configuration region 162 comprising a first limitation selection means 164 to select a first action to execute, and a first limitation details field 166 to provide additional information regarding the first limitation. As shown, a first limitation selection is "Transaction Limit" and, as specified in the first limitation details field 166, the limit imposed is $50. Thus, a person seeking to use the credit card's printed verification code rather than the secret dynamic verification code will have a transaction limitation of $50, with larger amounts being subject to rejection. This can be useful, for example, in lending a credit card to a friend or child to make a small purchase such as filling a gas tank, without facing the risk of much greater charges being incurred.

The secondary password configuration region 162 as shown further comprises a second limitation selection means 168 to select a second action to execute in response to receipt of a secondary password, and a second limitation details field 170 to provide additional information regarding the second limitation. Here the selected second limitation is to notify the use by cell phone using the phone number provided in the second limitation details field 170. Other notification means could include text messaging, an email, an audible alarm, etc.

Any number of additional limitations or actions can be added. An "add step" button 172 can be used, for example, to add fields for a third limitation. Other buttons are provided, as described with respect to FIG. 3, to provide additional operations, including a "Test System" button 174, a "Confirm" button 176, a "Cancel" button 178, and a "Help" button 180, though a subset of these or many additional buttons, menu items (not shown), or functions can also be provided. Those shown are for illustrative purposes only, and it is recognized that those skilled in the art of programming and designing graphical user interfaces can provide widely ranging alternatives in terms of form and function that are still within the scope of the present invention.

Figure 6:
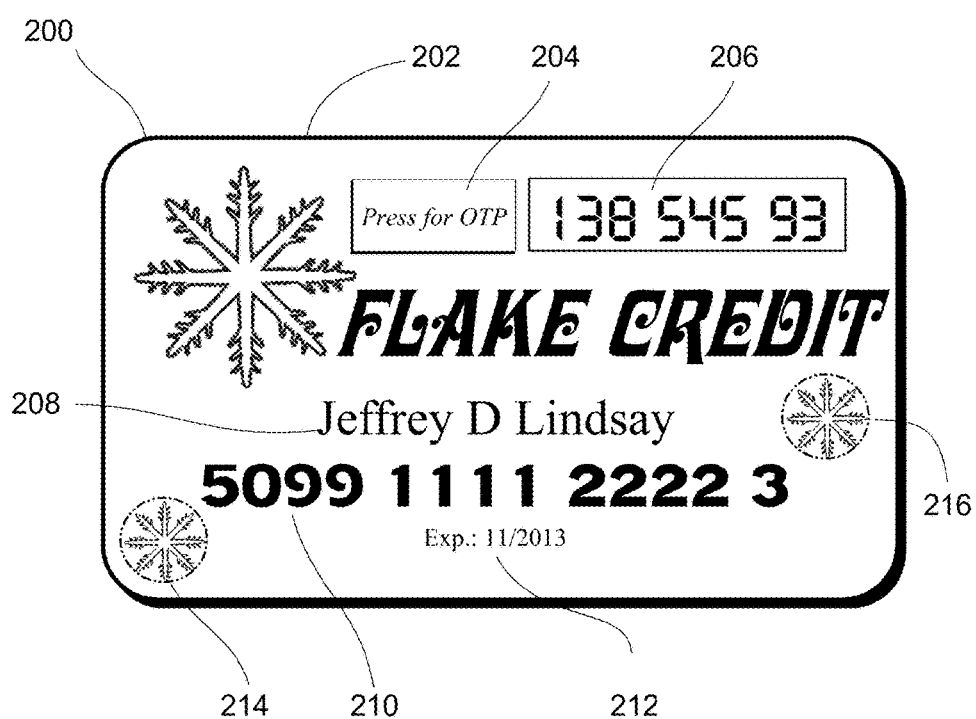
FIG. 6 depicts an OTP-enabled credit card with secondary password generation means according to the present invention.

FIG. 6 depicts an OTP-enabled credit card 200 with secondary password generation means according to the present invention. The credit card 200 has a body 202 comprising materials such as plastic, embedded electronic circuits (not shown), one or more memory chips (not shown) within the card, a magnetic strip (not shown), optional wireless signal transmission means, and other materials known in the art of electrically powered credit cards or other security devices. What is depicted in FIG. 6 is a view of the front of card showing key functional elements, including an embossed or printed user name 208, user account number 210, the expiration date 212, and an OTP (one-time password) display 206, which may comprise a liquid crystal display, OLED display, chromoelectric display, or other known display means to display a one-time password component for use with a secondary password system. The OTP display 206 may not shown a password until an OTP request button 204 is pressed, resulting in determination and display of the OTP, using internal electronic circuitry (not shown) known in the art. Note that the OTP request button 204 is overtly labeled as such, shown here with the phrase "Press for OTP."

What is unusual about the proposed OTP-enabled card 200 is that the password component shown in the OTP display 206 in response to pressing the overtly labeled OTP request button 204 can either be a primary password component or secondary password component, depending on an external factor such as a hidden action by the user relative to the card 200. In the example shown, the hidden action can comprise depressing one of two secret (or not readily identifiable) touch-sensitive or pressure-sensitive regions 214, 216, here marked by way of example with a small logo (the snowflake symbol of the hypothetical Flake Credit company). Using criteria that may be user specified, a hidden action such as pressing either one or both of the secret touch- or pressure-sensitive regions can be used to distinguish a primary and a secondary password. For example, pressing either of the secret regions 214, 216 within five seconds of pressing the overtly labeled OTP request button 204 can result in a displayed password that is determined according to a different algorithm than the default password obtained by simply pressing the OTP request button 204 in the absence of pressing the secret regions 214, 216. The choice of two or more classes of passwords responsive to a hidden action (or lack thereof) with the card 200 provides the user a means of distinguishing primary and secondary passwords for full, limited, or feigned access to the account. In some versions, the user may use an administrative interface to determine rules for the primary and secondary passwords, including selecting whether the passwords generated after a hidden action are considered as primary or secondary passwords.

The response of the card to actions with the secret regions 214, 216 can be preset by the issuer, with user customization achieved by modifying a database for interpreting the received password component provided by the OTP display 206. In some versions, the card itself may be customizable by the user using a device capable of downloading directions to memory in a programmable card. Such a device can include a smart card read/write device with signals conveyed by direct electrical contact with electrodes on the card, by IR communication, by wireless communication, by insertion of a programmed memory chip, etc.

Figure 7:
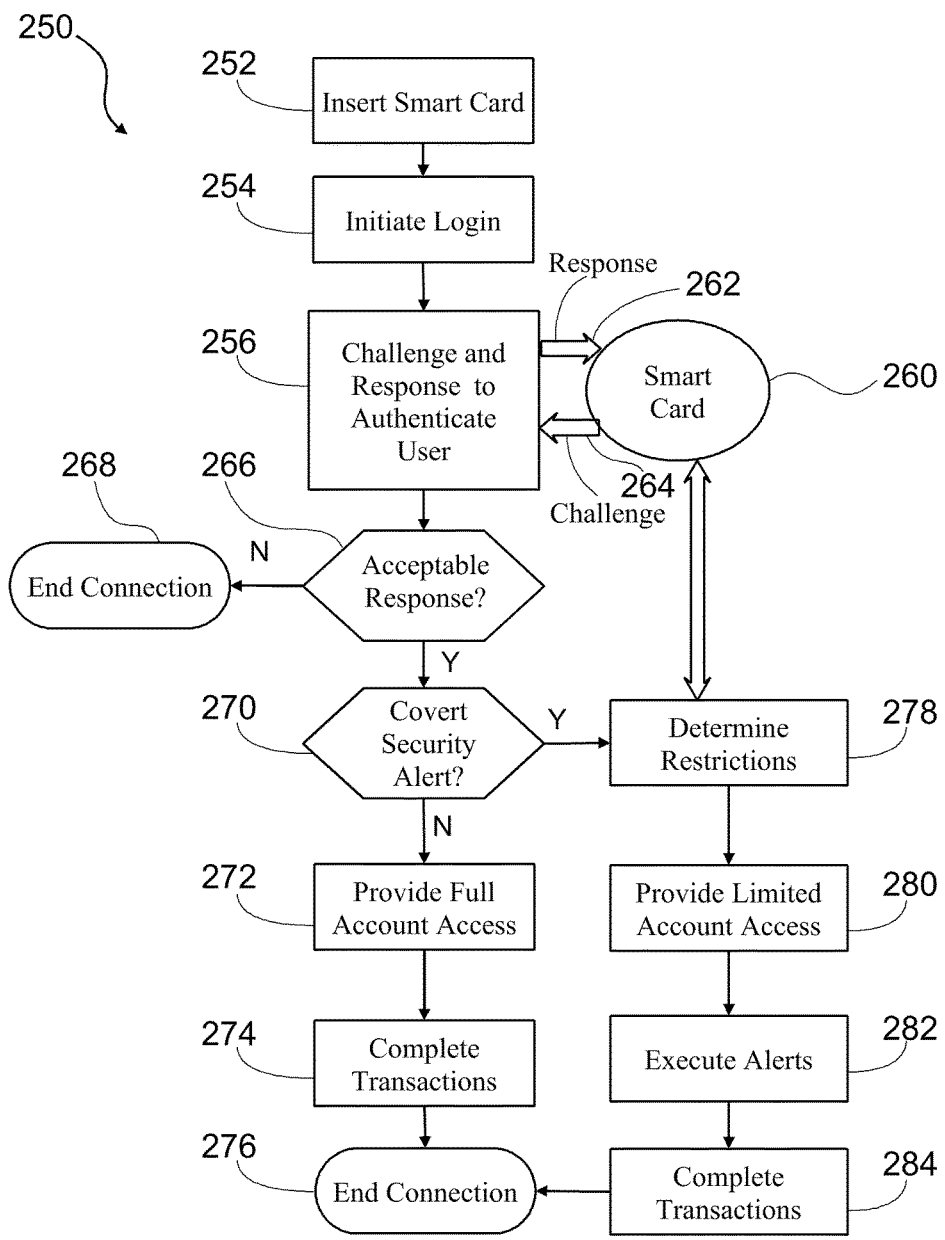
FIG. 7 is a flow chart of events in a process for a smart card security system according to some aspects of the present invention.

FIG. 7 is a flow chart depicting events in a process for a smart card security system 250 according to some aspects of the present invention. In the process of the security system 250, a smart card is inserted 252 into a smart card reader (not shown). Here "insert" can refer to placing the card or a portion thereof inside a physical device reader, or can also refer to bringing the smart card within a space where contactless reading can occur (e.g., it is "inserted" into a volume comprising the read range of a contactless reader). User credentials associated with the smart card permit initiation of a login procedure relative to an account protecting an asset (not shown). A challenge and response system is then activated to authenticate the user 256, in which information associated with the smart card 260 is used to conduct the challenge 264 and to validate the response 262. This can include a question presented on a graphical user interface (not shown) that the user must answer correctly using the graphical user interface for input, a question presented verbally over a speaker system which the user must answer using an input device such as a microphone or keypad, etc. A CAPTCHA challenge and response or other known challenge and response systems can be used. Responsive to information associated with the smart card 260, the security system determines if the response is acceptable 266. If not, the attempt to login can be terminated via the "end connection" step 268. If the response is acceptable, the security system can also determine if the response includes a covert signal of a security alert 270. The covert signal can be the presence or absence of a covert password component provided in the challenge and response step 256, such as a CAPTCHA response that requires a deliberate error to serve as a component of a primary password, otherwise it may be recognized as an "acceptable response" that nonetheless serves as a component of a secondary password indicating a potential security risk to be mitigated with security rules responsive to a secondary password.

If a covert security alert 270 is not present, then the system can recognize the user credentials, including the response to the challenge and response step 256, as a primary password that provides full account access 272 (where "full" may be understood to be relative or absolute, depending on the level of authorization that the user is entitled to), thereby allowing the user to complete transactions 274 or perform other actions related to the secure asset, until the user is done the connection is ended 276.

However, if a covert security alert is recognized 270, indicative of attempted accent access via a secondary password in effect, then the security system can determine the restrictions 278 associated with access under the secondary password, reading, for example, data stored in the smart card 260 (alternatively, a remote database, not shown, may be used). In response to the determined restrictions 278, the system then provides limited account access 280, optionally including feigned account access if the security rules of the account so specify, and then executes alerts 282, if so specified by the security rules of the account stored in memory of the smart card or a remote database (not shown), optionally allowing transactions to be completed 284 under the restrictions of the limited account access previously established 280, terminated by the "end connection" step 276.

Figure 8:
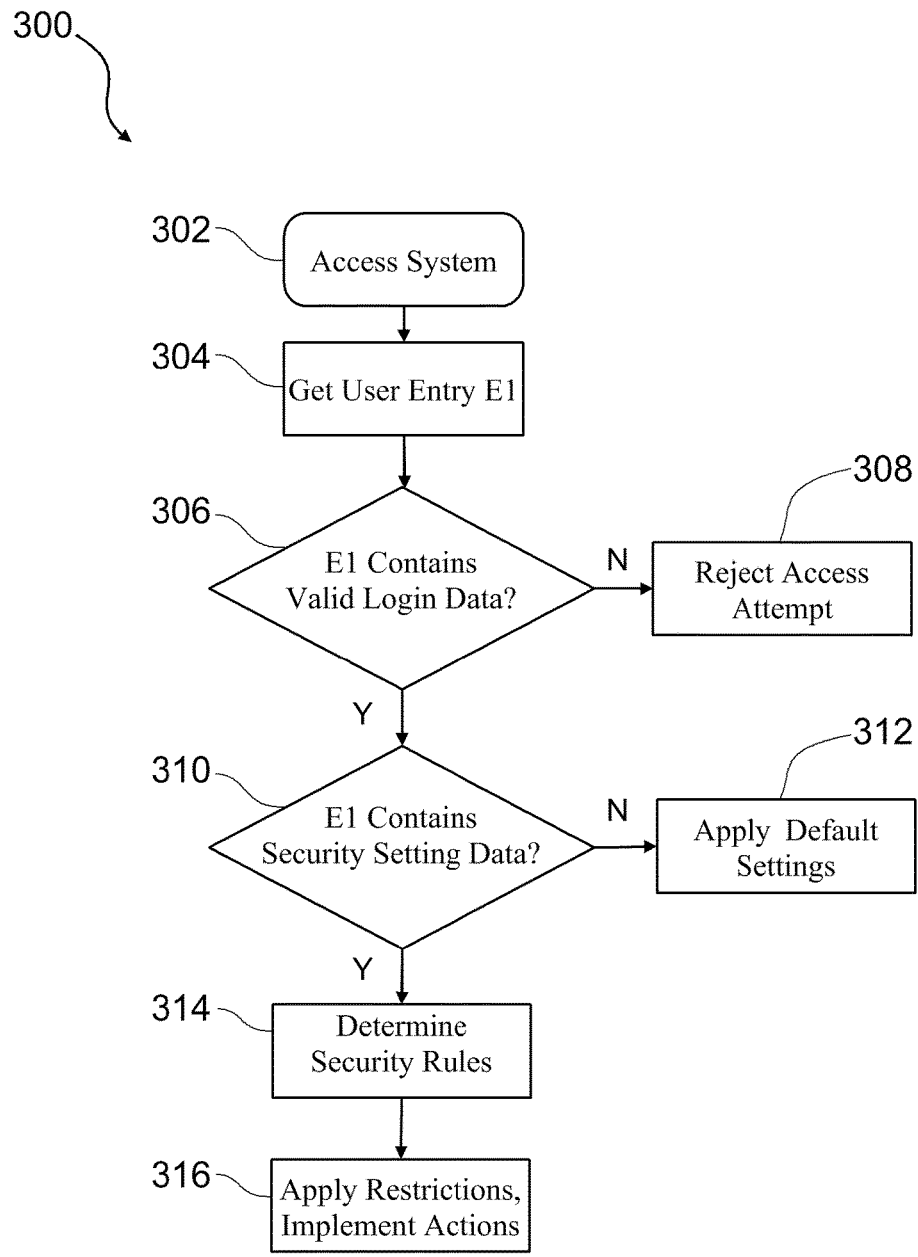
FIG. 8 is a flowchart of a security method for protecting an asset in which a login entry can convey security status information.

FIG. 8 shows a flowchart of a security method 300 pertaining to a security system for protecting an asset (not shown). In the method 300, a client server accesses the security system 302, typically in response to an attempt by a user to login in to an asset access interface (not shown) associated with the client server. After accessing the system 302, the system obtains a user E1 304 intended to establish user credentials. The system compares E1 or components thereof to stored user access data in a database (not shown) to determine if E1 contains valid login data 306. If not, the access attempt is rejected 308. If the login data is valid (e.g., a recognized primary or secondary password associated with the provided user ID or other credentials), then the user entry E1 is evaluated to determine if it contains information regarding the security setting 310 indicative of a potential security problems (the security-related information may covertly indicate that the user is in an insecure setting, such as being observed by a third party or under duress, or using a computer that may be monitored by a hidden observer). If there is no indication of security problems or risks, the default settings for user access may be applied 312, which typically can be a full level of access. If there is a security issue flagged by security setting data in the user entry E1, the system can then determine the security rules 314 that have been configured for implementation in response to the security setting data 310, and accordingly apply the specified restrictions 316 regarding access to the asset and implement any specified security related actions such as the issuance of alerts, making a telephone call by machine or human operator to contact the asset owner, etc. In the security method 300 of FIG. 8, the user entry E1 can be selected by the user to be either a primary password for full access or a secondary password for limited or feigned access, according to the preconfigured security rules. Further, the distinction between a primary and secondary password may be a hidden action in addition to valid overt login data.

Figure 9:
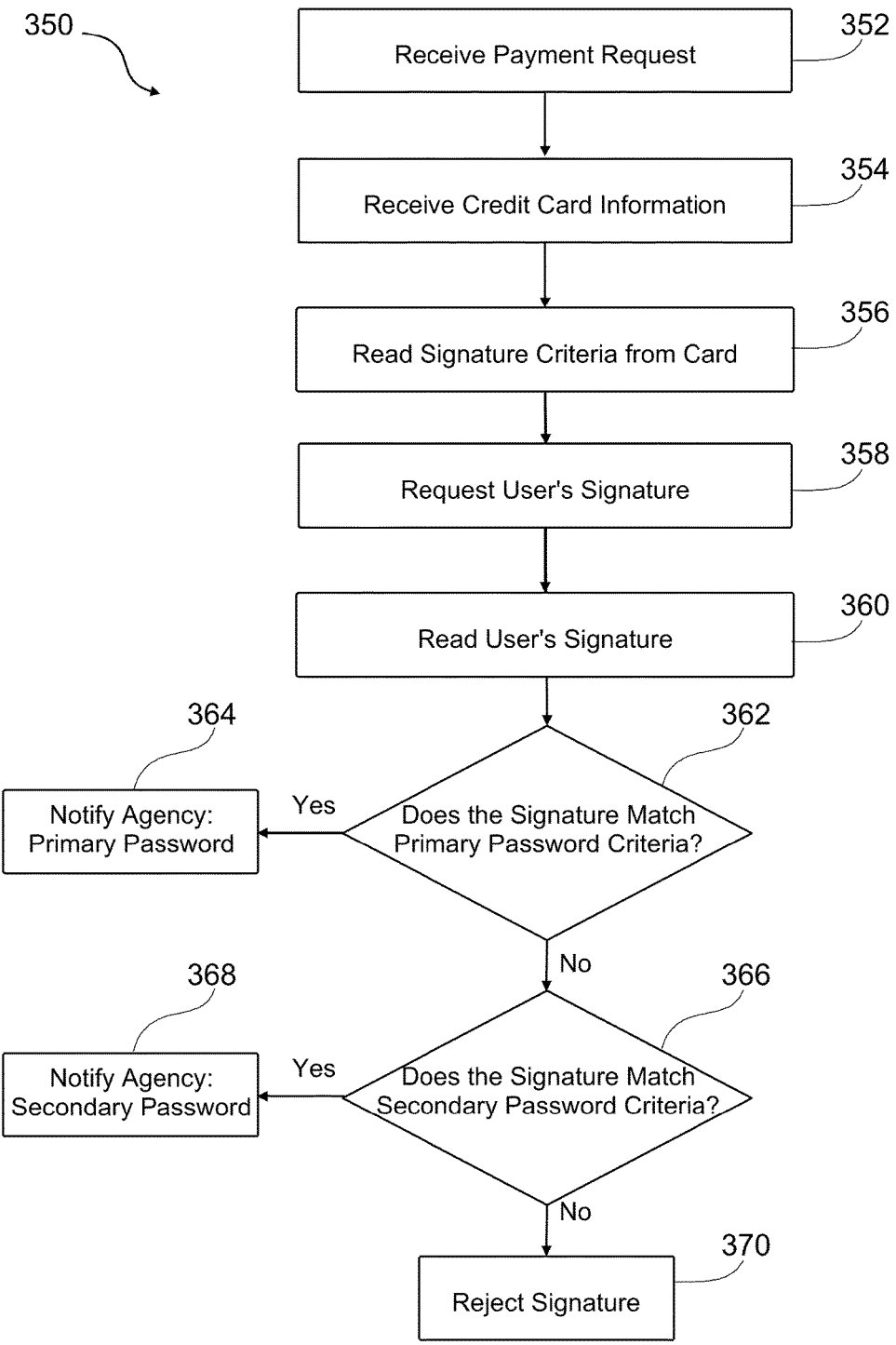
FIG. 9 is a flowchart of a payment processing method according to the present invention.

FIG. 9 shows a flowchart of a payment processing method 350 wherein a signature of a user is required. In response to receiving a payment request 352 (e.g., a request from a merchant to authorize a proposed transaction), the system receives credit card information 354, such as information obtained buy swiping a credit card for a "card present" transaction, or stored information on a computer (e.g., a cookie) for a "card remote" transaction. Information is also read from the credit card about the user's signature, which may include criteria for image analysis of a signature to verify that it is authentic. (Alternatively, the signature criteria may be provided by a remote database, not shown, associated with the credit card information.) The system then requests the signature of the user 358, which can be entered into an electronic signature pad with a stylus or other writing means, or can be entered with a graphical tablet connected to a computer terminal, or other signature input means. After the signature is read electronically 360, a comparison is made with the signature criteria obtained from the card 356 (or other source) to determine if the signature received matches the predetermined criteria for a primary password (in effect) 362, and if so, then a notice is sent to the appropriate agency (e.g., a credit card company, and/or a merchant such as PayPal, etc.) that the signature is approved as a component of primary password 364, thus authenticating the user and authorizing the transaction, if there are sufficient funds or other criteria are met. On the other hand, if the signature does not match the criteria for a primary password 362, the signature can also be compared to criteria for a secondary password 366 (this step, naturally, can be executed substantially simultaneously with or prior to the step of comparing the signature to primary password criteria 362). If the password matches the criteria for a secondary password (or component thereof) 366, a notification is sent to the appropriate agency 368, thus calling for execution of any security rules (not shown) that have been established for use with secondary passwords (e.g., limited access or feigned access). If the signature does not match recognized criteria for a primary password or secondary passwords, the signature is rejected 370, which may mean that the payment request is denied, or may prompt the user for additional credentials in case there is a problem with the signature reader or criteria.

In the flow chart of FIG. 9 or any other flow chart or description of methods herein, one skilled in the art can recognize that not all steps need be sequential in the order shown or described, but that some steps can readily be executed in parallel or simultaneously with other steps, or before or after other steps, so long as the functionality of the system is not impaired. For example, reading signature criteria 356 could be executed before or during the step of receiving basic credit card information 354, and requesting a user's signature 358 could occur before reading signature criteria 356, whereas reading a user's signature 360 must follow requesting a user's signature 358. The order of steps shown in the figures is generally meant to be illustrative and is not meant to limit the invention beyond the limitations explicitly set forth in the claims. Likewise, additional steps can be inserted between adjacent steps or executed in parallel or simultaneously, and still be within the scope and spirit of the invention as claimed.

Figure 10:
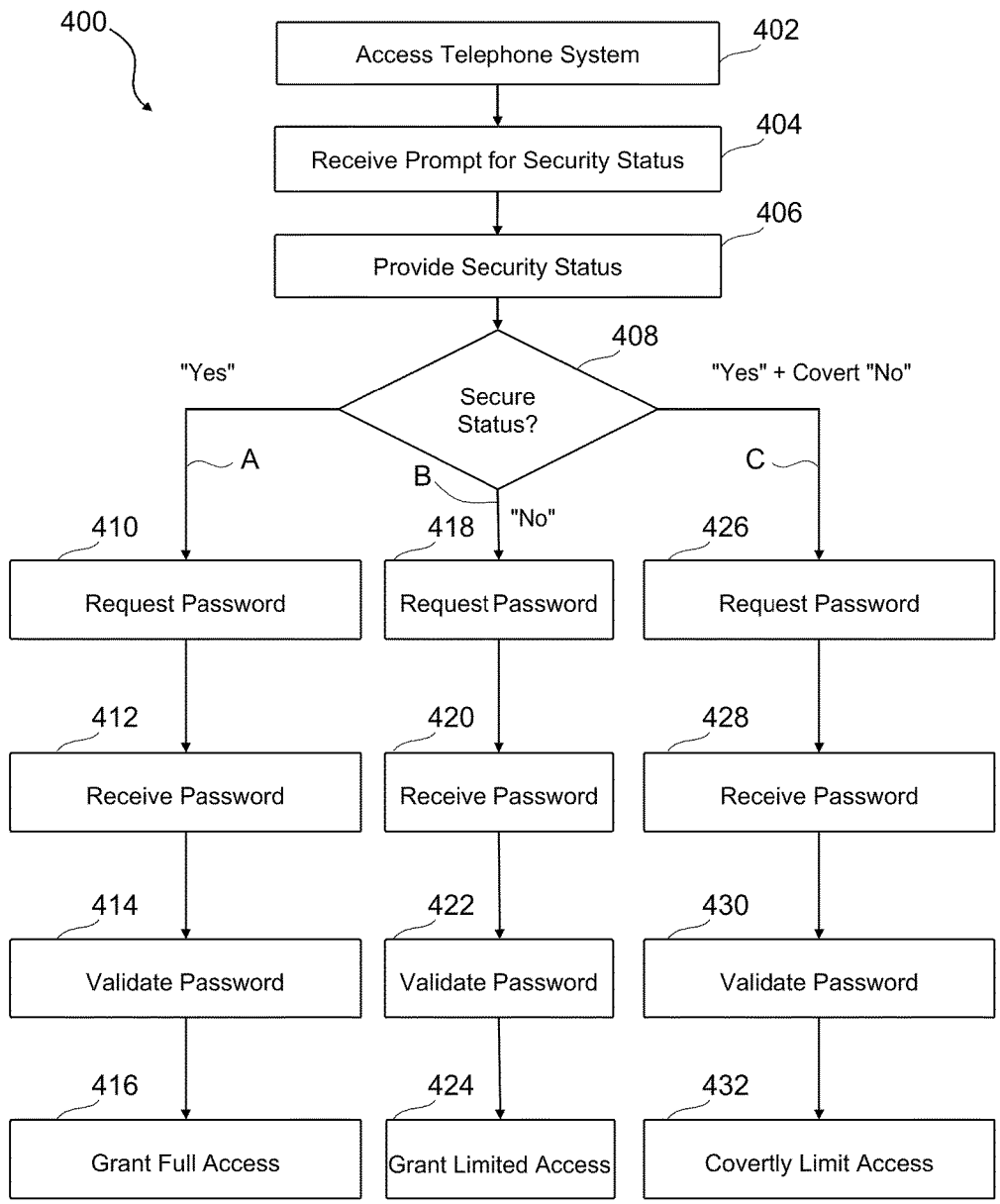
FIG. 10 is a flowchart of a telephone-based security system according to the present invention.

FIG. 10 depicts some steps in a telephone-based security system 400 which begins with a user accessing the telephone system 402. This can entail dialing a phone number and providing a user identity to an operator or an automated telephony system. The user identity may be the user's name, an account name or user ID, the name in which an account is registered, the home phone number of the user, the Social Security number of the user, etc. Alternatively, the identify of the user may be recognized automatically during the step of accessing the system 402 by recognition of a previously registered telephone number the user is calling from, by a voice recognition system, by a web camera that recognizes and authenticates the user calling, etc. After the user has accessed the system, a prompt is received for the user to enter a security status 404. The prompt can be provided by an automated device (not shown) such as a voice recognition and synthesis system, or by an operator, optionally assisted by a computer system (not shown). The step of receiving a prompt for a security status 404 can be a direct question such as, "Are you in a secure setting?" or can be more subtle, such as a the playing of a predetermined tone or passage of music that is recognized by a trained user as a prompt for a security status. In some cases, the prompt can simply be silence to allow a trained user to provide the input, or may otherwise be implicit but not readily perceived by one unfamiliar with the system as a prompt. At the most basic level, the prompt represents an opportunity that is provided to the user to convey information pertaining to the security status, though in some versions, the prompt is an overt request communicated audibly or via other means for user input regarding the security status.

In response to the request for a prompt 404, the user provides the security status 406. In one version, this entails the user verbally conveying the security status. For example, in response to a question about the security status, the user may say, "Yes, I am in a secure setting." Or in response to a less obvious prompt, such as a pause for user input, the user may convey information that indirectly describes the security status. For example, the user may say, "Could you speak up—I can't hear you over all the noise here" to indicate the others are present. Alternatively, hidden actions may be used to convey the security status. For example, a predetermined set of phrases may have been established, such as beginning a sentence with a vowel to convey high security, or beginning with a consonant to convey low security. Numerous other covert means of conveying security information can be considered within the scope of the present invention, such as the use of non-verbal noises (coughing, clicks, the use of pauses, etc.), making particular selections from a menu in a predetermined order, etc.

In one version, an obvious verbal prompt 404 is used, such as "Please enter your security status: press 1 for secure, 2 for non-secure." To deal with the case of system access when a user is under duress, a predetermined means may be established to allow a user to overtly convey that the status is secure while covertly indicating that the status is actually insecure. The covert signaling of the security status may comprise a hidden action such as coughing before or after providing the overt portion of the security status input 406, or may comprise the use of pauses, non-verbal sounds, voice inflexion, volume (e.g., speaking normally to convey the status is insecure, while speaking in a soft whisper to convey a secure status), etc. In one version, a hidden action must be coupled with the overt expression to indicate that the status truly is secure, while failure to add the hidden action indicates that the overt conveyance of a secure status is indeed false, and indicates that the user may be under distress or that the user suspects that unauthorized agents are observing his or her actions.

After the user provides the security status 406, the security system 400 then interprets the security status provided to determine if the status is secure 408. The step of determining if the status is secure 408 can consider three possibilities are considered based on the security status input 406 from the user: A) the status is secure, B) the status is insecure, and C) the user overtly states that the status is secure but conveys hidden information to indicate that it is actually insecure. In some versions, option C may be excluded, leaving only two possibilities to consider: secure or insecure, but for completeness we will consider all three possibilities with reference to FIG. 10.

If the status of the user is determined to be secure, pathway A on FIG. 10 is selected. The system requests a password from the user 410, receives the password 412, validates the password 414, and if valid, grants full access 416 (not shown is the denial of access of the password is not valid).

When the system recognizes user input indicating that the status is insecure, pathway B is selected. As shown in FIG. 10, pathway B resembles pathway A, including requesting a password 418, receiving a password from the user 420, which may be a secondary password, and validating a password 422. Validation of the password 422, however, results in granting of limited access 424 (or feigned access, if desired and so preconfigured). The limited access may entail limitations on the amount of money that may be spent of transferred, the types of transactions that may be performed, etc. Feigned access may also be provided, at least for predetermined portions of an account or service that may be particularly at risk if accessed by a third party. For security, the password received in the step of receiving a password 420 may be a one-time password or, even if a primary password, may be automatically converted to a one-time password (not shown) that will require later action in a secure setting to renew and activate a primary password (either the original primary password or a new one), since entry of a password in an insecure setting creates the risk that the password will be stolen by others. In later creating a new password to replace the inactivated password, other means of user authentication may be required such as Social Security number, voice recognition, etc.

If the user overtly indicates that the security status is secure but overtly indicates that the status is actually insecure, the system 400 can appear to respond as if pathway A had been selected, when in reality pathway C is employed. The system requests a password 426 and receives a password 428. At this point, the user may provide a secondary password or may provide a primary password. But since the system recognized that the actual status is insecure, a primary password entered at this point may be inactivated for future use, unless the user later accesses the system from a secure setting to renew or recreate a primary password. The step of validating the password 428 can include recognizing and accepting a primary or secondary password, or, in one version, can optionally include recognizing any password as valid. In response to accepting or appearing to accept a password after the validate password step 430, the system then covertly limits access 432 to the asset. The limited access can include completely feigned or partially feigned access, according to predetermined security rules. The feigned access may include seemingly normal full access, but wherein transactions performed are automatically cancelled or reversed, to the degree possible, after the session ends, or at some other appropriate point in time. A security alert (not shown) may also be issued to notify authorities or others that access under duress may be occurring.

In one version of the steps along pathway C, the system during the step of validating the password 430 may be configured to accept any password at this point if the identity of the user is known, particularly if the limited access is such that there is no risk of significant loss for the user through the limited access provided.

Figure 11:
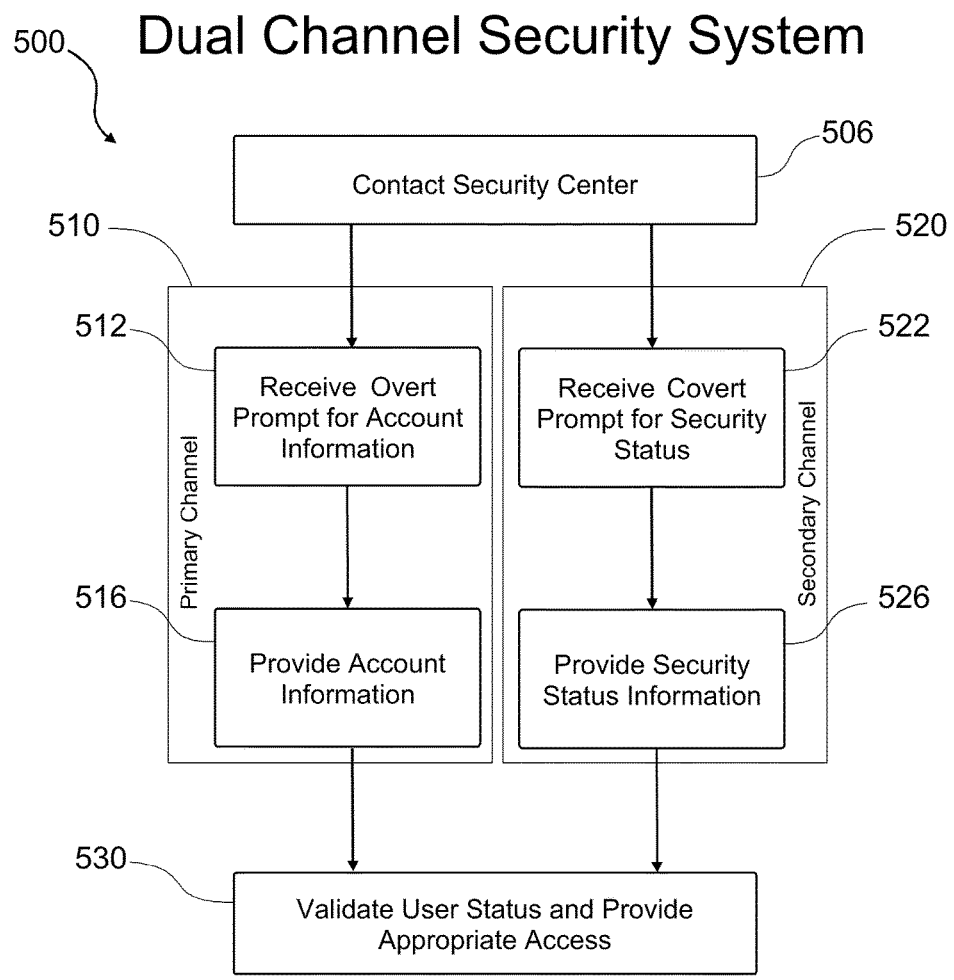
FIG. 11 depicts a dual-channel security system according to some aspects of the invention.

FIG. 11 depicts a method in a dual channel security system 500 according to some aspects of the present invention. Usage of the system begins with contacting a security center 506 that employs security tools according to the present invention. The security center 506 can be a customer service center or administrative center for a business that protects or provides an electronic account or other financial account. For instance, contacting the security center 506 can include logging in to an account, dialing a phone number to reach a customer service representative for an account, establishing a videoconference with an authorized representative of the agency managing an asset, etc. The step of contacting the security center 506 comprises establishing two channels of communication, a primary channel 510 and a secondary channel 520. The two channels of communication 510, 520 should be distinct enough that a third party seeking to observe or monitor communication on the primary channel 510 might be unaware that communication is also taking place on the secondary channel 520. For example, the primary channel 510 might entail communication via telephone, while the secondary channel 520 might include electronic communication including information sent by email or via a Web interface, or visa versa (e.g., using instant messaging as a secondary channel 520 with voice or text messaging as a primary channel 510). The communication via the primary channel 510 and the secondary channel 520 may be substantially contemporaneous (e.g., with about 1 minute or less, such as within about 45 seconds or less, or within about 5 seconds or less of each other), though communication on the secondary channel may be shortly before or after communication on the primary channel (e.g., within about 2 minutes, 15 minutes, 1 hour, or 1 day of each other).

Communication on the primary channel 510 can involve ordinary log-in information such as the account name or user ID, a password, or other identifying and authenticating information (user credentials), as desired. As shown, after contacting the security center 506, the user receives an overt prompt for account information 512, which can include being presented with a log-in screen, a verbal request to enter account information, a pause, tone, or other cue indicating that account information should be entered, etc. The user then provides the account information 516, which may include a primary password, a secondary password, or a bogus password. Meanwhile, or within a predetermined time span of communication on the primary channel 512, the user also communicates over the secondary channel 520, optionally first receiving a prompt for a security status input 522, and providing security status information 526. The provided security status information 526 coupled with the provided account information 516 are then both used by the dual channel security system 500 to validate the user's status and provide the appropriate access 530. The appropriate access may include full access, limited access, feigned access, or denied access. For example, the provided security status information 526 can indicate that the user is in a secure setting where a primary password may be used safely, or may indicate that the user is in an insecure setting where predetermined security rules stored in a database (not shown) may then be implemented to protect the assets of the user from fraud or theft.

In a related embodiment, the dual channel security system 500 is configured to require a security status input from a secondary channel 520, and in the absence of the input via the secondary channel 520, the security status is assumed to be insecure, wherein user access is limited, feigned, or denied, depending on preconfigured security rules (not shown) for the system 500.

For example, a user logging in to an online account may use Web access as the primary channel 510, and may provide account information 516 through a login page. For full access, the user may need to also substantially simultaneously dial a telephone number to provide information over a telephone line regarding the security status of the user, in which case the telephone system is the secondary channel 520. The telephone system may be entirely automated, allowing the security status to be conveyed through selecting numbers on a keypad or by speaking commands. Overt or covert information may be used to convey the security status over the secondary channel.

Alternatively, the primary channel 510 may be over a telephone, with email or Web access being used as a secondary channel 520. Thus, if the agent receiving the telephone call does not also receive an email confirmation that the user is in a secure setting, the user's attempt to access the account may be greeted with access limitations (over or covert), feigned access, or access denial in response to validating the user's status 530.

The primary and secondary channels 510 and 530 can independently include any form of communication, including telephones, email, videocamera signals, hand gestures, fax, text messaging, a second wireless or wired voice communication device, telegraphic communication, etc.

With the dual channel security system 500, an eavesdropped listening to a telephone call or a hacker monitoring electronic communication may not recognize that communication over a secondary channel 520 has taken place and may be unaware of the scope of the security system 500. Attempting to gain full access to the user's account based on information gleaned from monitoring one channel may not result in full access without the confirmation of a secure setting being received via the other channel.

Figure 12:
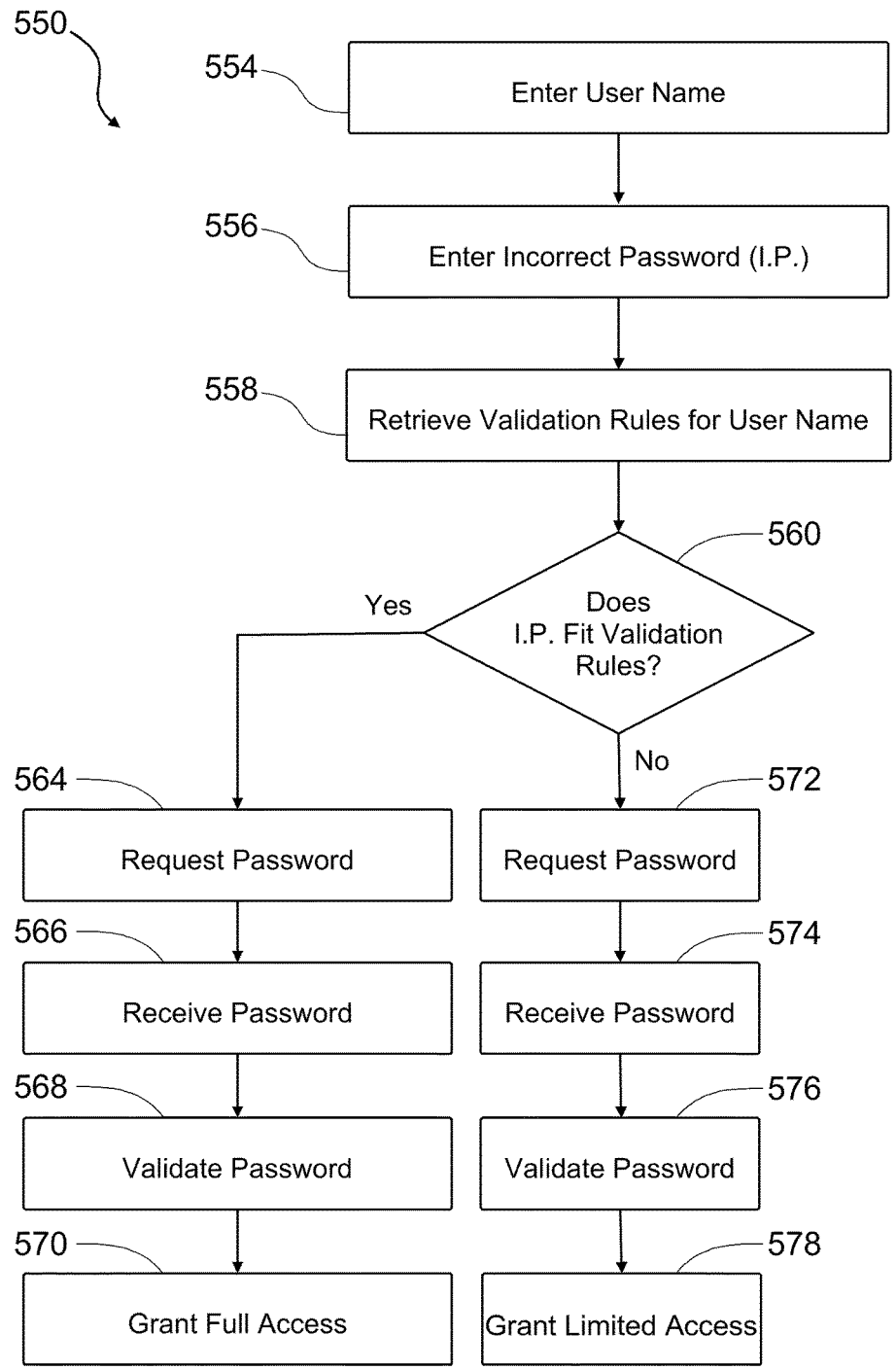
FIG. 12 depicts steps in a telephone-based security system according to the present invention.

FIG. 12 depicts a user access system 550 for a secure account or protected asset in which a deliberate apparent error can be used, in effect, to create a primary password to grant full access to a user. The system 550 provides means for steps shown in FIG. 12, including the entry of a user name 554 and the entry of an incorrect password 556 (or, alternatively, some other user input in which a deliberate error is made to convey the user's credentials to the system 550). The intent of the system 550 is to provide a covert component with the overt password to authenticate the user and grant full access, such that an observer would be unlikely to assign any significance to the error made in logging in and such that an observer who simply repeats the error made in logging in might fail to gain full access.

After the incorrect password has been entered 556, the system retrieves validation rules 558 associated with the entered user name (these may be stored in a memory device, not shown, associated with the system), and then determines in the incorrect password entry fits the requirements of the validation rules 560. For example, the validation rules for the user may specify that the initially incorrect password entered should contain an extra character taken a random string displayed subtly on some portion of the login page. For example, after accessing a login page, the URL of the page may contain a computer-generated string after the domain name, such as the final text string in the URL: http://www.pinsafety.com/login?asp=33wwzzEul324p. The last two characters of the URL, "4p", may indicate that the letter "p" should replace the fourth character in the password, such that a correct password of "Ge$^32X" would be entered as "Ge$p32X". This is an incorrect password, but it corresponds to the rules given for recognizing covert password component. Thus, the step of determining if the incorrect password fits the validation rule 560 would result in "yes" as the answer. Whether the incorrect password fits the validation rules or not, an error message can be shown and a new password request is presented 564, 572. For the case of a validated incorrect password, after the new password request 564, the system receives a password 566 from the user, which now should be the correct password (e.g., the overt component of the primary password). The received password is then validated 568 (e.g., compared to the stored password to determine if it is correct). And if valid, the user is granted full access 570. (Not shown is the denial of access if the second request for a password 564 is met with an incorrect received password when the password if validated 568.)

If the incorrect password does not fit the validation rules as a result of the incorrect password validation step 560, the correct password is still requested 572, received 574, and validated 576, but only limited access will be granted 578 (or feigned access or denied access, as desired). Not shown is the granting of limited access or denial of access if the correct password is entered initially in place of entering an incorrect password 596.

For the system 550 of FIG. 12, numerous other validation rule (not shown) can be considered. For example, the incorrect password may require that all or some of the characters be shifted in their alphanumerical sequence by an amount corresponding to a digit displayed on the screen. For example, if a "+2" is displayed in a predetermined place on the screen, the user may be expected to shift one or more characters of the password by two steps (e.g., an "A" would become "C", a "3" would become "5", a "9" could become "1", etc.). Thus, for a password such as "WE34bP", the user may, for example, be allowed to shift two or more of the characters, with acceptable "validated" incorrect passwords such as "WG36bP" (the "E" and the "4" having be incremented upwards by 2 steps) or "YE34dR" (the "W", "b" and "P" having been incremented upwards by 2 steps). Had "−2" been displayed instead, the user would be expected to increment two or more characters downward by 2 steps.

Many other types of errors in password entry can be used as the basis for a "valid" error, such as transposing adjacent characters, repeating a character, deleting a character, replacing a character with a string of a specific length, changing capitalization, etc.

Alternatively, a radically different initial password entry can be used, in accordance with predetermined rules. For example, a valid incorrect entry may need to begin or end with a random character shown on the login page, such as the first character in a variable text field providing news and system status updates. Alternatively, information to be used in creating a valid incorrect password may be displayed on a Web page displayed before accessing the login page. For example, a user going to a main home page for the account manager may be required to notice variable information on that page (e.g., the last two letters displayed in a text field) and then remember that information for use on a new login page that is presented in response to clicking on a login icon or button. In that case, the login page may be substantially free of variable displayed information, yet the previously noticed variable information is still expected to be used in creating the incorrect password according to the validation rules for that user.

Figure 13A:
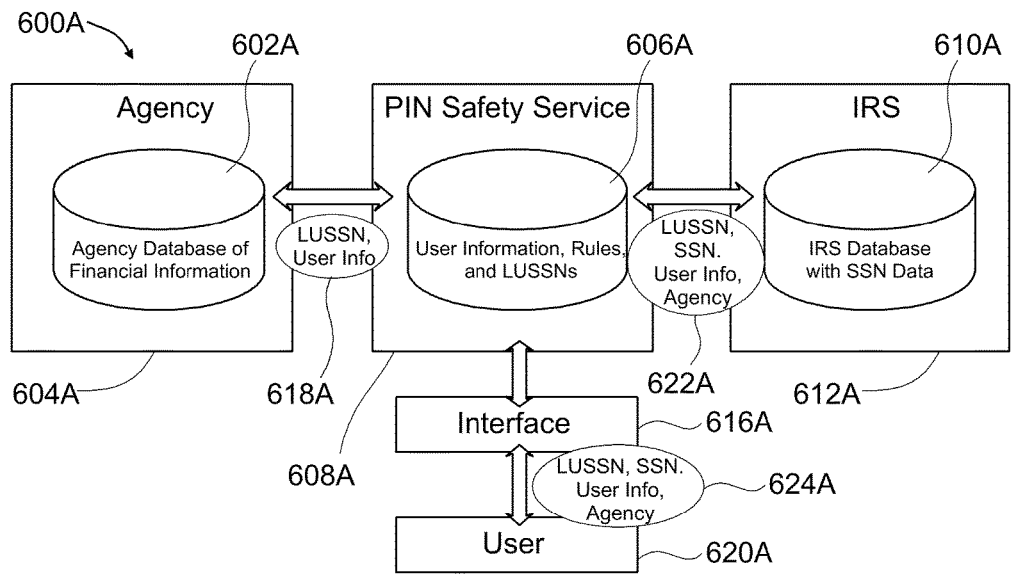
FIG. 13A and FIG. 13B depict systems for configuring limited-use credentials or credential-related information such as Limited-Use Social Security Numbers.
Figure 13B:
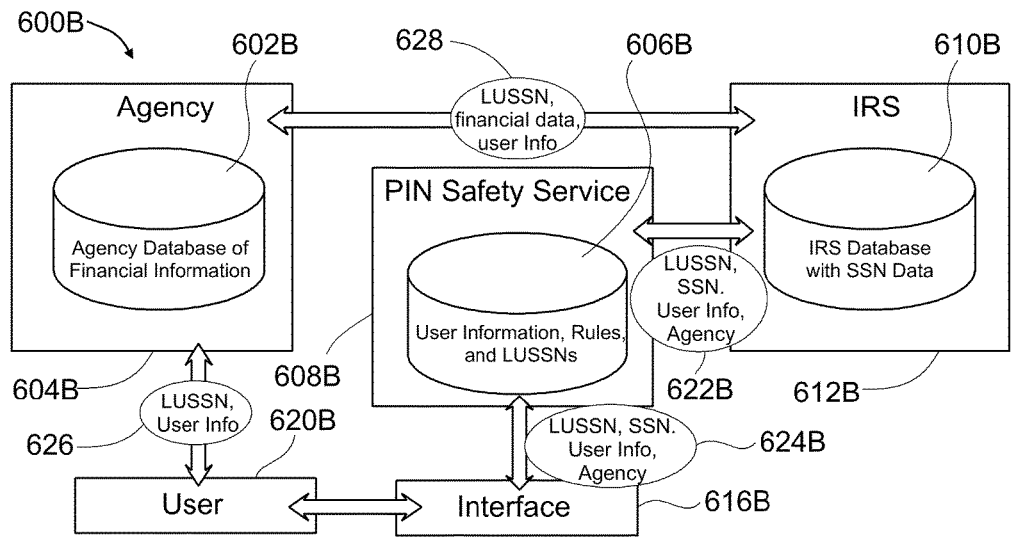

FIG. 13A and FIG. 13B depict systems 600A, 600B for configuring Limited-Use Social Security Numbers (LUSSNs) or other limited-use SSN-related information, to improve the security of Social Security numbers (SSNs). Alternatively, the systems can be used to provided many other limited-use identification numbers or passwords that involve coordination between multiple entities.

In FIG. 13A, a PIN Safety Service 608A manages a security database 606A of user information, rules, and LUSSNs and provides a computer interface 616A that can be accessed by users 620A over networks (not shown) or other means to provide control of the information and rules in the security database 606A. Using the interface 616A, the user 620A can share and receive personal information 624A including user information (name, birthdate, etc.), SSN, intended agencies for which LUSSNs are requested, etc. The PIN Safety Service 608A communicates with an agency 604A that manages an agency database 602A of financial information or other information pertaining to user assets or other assets or services that the user 620A may wish to use. While only one agency 604A is shown, there may be any number of agencies (not shown) that cooperate with the Pin Safety Service 608A. In the system 600A, a relationship exists between the PIN Safety Service 608A and the IRS 612A, such that selected information on an IRS database 610A pertaining to Social Security number data can be linked to information in the security database 606A of the PIN Safety Service 608A. Shared information 622A between the IRS 612A and the PIN Safety Service 608A includes user information (name, optionally address, birthdate, etc.), the user's Social Security number, the agency name or identifier associated with the agency, and the Limited-Use Social Security number (LUSSN) for use with that particular agency. Multiple agencies can be used (not shown), each with their own LUSSN for the user, if desired, or multiple agencies can use a single LUSSN, if desired, as specified by user-selected rules or other rules associated with the user's account with the PIN Safety Service 608A.

In this system 600A, when the agency 604A requests a Social Security number (SSN) from the user 620A, the user can access the PIN Safety Service 608A via the interface 616A and automatically receive a LUSSN that can be accepted by the agency 604A as if it were a valid SSN. Here the LUSSN is provided to the agency 604A from the Pin Safety Service 608A. Shared information 618A between the agency 604A and the PIN Safety Service 608A includes the user information and the LUSSN, but not the user's SSN. If an entity that is not authorized to use the LUSSN attempts to use it to impersonate the user, either the PIN Safety Service 608A or the IRS 612A can recognize that the entity is not the agency 604A for which the LUSSN has been authorized, and thus attempted fraud or unauthorized actions can be stopped.

In general, the LUSSN can appear to be a SSN (e.g., have the same number of digits as valid SSNs). When the system is adapted to handle credentials other than SSNs, the Limited Use Credential in general can be adapted to resemble a permanent credential that it is replacing, or it may have differences such as added characters or other characteristics.

FIG. 13B depicts a system 600B similar to the system 600A of FIG. 13A, except that the agency 604B need not interact directly with the PIN Safety Service 608B. In this system, a user 620B can access the PIN Safety Service 608B via an interface 616B to share and receive personal information 624B including user information (name, birthdate, etc.), SSN, intended agencies for which LUSSNs are requested, etc., and through interface 616B receives a generated LUSSN for the agency as part of the shared personal information 624B. The LUSSN and other information 626 from the user can then be directly given to the agency 604B as if the LUSSN were a valid SSN or other identifier. The giving of the LUSSN can be by a computer interface (not shown), telephone, mail, verbal communication, or any other means. The agency 604B can enter the LUSSN and other information 626 received from the user 620B into the agency database 602B of financial information or other information pertaining to user assets or other assets or services that the user 620B may wish to use. In turn, the agency 604B can share user financial information 628 directly with the IRS 612B (a step that can also be done in the context of FIG. 13A in addition to sharing information 618A with the Pin Safety Service 608A, but was not shown). The user financial information 628 can include income received, account data, etc., with the LUSSN and other user information required by the IRS, but without the true SSN of the user.

In creating the LUSSN given to the user 620B in the shared and received personal information 624B, the PIN Safety Service 608B communicates with the IRS 612B, sharing data 622B from the security database 606B such as the SSN, user information, and the target agency or agencies for a particular LUSSN request. The IRS 612B stores the received data 622B and creates an LUSSN that is included in the data 622B shared with the PIN Safety Service 608B and provided in turn to the user 620B for later sharing with the agency 604B in an IRS database 610B linking user information, including the SSN and the target agency, with the generated LUSSN for that agency. Multiple agencies can be used (not shown), each with their own LUSSN for the user, if desired, or multiple agencies can use a single LUSSN, if desired, as specified by user-selected rules or other rules associated with the user's account with the PIN Safety Service 608B.

While a relationship is depicted between the PIN Safety Service 606A, 606B and the IRS 610A, 610B, a variety of other authorizing entities besides the IRS could be depicted instead, such as international government or regulatory entities, Internet service providers or Internet-based services, financial institutions, academic organizations, military entities, medical groups, etc., that may provide personal identification codes or other credentials (e.g., identification information related to authentication, accreditation, authorization, etc.) that may need to be shared with third parties but which present risks of misuse by others. When authorizing entities other than the IRS are used according to the systems 600A, 600B of FIGS. 3A and 13B, the LUSSNs associated therewith would be replaced with other limited use credentials appropriate for the entity replacing the IRS.

In some aspects of the invention, the PIN Safety Service 604A, 604B can be integrated with the IRS 612A, 612B or other authorizing agency, such that no separate service is needed. The security server 606A, 606B may be integrated with the IRS database 610A, 610B (or other authorizing agency server) or be a separate server.

The limited use credentials described with respect to FIGS. 3A and 13B can be used for arbitrarily long time periods (e.g., the life of the user or indefinitely) with respect to the specified agency or agencies they are created for, or they may be used for a limited time period or limited number of uses by a user (e.g., used only once to set up an account). In one version, they may serve as one-time credentials.

If more than one agency is associated with a Limited Use Credential, the list of specified agencies can be considered user-defined whitelist with respect to the Limited Use Credential, which may be configured to be functional (i.e., accepted by the authorizing agency as a valid credential linked to the actual identify of the user) only when reported by third parties on the whitelist, otherwise an alert can be sent to the user asking the user to confirm the attempted use by a third party (optionally adding the company to a whitelist for future use) and if unconfirmed, identifying the attempted use as a possible error or attempted fraud, and optionally contacting the third party to resolve the issue.

Figure 14:
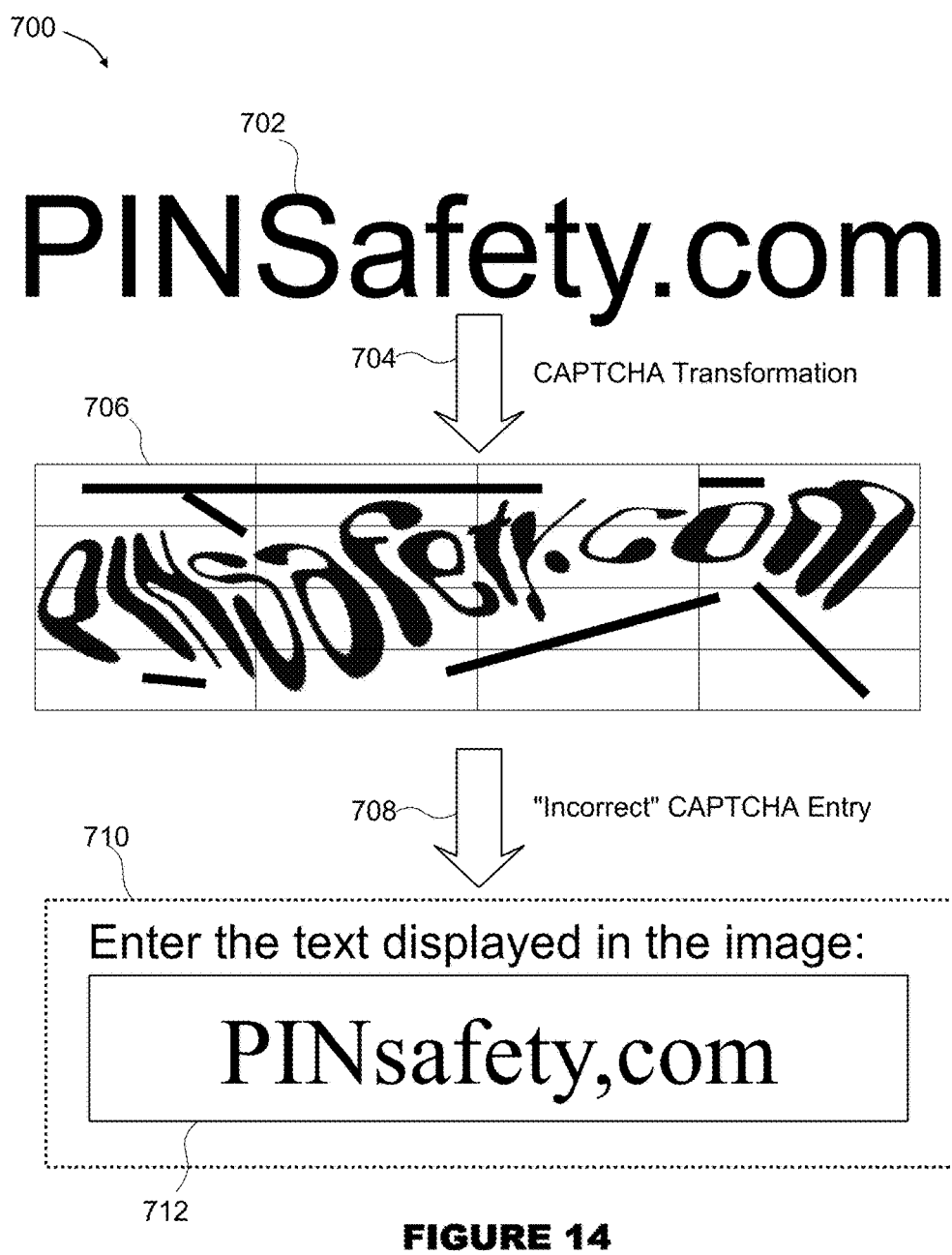
FIG. 14 depicts aspects of a CAPTCHA technique according based on some versions of the present invention.

In one version, the Limited Use Credential is associated with additional information to authenticate the credential, such as a modified birthdate or other personal information or an additional access code FIG. 14 depicts the use of a "CAPTCHA" technique 700 to verify that a human user is accessing a system via a graphical interface, a technique that can be adapted for play a role with primary passwords and/or secondary passwords according to various aspects of the present invention. In the technique 700, an original text string 702, here shown as the phrase "PINSafety.com", undergoes a CAPTCHA transformation 704 in which a graphical depiction of the original text string is distorted in one or more ways such as stretching, changing the font, adding background noise or other graphical elements, etc., to yield a CAPTCHA image 706 wherein the original text string 702 can typically be recognized by a human observer but wherein machine reading tools may be unable to accurately discern the original text string based on the CAPTCHA image 705. The recognized string is then entered by a human user into a CAPTCHA entry field 712 in a portion of a graphical interface 710. In prior CAPTCHA systems, failure to enter the original text string 702 correctly results in an error that, unless corrected, will deny the user further access to the account or computer system.

In some embodiments of the present invention, a deliberate alteration of the original text string 702 can be made according to predetermined rules, resulting in a seeming incorrect CAPTCHA entry 708. For example, a predetermined rule could specify the user should enter a comma instead of a period, wherein the original text string 702 would, in this case, might be entered as "PINSafety,com". Such a deliberate error can be part of a system for authenticating a user or conveying hidden information that is not readily detected by an unauthorized observer seeking to learn how to access the user's account. The deliberate error entered into the CAPTCHA entry field 712 can, for example, serve as a covert component of password that is surreptitiously entered.

Details of CAPTCHA Techniques in Security Systems

In several embodiments of the present invention, a conventional password is supplemented with a CAPTCHA system which requires that a an intelligent task be performed that is difficult for a machine to emulate (a type of challenge-response test). As implemented on many Websites such as Google's Blogger service for blogs, a common CAPTCHA system involves the display of an image of distorted text that the user must recognize and enter into a field on the Website, as shown in FIG. 14. In other versions, the user must recognize an image or portion of an image and enter what is being displayed. In other cases, the user must answer a question or respond to other types of challenges in ways that computers normally could not emulate. CAPTCHAs can also be presented using sound rather than images, a practice that is often done as an alternative to image-based CAPTCHAs to assist those with impaired vision. In sound-based CAPTCHAs, for example, a series of alphanumeric characters may be spoken over a noisy background that may contain garbled speech, requiring the listener to distinguish the more distinct sounds and enter them (e.g., by keyboard, speech, or other means) to be authenticated.

CAPTCHAs and related systems can be considered as a second channel for user authentication, a communication channel involving additional pathways of communication besides entry of text from a user, even through the response from the user may involve the same type of communication as used to enter the password, namely, typing a string of characters such as ASCII characters, alphanumeric characters, or other known character sets in any language or convention for communication.

Other challenge and response systems can be used. For example, some online banking systems allow a user to register a particular computer with the Website, such that when logging in form the computer, a user ID and password is sufficient to gain access, but when using another computer, the user must answer a previously answered question to confirm the user's identity. In one system, exemplified by that of Horicon Bank (Appleton, Wis.), a set of questions is previously answered by the user, such as "What is your favorite hobby?" Answers are entered as part of the account information. These questions are then used (one is randomly selected) in future log-ins from new computers. The user must answer the question correctly to verify that access from the new computer is legitimate.

The use of smart cards with challenge and response systems for authentication are described in U.S. Pat. No. 5,778,072, herein incorporated by reference.

In all challenge and response systems, one useful tool within the scope of the present invention is to provide two or more sets of responses to handle secure and insecure settings, or to otherwise vary the degree of access provided. In general, there can be a primary response that provides full access, and one or more secondary responses that provides limited access or generates other actions to be taken, optionally including alarms or surveillance requests. The primary response may include a covert password as part of the response. Alternatively, a covert password may be used to create a secondary response.

With CAPTCHA and related systems, a covert password can be the presence of a predetermined type of error in providing the response. For example, the user may leave off the second letter of the string when it is entered to convey that an insecure setting exists and access should be limited or feigned. Alternatively, as a primary password with a covert element, the system may be preconfigured to require that the user repeat a given character, such as repeating the first or last character of CAPTCHA string, in order to gain full access. Thus, when the string "gOpkrS" is presented in a CAPTCHA, for full access in a secure setting, the user may be required to enter "gOpkrSS". Entry of the "normal" string, "gOpkrS" would signal that an unauthorized user is making access or that an insecure setting is present. Depending on previously entered choices or the prior system configuration, the access to the system may then be feigned or limited, or other actions may be implemented automatically as the computer-based security system recognizes an insecure situation.

Likewise, when entering answers to a challenge and response system, an deliberate "error" such as a typo or extra numeral added after the "correct" answer can be required for full access.

Alternatively, a common word may be used for all answers to signal insecure settings.

Modified CAPTCHA entry can be a powerful tool in protecting privacy by covertly signaling information associated with login. CAPTCHA medication can thus serve as a way to create a primary password comprising an overt portion and a CAPTCHA-based covert portion, or as a way of creating a secondary password, or both.

For example, a user may have previously configured a login system to require an overt password and a CAPTCHA entry, such that a deliberate error of a predetermined type in the CAPTCHA entry is required to create a two-part primary password, whereas entry of a visually "correct" CAPTCHA coupled with the same overt password creates a secondary password that restricts user access, denies user access, or results in feigned access or other predetermined actions. For example, a user with an online email account may have the following information entered into a preconfigured user login profile:

a. Username: *penguin^2323
b. Password: batter^rams!47
c. Modified CAPTCHA validation: 2nd character shift up 2
d. Restricted access: Hide email classified as sensitive The rule "CAPTCHA validation: 2nd letter shift up 2" means that the second letter of the properly interpreted alphanumeric CAPTCHA string must be shifted up two units in the alphabet or digits. In this rule, the letter "e" should be entered as "g", the number "5" as "7", etc. A rule may specify how to handle the letters "y" and "z" (e.g., enter "a" and "b") and the digits "8" and "9" (e.g., enter "0" and "1", respectively). Thus, the CAPTCHA string "PINSafety.com" should be entered as "PKNSafety.com" for full access. If a user were to enter the unmodified string "PINSafety.com", the computerized system would treat the properly entered overt password and the "correctly" entered unmodified CAPTCHA string as the entry of a secondary password, resulting in application of the rules established for restricted access, which in this case would comprise the hiding of all email that has been classified as sensitive.

Other examples of rules that could be used for modified CAPTCHA validation, requiring a deliberate but recognizable error entered by the user for full access:

(a) Absence of a specified character (missing first character, missing last character, missing first consonant, etc.) or of multiple characters (e.g., leave off first and last characters);
(b) Addition of one or more characters (e.g., insertion of a caret symbol or pound sign anywhere in the string or in a specific location such as at the end or beginning of the string, add a space at the beginning or end of the string, insert an exclamation mark after the first consonant, insert the number "7" after the fourth character, etc.); and (c) Replacing one or more characters of the CAPTCHA string, such as replacing a specified character (e.g., the second from the end) with another character. The replacement character may be static, such as entry of an asterisk or a hyphen, or may be a function of the replaced character.

Mnemonic techniques may be used to assist the user in remembering the rules to apply for entry of primary or secondary passwords. Subtle graphics may be present in the user interface to convey customized reminders. For example, consider the case of an account with a primary password requiring a deliberate error in a CAPTCHA by toggling the shift key for entry of the 4th character (e.g., "b" would be entered as "B", "P" as "p", "7" as "&" on a conventional US keyboard, and "$" as "4" on a conventional US keyboard). Further, the account may be configured to recognize a secondary password as a secondary password if a space is added to the string, whereas entry of the seemingly correct CAPTCHA results in feigned access. In this case, it would be helpful to remind a user of the rule for the fourth character for primary access and of the rule about the space for emergency notification. In one version, the user may create or select a small image that can be displayed in a predetermined portion of the screen, adapted to appear as an ordinary part of the background or of other parts of the user interface.

In some cases, the CAPTCHA feature may be associated with a link, button, or other tool that can regenerate a CAPTCHA in the event that a user has difficulty reading the version being displayed. The regenerated CAPTCHA may employ the same text but may be displayed with different graphical characteristics, such as different distortions of the text and/or different background graphics. Alternatively, a new CAPTCHA string may be displayed, with the required response from the user correspondingly modified. Such regeneration tools may be included in the covert signals that a user can enter. For example, the user may deliberately regenerate the CAPTCHA a predetermined number of times as a covert signal associated with particular rules. Or the user may be required to regenerate the CAPTCHA once, whereupon the regenerated CAPTCHA will convey covert information as part of an additional challenge and response. For example, overlapping characters in the redisplayed CAPTCHA may be a signal requiring the user to modify the CAPTCHA by doubling one of the overlapping characters (e.g., a displayed string of "ML359" with the 3 and 5 overlapping could require a response of "ML3359" to be validated as a component of a primary password).

Note that the system may also be configured to handle alternate entries possible with some non-US keyboards. In one version, the system can recognize the use of a non-US keyboard and modify the expected inputs for the security system responsive to the keyboard.

Further Details

Figure 15:
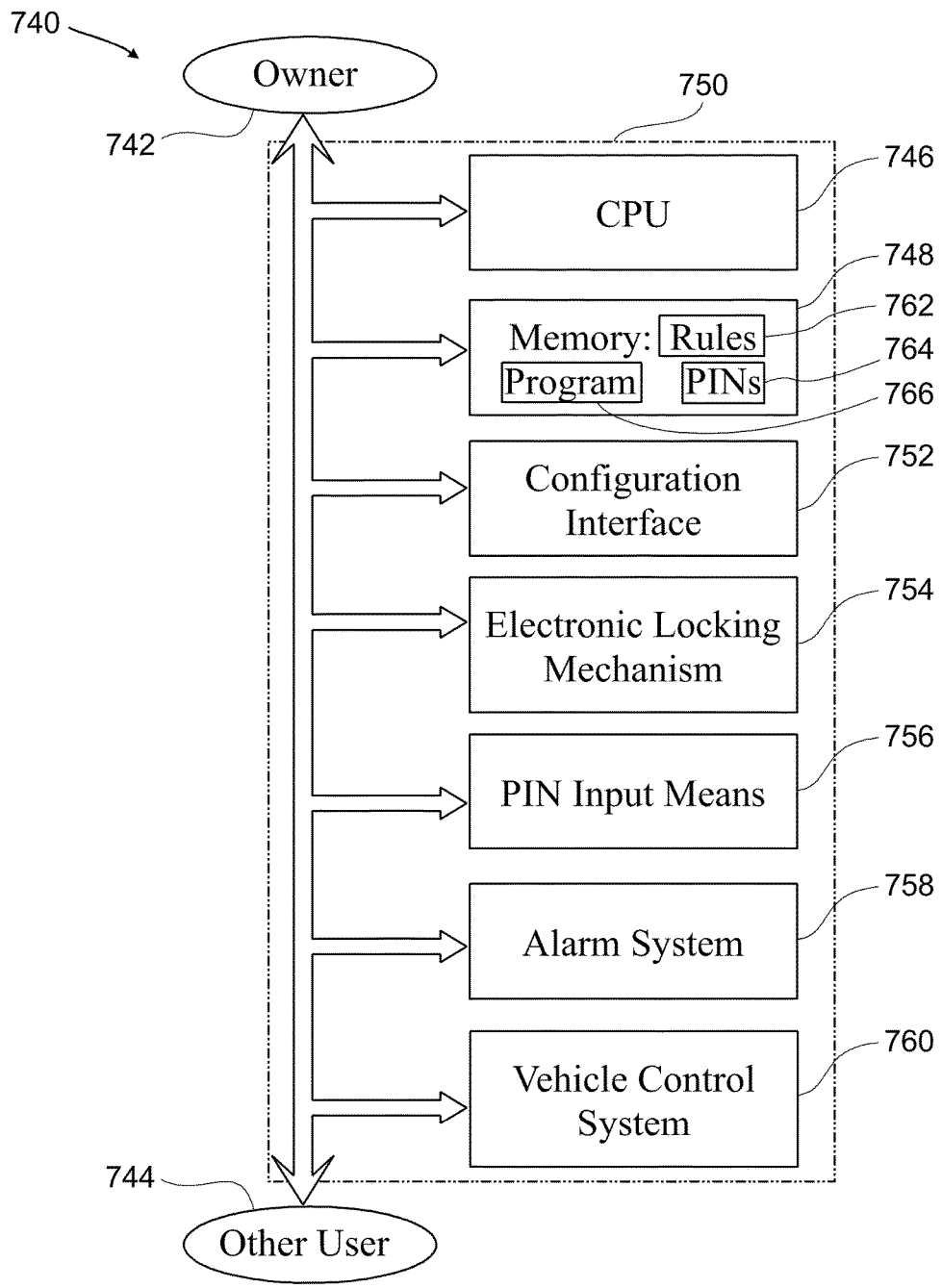
FIG. 15 depicts a vehicular security system according to aspects of the present invention.

FIG. 15 illustrates aspects of a vehicular security system 740 for protecting a vehicle 750, which may be a car, bus, truck, ship, boat, submarine, airplane, helicopter, motorcycle, motorized scooter, personal transport device such as a Human Transporter device marketed by Segway (Bedford, N.H.), tank or other military vehicle, etc. The vehicle 750 comprises an electronic locking mechanism 754 which may, for example, lock a door or other access means, or may lock means for starting or operating the vehicle. Access to the vehicle 750 requires input of a PIN (a password) via PIN input means 756, which may be a keypad pad near a door handle, a microphone for receiving a spoken PIN, a wireless PIN transmitted by a portable security device to a receiving antenna associated with the vehicle, or a covert PIN or password to be coupled with an overt access means such as the use of key or other physical token. The received PIN is interpreted by a program 766 residing in memory 748 as executed by a CPU 746 according to rules 762 stored in memory 748. It is compared to stored PINs 764 in memory 748 in light of the rule 762 to determine what level of access can be provided to the person attempting to use the vehicle 750, whether it is the owner 742 or another use 744. If the PIN proves to be acceptable as a component of a primary password and other required components are in place (e.g., the proper key or RF signal or other user credentials), then the program 766 can instruct the electronic locking mechanism 754 to allow the vehicle 750 to operate normally. If the PIN is interpreted to be a secondary password, then rules 762 in memory 748 can be implemented to determine a limited level of access to be provided, including optional activation of an alarm system 758 that may generate a silent alarm or automatically send an alert to the owner 742 and/or authorities, or optionally may generate any other kind of alarm, as defined by the rules 766 in memory 748. The program 766 may also instruct a vehicle control system 760 to provide limitations to the performance of the vehicle 750, such as limiting the speed or distance that the vehicle can go, or causing it to appear to malfunction after a predetermined length of time or distance traveled, or if the vehicle travels to or away from a predetermined location, which may involve the use of GPS or other tracking means (not shown) to provide the location information.

The rules 762 and PINs 764 in memory 748 can be entered or modified by an authorized owner 742 or other authorized party using a configuration interface 752. This may comprise an graphical user interface provided by a control panel display (e.g., LCD display) in the vehicle, or may require temporarily attaching a computer or other programming or data downloading device to the vehicle 750 to allow rules and date configured on a remote computer to be downloaded to the memory of the vehicle. The configuration interface will typically require credentials from the owner (e.g., a primary password that may include a hidden action) to modify the information in memory 748, and may be substantially more difficult to access and modify than the level of credentials required to access and operate the vehicle 750. Using the configuration interface 752, the owner 742 or other authorized party can configure the security system 740 to recognize and respond to a selected primary passwords and to one or more secondary passwords, and to customize the rules 762 that are applied in response to recognizing a primary or secondary password. Generally, access attempts that fail to provide recognized primary passwords or secondary passwords will result in denied access, whereas limited or feigned access can be provided in response to the use of a secondary password, which may be helpful when under duress or other situations.

The concepts described with respect to FIG. 15 can also be applied to many non-vehicular systems, such as safes, home security systems, etc., with the exception that the vehicle control system 760 could be eliminated or replaced with another suitable control system, such as one which turns off the power to a powered or lit asset or otherwise compromises its performance in response to receipt of a secondary password.

The security systems of the present invention can be modified according to the needs of the user. For example, when a user travels or is away from home, the security systems associated with credit cards, home computers, computer-accessible accounts, vehicles, safes, bank accounts, and so forth may be modified to require a higher level of security, such as adding a challenge and response system or requiring multiple confirmations of user identity, or limiting transactions or access in general.

Figure 16:
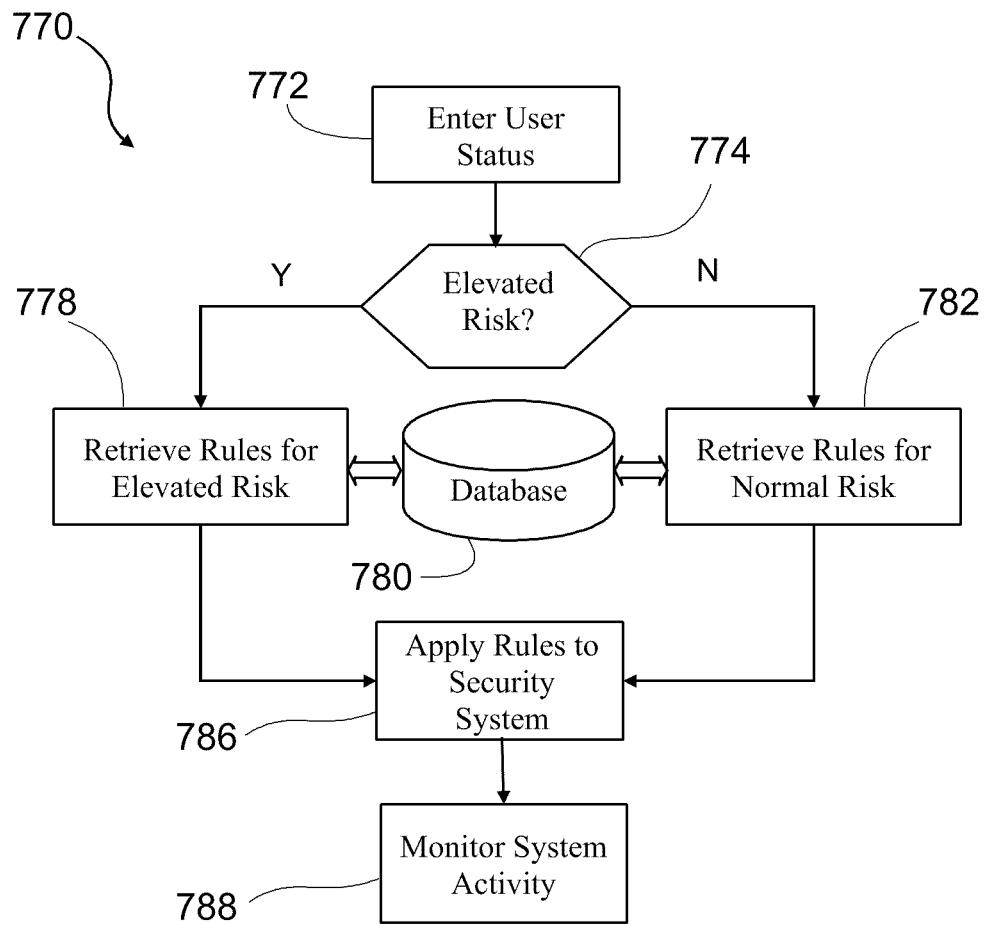
FIG. 16 depicts a security system according to the present invention in which the set of rules applied can vary depending on the status of the asset owner.

FIG. 16 depicts one such embodiment of a security system 770, in which a change in the status of a user can be used to modify the performance of the system. In FIG. 16, the user status is entered 772, which can include a telephone call or email to a central system that manages the security system 770, or it can include making an entry into a computer or other interface unit that is directly linked to the security system or accesses the security system via a network such as the Internet. A change in security status may be automatically detected and entered based on other data, such as location data from a GPS indicating that the user is away. After receiving the user status input 772, the security system 770 evaluates the risk 774 to determine if it corresponds to elevated risk or not. If there is elevated risk, perhaps due to being out of the country away from an asset such as a home, car, or safe, the system retrieves rules for elevated risk 778 from a database 780 or other memory device, which may be physically part of a local security system or may be remote and accessed via a network (not shown). If the step of determining if there is elevated risk 774 results in a determination that risk is not elevated, then rules are retrieved corresponding to normal risk 782. In this system 770, then, there are two or more sets of rules on the database 780 or other memory storage means that can be applied responsive to user status data. Whatever the retrieved rules are, they are applied to the security system 786 to govern the response of the security system to access attempts, requiring various credentials that may include two-part passwords, additional challenge and response systems, various hidden actions, etc. After the rules are applied 786, the security system 770 can then continue to monitor system activity 788 (e.g., respond to login attempts, transaction attempts, etc.).

In one version, security system can employ the principles and systems described in US20060253388, "Financial Transaction System," published Nov. 9, 2006, by D. C. Newton, for which the systems described in claims 6 through 13, paragraphs 25 and 40-45, and FIGS. 1-5 are herein incorporated by reference to the extent that they are noncontradictory herewith, for the purpose of illustrating means for a user to change the status of a security system or have a security system that considers user status (e.g., location or vacation status) in monitoring transactions to determine possible unauthorized attempts to access an asset.

Figure 17:
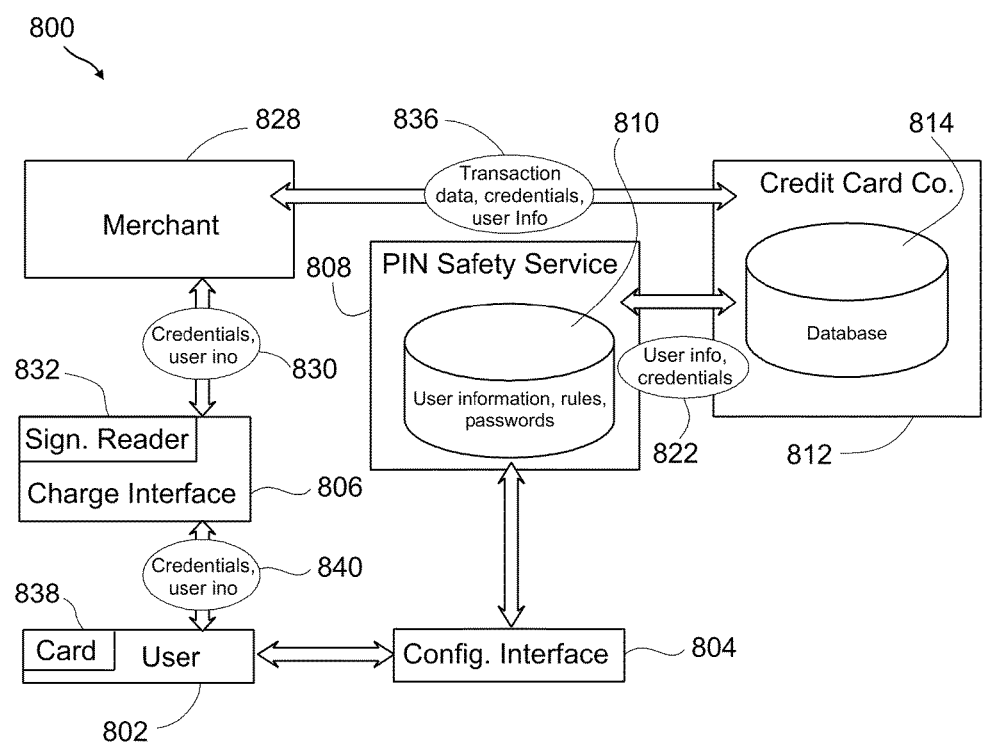
FIG. 17 shows a security system for managing credit card transactions according to the present invention.

FIG. 17 shows another aspect of the present invention, wherein a security system 800 manages credit card transactions. A PIN Safety Service 808 operates a security database 810 containing or linking together user information, security rules, and password information that the user 802 can configure using a configuration interface 804, which may be a graphical user interface over a network, a kiosk in a secure setting such as in a bank, a live operator who can configure the system according to verbal data given by the user 802, a data file or printed instructions transmitted in person, by mail, by email, etc., for input by the PIN Safety Service, etc. The PIN Safety Service 808 communicates with a credit card company 812 having a credit database 814 for tracking transactions and user information. User information and credentials 822 may be shared between the security database 810 and the credit database 814.

When the user 802 wishes to make a payment to a merchant 828, the user 802 using the card 838 (or information therefrom for remote transactions such as online purchases) provides credentials and other user information 840 through a charge interface 806 that may include various hardware devices such as a signature reader 832. The credentials may include a password, optionally including a verification code (not shown). The password may include a covert password component such as a modified verification code (a secret alteration to the printed verification on the card 838), or a hidden action taken in using the charge interface 806, such as a secret stylus stroke or motion in a predetermined manner on the signature reader 832, in accordance with predetermined rules specified in the rules of the security database 810 of the PIN Safety Service 808. The credentials and user info 830 transmitted to, through, or on behalf of the merchant 828 for the purchase are part of the data 836 sent to the credit card company 812 as part of an authorization request. The transmitted data 836 from the merchant 828 to the credit card company 812, or authorization request, thus includes credentials that may comprise overt and covert password components (not shown), wherein the covert password components may include hidden actions taken with a signature reader 832, a modified verification code (not shown) for the credit card 838, a response to a challenge and response system (not shown) provided through the charge interface 832, including a CAPTCHA or other challenge and response system capable of providing a covert password component, biometric information that may also include hidden actions taken with a biometric input device (not shown) that could replace the signature reader 832 or be in addition thereto, and the like.

The credit card company 812 upon receiving data 836 from the merchant 828 for a transaction involving the user 802 compares the user info and credentials with information stored in the credit database 814, which can contain information previously supplied from the PIN Safety Service 808 regarding the user's account or can be supplemented by accessing the security database 810 as needed. While the required data can be obtained and processed in any of several ways known to those in the art, the submitted user credentials received in the attempted transaction with the merchant 828 are compared with the known credentials that the credit card company 812 associates with the user 802. If the credentials comprise a primary password, the transaction is authorized as requested. If the credentials comprise a secondary password, actions specified in the rules in the security database 810 can be implemented, such as denying the transaction, authorizing the transaction if the dollar amount is less than a predetermined threshold, sending an alert signal to designated parties, requiring additional confirmation of user identity, etc. If the credentials do not match rules given for primary or secondary passwords, the transaction may simply be refused. And as previously states, the credentials may include a password with a covert component (e.g., a hidden action in use of the signature reader 832, entry of a verification code, or other covert steps to supply a covert component of a password), etc., that can be used to distinguish a primary from a secondary password or to distinguish which of several secondary multicomponent passwords has been entered.

The system 800 of FIG. 17 can also be adapted for a variety of circumstances in which credit card orders are executed through a third party, in which case the "Merchant" 828 may comprise two or more entities (not shown) working in collaboration.

Figure 18:
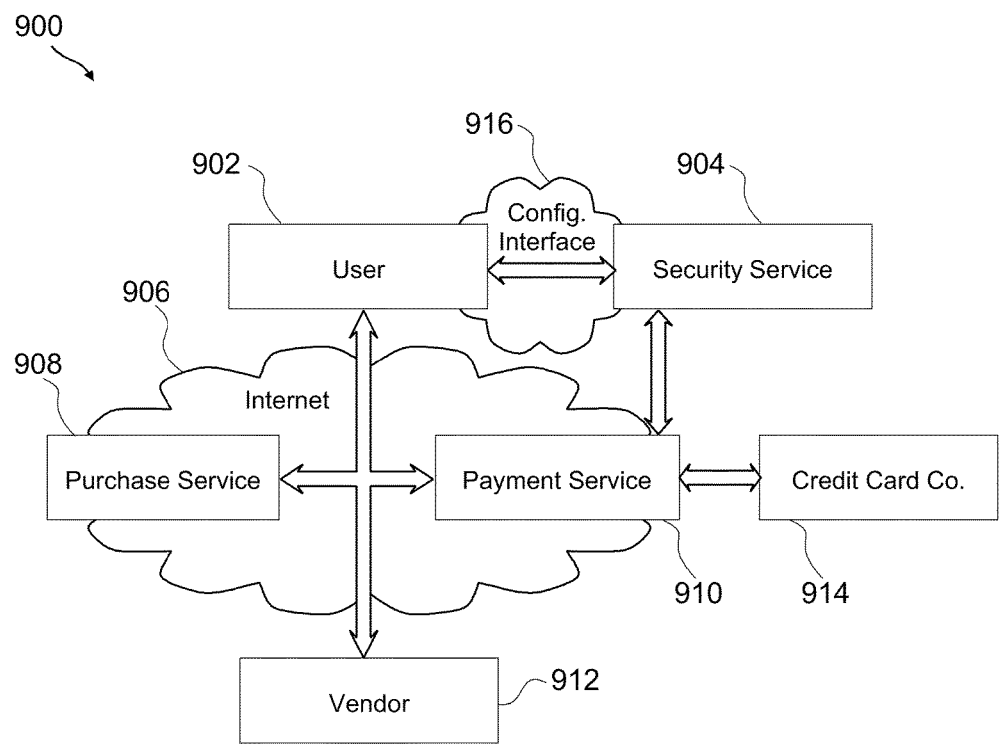
FIG. 18 depicts a system and method for a user makes a purchase from a vendor using a purchase service and with a payment service, wherein security features of the present invention are provided.

One such example is illustrated in FIG. 18, depicting a system 900 employing the Internet 906 or other network means in which a user 902 makes a purchase from a vendor 912 using a purchase service 908 such as Ebay or other auction service or marketing firm, in conjunction with a payment service 910 such as PayPal. In this case, a transaction through the purchase service 908 may result in payment to a vendor 912 through an account with the payment service 910, which bills the credit card of the user 902 through the credit card company 914. In this system, the user's credit card information is not seen by the vendor 912 from whom the purchase is made, thus increasing security relative to the credit card account with the credit card company 914. Nevertheless, there is risk that the account with the payment service 910 may be compromised or abused by an unauthorized user, or accessed under duress. To reduce such risks, according to certain aspects of the present invention, a covert password component (not shown) may be included with an overt password (the password the user normally enters to access the payment service 910 such as a PayPal account or other account). In this system, the user 902 may log in to the payment service 910 over the Internet 906 or enter the associated account information using the security service 904 via a configuration interface 916 for configuring primary and secondary passwords for various accounts, and also to optionally configure security rules (not shown) for responding to access attempts using a secondary password or other factors that may indicate a security risk. The configuration interface 916 can provide options for covert password components, such as selection of the type of covert password used, which may, for example, be related to the timing of overt actions (e.g., clicking a button or pushing the entering key when the last digit of the time display is a "3" or some other number, or providing a pause of a certain length between two overt actions such as entering the password characters and hitting the "Enter" key), or may be related to actions relative to specific regions of an interface in authorizing payment through the payment service 910, such as submitting a covert password component by clicking on the "E" of the "Enter" button, or making a specific motion with the mouse, etc. In one version, the choice of Web browser used to access an account can be part of the information that can be provided during login.

In one version, the configuration interface 918 may provide an applet or other software component that must be downloaded to the user's computer (not shown) to be able to properly capture hidden actions or other covert components specified for the covert component when conventional Web browsers or operating systems do not make the desired information readily available to the interface. For example, software may need to be installed to respond to specific motions of cursor prior to or after entry of a password, if the user has requested a covert password component responsive to such actions. To detect that a loop, for example, has been made above the Enter key before it is clicked, a cursor-tracking software component may need to be activated for use by the login page of one or more accounts being configured. Alternatively, such software may be automatically downloaded and executed when the user accesses the login page for the security service 904, the payment service 910, or the purchase service 908, or it may be downloaded after the user has logged in with a primary or secondary password to any one or more of these services operating in collaboration with the security service 904. In one case, entry of the two-part (overt and covert) password is a two-step process, comprising entry of an overt password for authorizing payment by the payment service 910, for example, followed by entry of the covert component to complete a primary password (or a secondary password, if desired). Alternatively, many hidden actions can be provided by properly designed Webpages using Javascript code, applets, DHTML, XML, or even convention HTML code. For example, a graphical button or other component of a Web page may be configured as a map with identification of the x and y coordinated of a mouseclick being included in information that is obtained when a user clicks on the button. Alternatively, a button may comprise multiple image slices to allow the location of a click to be resolved.

Password entry or supplementation of a password based on tracked motion of a mouse is known and is described by Wael Chatila in "Using AJAX for Image Passwords—AJAX Security Part 1 of 3," at http://waelchatila.com/2005/09/18/1127075317148.html, as viewed Jan. 7, 2007. Source code for a simple version of the mouse-motion recognition system is provided at http://www.icegreen.com/ajaxlogin/ajax-mouselogin.zip, as viewed Jan. 7, 2007. The system is said to use javascript and XMLHttpRequest.

In one version, no special hidden actions are tracked when the payment service 910 account and password are entered on a payment page, but thereafter, a confirmation page is provided which is responsive to preconfigured security information for the user's account, as defined in rules associated with the security service 904 that communicates with the payment service 910. Suitable software for tracking the selected hidden action or actions may be automatically downloaded before or while the confirmation page is being provided, or the conformation page may be automatically generated with suitable scripts or other components to monitor the appropriate hidden actions suitable for the user's preconfigured security measures. Alternatively, the confirmation page may have a standard format and associated scripts for all users, whether advanced security features have been added or not, allowing one or more types of hidden actions to be monitored. For example, the user may have selected a hidden action requiring that the cursor hover over a certain image or word on the screen for at least three seconds prior to clicking on the "Pay" button that confirms payment. Failure to do so may result in the access attempt to be considered as access via a secondary password, with suitable security measures automatically taken as a result. A "second chance" option may be available, if the user has previously selected that as an option in the event of forgetting to provide the covert component of the primary password. The second chance may be possible by simply returning to the previous page and re-entering the overt component of the primary password, followed by providing the correct covert component, or the confirmation page may be redisplayed with a warning that there was a problem, asking the user to confirm payment again. Alternatively, a challenge and response system may be activated to allow the user to confirm the user's identify (this may be, for example, an option provided in response to entry of a secondary password comprising the overt component of the primary password in the absence of a covert component), wherein the challenge and response system itself may comprise a requirement for a hidden action such as a deliberate error followed by correction, specific mouse motions, etc.

Thus, returning to the example of making a payment using a payment service 910 account, a user may have previously modified the account's security information via the configuration interface 916 in accessing the security service 905 to require that valid charges using the payment service 910 receive a primary password comprising a covert component provided by previously downloaded software for tracking mouse motion, such that the user must move the mouse to form an ellipse around a particular icon provided on the payment page prior to clicking the "Pay" button or pushing the enter key. Failure to do so may result in an error message that can let the user know that another attempt should be made, or can cancel the transaction, or perform whatever security-related or other actions the user or administrator has specified in the preconfigured rules for the account, including limited access of various kinds.

Preventing Phishing and Fake Login Pages

Some aspects of the present invention can be applied to reduce the risk of others stealing login information using fake login pages or fake sites designed to look like a trusted site such as a bank's login page. An anti-phishing scheme can be established that requires a covert validation action—a form of a covert password—as part of the login process. Just as a CAPTCHA can allow a computer system to verify that a human is attempting to login, so can a covert validation action be used to verify that a Website is being operated by a legitimate party.

In this version of the invention, a user in essence applies a challenge and response system prior to using a legitimate password or at least prior to using a primary password. The challenge and response system comprises previously configured rules to allow the user to authenticate the system in a covert manner not readily interpreted by an observer. In response to actions taken by the user in logging in, without using the primary login information, the computer system returns a response the user can recognize as legitimate.

Figure 19:
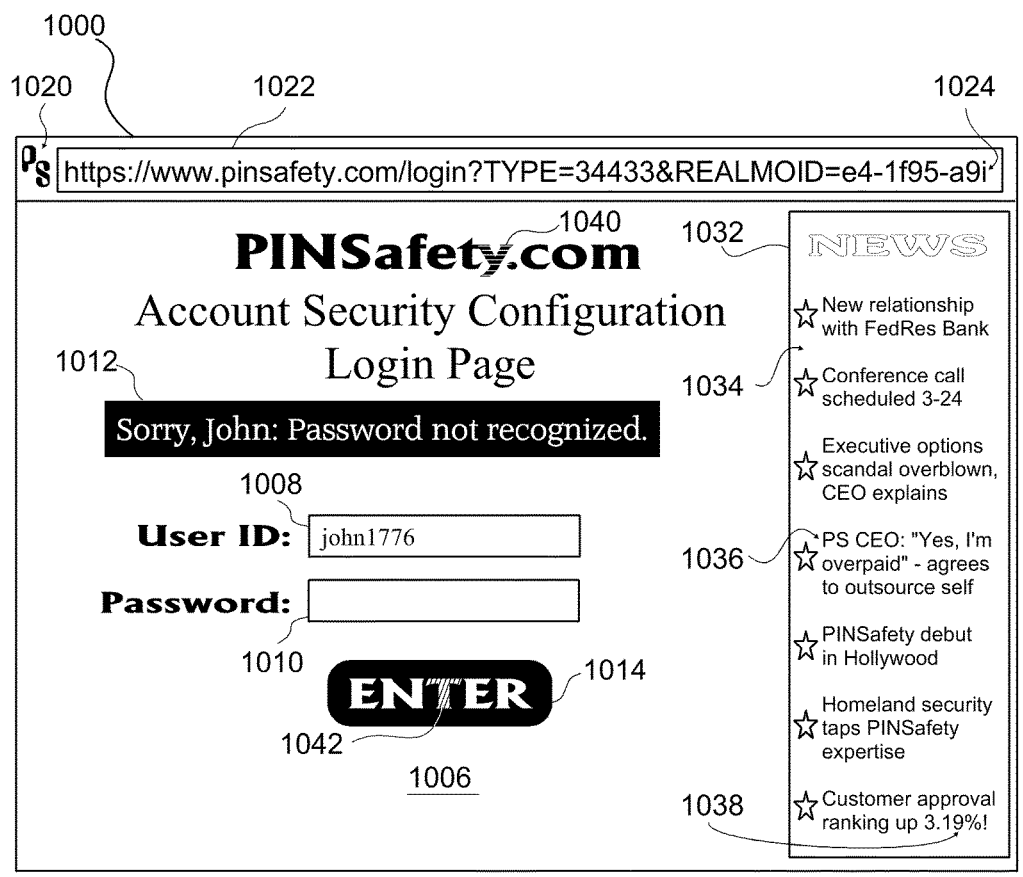
FIG. 19 depicts a portion of graphical user interface offering a reverse challenge and response system to allow a user to verify that the remote computer system operating the interface is legitimate.

FIG. 19 depicts a portion of graphical user interface 1000 that illustrates some aspects of a system in which a user (not shown) can verify that a Web site or other electronic interface is legitimate, or in other words, that it is operated by an authorized service as opposed to being sham for extracting information from a user. While the interface 1000 is depicted as that of a Web site, it could also be the graphical user interface of any other security system, particular those that communicate with a server or CPU over a network. The portion of the displayed interface 1000 comprises a Web page display 1006 having a user ID input field 1008, a password field 1010, and an enter button 1014.

Web page display 1006 is in a state created after the user has attempted to login using an incorrect password under previously configured security rules. This state is reached after the user enters a user ID into the user ID field 1008, where "john1776" has been entered. To verify the legitimacy of the service, the user enters an incorrect password in the password field 1010. The incorrect password may be any arbitrary string, or may be a secondary password having certain characteristics as specified by the user. For example, the user may specific one or more strings to be recognized as a secondary password. Alternatively, the user may specify that any string containing three vowels or beginning with the letter "y" or other arbitrary criteria. After clicking on the enter button 1014 or pushing the enter key, if desired, the system (not shown) of a legitimate site will recognize the user id and then interpret the password submitted according to the previously configured rules for that user. If the entered password fits the criteria in the preconfigured rules, a confirmation clue will be provided to the user to allow the user to recognize that the service is legitimate.

The clue returned by the server in this "reverse challenge and response system" can be provided in a wide variety of ways, several of which are shown in FIG. 19, where we consider the case of a 9-digit arbitrary incorrect password having been previously entered in the password field 1010. In one version, the confirmation clue is provided in the newly displayed URL in the address field 1022 for the Web page shown in the displayed portion of graphical user interface 1000. According to one hypothetical convention the user may have configured in the rules governing access to the current account, the password length is reflected in the trailing characters 1024 of the returned URL, where "9i" are shown as the last two characters. Since "i" is the ninth letter of the alphabet, the last character of the URL may be the clue, or the penultimate character could be the clue, or both could serve as the clue.

In another version, the favicon 1020 ("favorite icon"—the icon displayed to the left of the address field 1022 in most Web browsers, if the Website is configured to have a favicon file to be displayed) may be modified as a graphical confirmation to the user that the user is accessing the legitimate Website. Here the displayed favicon, a form of the letters "PS", presumably differ from the initial icon that was displayed prior to submitting the incorrect password. Such a change may be most suitable when the user has specific requirements for a qualifying "incorrect" password (e.g., a secondary password), such that the modified favicon is not displayed for any incorrect password. In one version, the user may select the favicon that will be displayed, requiring suitable software to manage favicon display from the server.

In another version, a message field 1012 returns a customized error message that can assure the user that a legitimate site is being access. Here, the customized phrase "Sorry, John" is displayed, a phrase that the user has selected in the rules for site access. The phrase may be displayed for any incorrect password or for qualifying secondary passwords.

In another version, small changes in graphical elements may be provided in response to an incorrect password, particular one that is recognized as a secondary password with specific properties versus any arbitrary entry. One such change, for example, is noted as a modified font for the letter "y" 1040 shown in a title of the page. The modification shown here is depicted as fine white horizontal lines over the originally solid black "y" 1040. Another possibility is shown as a modified "T" 1042 in the enter button 1014, where diagonal black lines are superimposed over the originally solid white "T" 1042.

In another version, a variable content area, shown here as a news field 1032, contains information which users naturally expect to vary with time. This variable content could be, for example, an advertisement, stock quotes, headlines from a news feed system, weather data, a clock or calendar, etc., and part of that content may be updated to display information responsive to the incorrect password entered. A section of the variable content area may be modified to graphically represent the password length (e.g., an image of "9") or some other aspect of the incorrect password, such as the first or last letter, number of vowels, etc., according to user-defined rules for that account. In one specific version shown in FIG. 19, the news field 1032 contains a series of headlines 1034 that may be hyperlinks to full stories. In one version, entry of a recognized secondary password results in a modified headline according to customized rules established by the user. In one version, a list of user-defined headlines may be used to select one such headline and add it to headlines 1034 or replace a previous headline with it. A user-defined custom headline 1036 is shown as one example. In another version, the customized headline may simply be modification of one part of an existing headline responsive to a characteristic of the enter incorrect password, such as the password length. For example, a headline containing a number 1038 is shown as having been modified with a trailing digit, a "9" in this case, responsive to the length of an entered incorrect password. Thus, the number originally displayed may have been 3.11, but after the user enters an incorrect password of length 9, the number is changed to 3.19, as specified by user-defined options for this reverse challenge and response system for user login.

In the various examples associated with FIG. 19, a user with username "John1776" may have a primary password "cos&34@@2DX". The user can verify the legitimacy of the system by attempting to login using a password of "johnjohn1", an incorrect password of length 9. In response, the computer accesses the computer validation login rules for account "John1776", identifies bogus password length as the response required to the challenge, and in return displays an error message that covertly contains an acknowledgement of the recognized password length. Alternatively, "johnjohn1" may be recognized as a secondary password that does not provide actual access to the system, but provides a returned confirmation clue to verify that the system being accessed is a legitimate or trusted system authorized to provide security to the user's account or other assets.

Many other rules can be envisioned in which a returned URL after a login error covertly contains information responsive to the user's challenge. Other such rules can be:

(a) The URL contains a string of text after a question mark beginning with the first character entered in the bogus password. For example, a bogus password of "johnscool1" might receive an error message with the URL "https://login.pinsafety.com/login?error=error&er34?jju34#retry".

(b) URL contains a word in a previously selected foreign language giving the length of the bogus password. For example, for a bogus password length of 9, the transliterated Mandarin word "jiu" might be displayed in the URL associated with the error message.

(c) The URL contains two digits in preconfigured locations, one that gives the number of consonants in the bogus password and one that gives the number of vowels. Alternatively, the counts of upper case and lower case characters could be given, or digits and alphanumeric characters, etc. Such an "error" URL might appear as "https://login.pinsafety.com/login?error=error&er^retry?=mersw4iiop5", where the letters after the final question mark are random and the embedded numbers 4 and 5 characterize aspects of the entered bogus password.

The confirmation clue may also be displayed in many other ways with graphics or text on the login page (i.e., on the page displaying an error message and asking the user to login in again). The confirmation clue can be conveyed in such things as the displayed font color, the font size, graphics on the page, locations of breaks in the text, letters that are selectively altered in terms of color, size, font, text decoration (e.g., italic vs. non-italic text), the playing of sounds such as the tone of a beep or number of beeps that are played, etc. On one version, the URL of a hyperlink on that page contains information responsive to the bogus login information provide by the user. For example, there may be a hyperlink displayed as "Forgot your password?" When the cursor is placed over the hyperlink, the status bar, a pop up, a displayed title, or other portions of the a Web browser can display the URL of the link, which may contain a string that conveys the computer systems response according to the preconfigured rules, or can display additional text or other information. In another version, comments in the source code of the response page contain information responsive to the bogus login information.

Regarding graphics that contain a response to the user's challenge, an image displayed on the main login page may be replaced with a second image when the error message is displayed. For example, one or more pixels in a logo may be altered, the length of a bar changed, the color of a person's eyes altered, the time displayed on a clock or watch changed, etc., according to preconfigured rules for the user. Multiple users may customize their rules or select from one of several previously established rules, allowing a finite number of image files to be used to provide rule-based responses to the challenges of an arbitrary number of registered users.

Any one or more of these confirmation clue techniques may be used, or any one or more of other conformation clues can be used. For example, a user may wish to provide three confirmation clues, one being a customized phrase returned in the message field 1012 in response to any arbitrary password, the other being a modified URL string with a trailing character 1024 indicative of password length, and a modified favicon 1020 that is only shown if the entered password meets certain criteria (e.g., is recognized as a secondary password).

Once the user is satisfied that the system is legitimate, based on its recognition and implementation of previously defined security rules for a reverse challenge and response login system, the user may then have confidence to provide the user's actual primary password to access the system. Overt and covert components may be present in the primary password.

The display of subtle confirmation clues according to user-specific security rules is not limited to the entry of incorrect passwords, but can be applied in response to the primary password as well. The use of subtle confirmation clues and/or reverse challenge and response systems to help a user verify the authenticity of a service or system is not limited to Web page access, but can apply to a wide variety of other systems such as logging in to a laptop computer (verifying, for example, that the laptop is indeed the device owned by the user, or a device actually owned by or controlled by a particular agency), logging in to any electronic system, accessing an account or other service over a telephone using a telephony system or operator-assisted system, accessing a bank account in person or by other means, accessing an ATM, etc.

Figure 20:
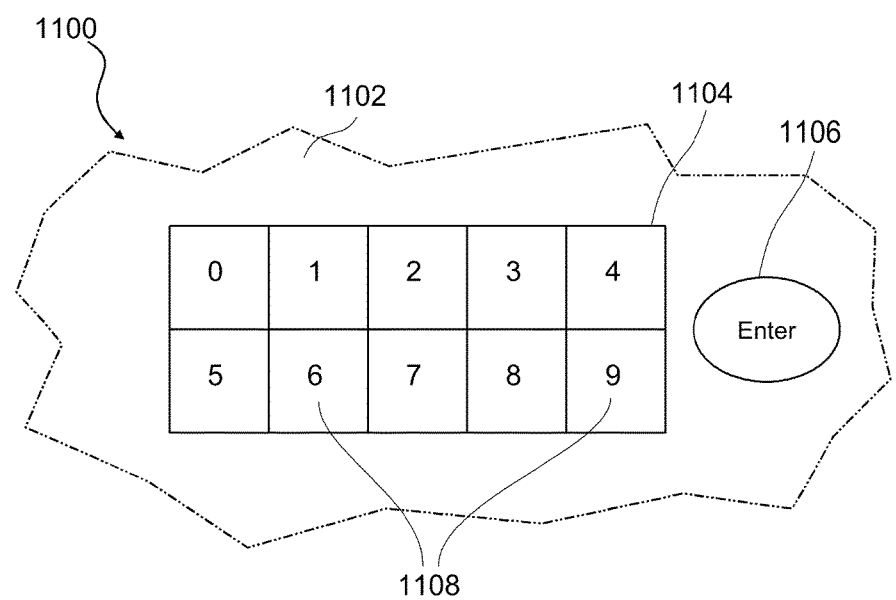
FIG. 20 depicts a representative password input system that could be part of a physical asset security system.

FIG. 20 depicts a representative password input system 1100 attached to a body 1102 that is part of or in a cooperative relationship with a larger physical asset security system (not shown) such as a safe (including a lock box, gun cabinet, secure file cabinet, etc.), a home security system, an automobile or other vehicle, a security system controlling access through a door, a weapons system, etc. The password input system 1100 comprises a keypad 1104, here shown as having keypad buttons 1108 for the digits 0 through 9, but which could be letters or any other symbols. An "Enter" button 1106 can be depressed after a sequence of keypad buttons 1108 has been depressed. The sequence defines an overt component to a password. Hidden actions may be added based on timing of the entry, applied pressure, length of time the Enter button 1106 is held down, or other actions involving other elements of the security system (not shown). Entering a recognized primary or secondary password can then result in access (full or limited) to the physical asset (not shown) protected by the security system that employs the password input system 1100.

Password Management

The present invention can be used in combination with known password management systems, such as systems that store multiple password for multiple accounts in a common place that can be accessed upon demand by a user. Multiple passwords for a single user can be managed with single-login systems or token-assisted multiple password management systems. A single password can be used, for example, to access the stored passwords and other stored login information to allow a user to then apply the stored information to facilitate rapid logging in to a selected account. Hardware systems can be used in which a fob or other device (e.g., a USB device, serial devices, etc.) is attached to a computer system to provide hardware-based authentication of the user and to provide access to stored login information. With such a device attached to a computer, the user may then automatically login to a password protected account, with software interacting with the attached device to automatically provide a remote system with the required login information for access. In using such a device, the user may be prompted to provide a single password that can then allow automatic entry of previously recorded login information.

For example, multiple primary password and secondary passwords can be stored and even generated using hardware-assisted password managers such as the Password Manager Token of Mandylion Labs (Oakton, Va.), a token that can manage user passwords, including generating complex strong passwords for multiple accounts and storing them in the token for use when needed. Access to the token itself is protected with a password in the form of "fingerkey pattern" that must be entered to be able to retrieve stored passwords.

Another prior system for managing multiple passwords, which can be adapted for use with various aspects of the present invention, is the single-login Factotum system of Bell Labs (Murray Hill, N.J., a division of Alcatel-Lucent, Paris, France), described at http://plan9.bell-labs.com/magic/man2html/4/factotum, as viewed Mar. 24, 2007, and discussed here by way of example only. The Factotum system, in conjunction with the Bell Labs Secure Store system for storing passwords, is said to allow a user to store and use multiple passwords that can be automatically provided to other servers when needed to simply authentication by the user, who no longer needs to remember multiple passwords other than the password needed for Factotum access. Factotum acts as an authentication agent for a user by managing a set of keys. A key is a collection of information used to authenticate a particular action that is stored as a list of attribute=value pairs, typically containing a user, an authentication domain, a protocol, and some secret data. In any authentic-cation, the caller typically acts as a client and the callee as a server. The server determines the authentication domain, sometimes after a negotiation with the client. Proof of identity for authentication is accomplished using secret information kept by Factotum. In order to perform single sign-on tasks, a user must include the username, password, certificate and encryption key information in the Secure Store program, which protects that information using AES (Advanced Encryption Standard). Secure Store resides on a network, where it can be accessed by the user. When a user logs into their system, the user types a single password into Factotum, an application running on a PC, which "unlocks" the passwords and other credentials held in Secure Store. When the user's password information is accessed and unencrypted, it is stored in RAM only to help protect the security of the information.

In one embodiment of the present invention, a password management system such as Factotum may also display preconfigured hidden actions or other covert components of primary or secondary passwords to aid the user in properly providing the primary or secondary passwords that are desired. In another embodiment, a password management system itself may be protected with a security system of the present invention providing limited or feigned access in response to entering a secondary password that may comprise a covert component.

Multiple passwords can be managed with a central account accessible via a network. For example, a user could create an account at a password management site where passwords for other participating services could be securely managed and equipped with rules to provide for emergency passwords, hidden passwords, and additional authentication systems such as text recognition and entry (challenge and response) systems.

Another system that can help manage passwords is given in "Storing Apparatus and Password Control Method," U.S. Pat. No. 7,165,267, issued Jan. 16, 2007 to Utsumi, Uchida, and Kobayashi, which describes a drive that preserves a default input password. When there is no password input from the user, the default input password is regarded as a user input password and is compared and collated with a password for access protection, thereby controlling the access protection. In this instance, if the default input password and the password for access protection have the same value, a collation coincidence is obtained. The drive permits the access without needing a password input of the user. When adapted according to aspects of the present invention, the system can further comprise secondary passwords or covert cues to automatically implement security rules for all or for selected accounts accessible via the system. Covert cues, for example, can be required for primary access, and the absence of such cues may be used to generate specified actions such as restricting or feigning account access.

When a single Website is used to manage multiple passwords, the site may be further protected with software analysis of keyboard dynamics to continuously monitor account use for possibly fraudulent or unauthorized use, and may periodically impose a challenge and response test or prompt for other means of verifying identity.

Access to multiple Websites or electronic accounts can also be managed using the master password system of U.S. Pat. Nos. 6,006,333 and 6,182,229, both issued to Nielsen, which disclose a client-side system for encoding, storing, and transmitting passwords based upon a master password. In this manner, the user need only remember the master password. The client-side system then recalls, decodes, and sends the actual password to each secure service requesting user authentication information. A more recent advance is the meta-password system described in U.S. Pat. No. 7,103,912, "User Authorization Management System Using a Meta-Password and Method for Same," issued Sep. 5, 2006 to Xia and Malloy. As described therein, a meta-password is established for an associated user. A repository is maintained which includes a list of network addresses and associated handles, each handle having an associated encoded password. A user authentication response sent by an associated user is intercepted. A network address is identified to which the authentication response is directed. A modified authentication response is generated based upon the authentication response and based upon the contents of the repository. The modified authentication response is transmitted to the identified network address via the network.

A variety of existing hardware systems can be adapted in developing or operating a system for administration of a central service for managing security rules for one or more other services each providing a password-protected asset access interface to protect an asset (where it is understood that each service may protect a different asset such as a banking asset, a stock brokerage asset, a credit card asset, etc., or that "an asset" can be broadly defined in some cases to have multiple components such as a credit card asset and a brokerage asset). Such systems can be operable over a computer network in communication with a processor operably coupled to a memory containing user-defined security rules and a memory containing programming instructions (the two memories can be combined on a single memory medium or a plurality of memory media), a database with account information relevant to one or more services protecting an asset, the processor being operable to execute the programming instructions stored in a memory, wherein the programming instructions include instructions to guide asset access interfaces each respectively associated with the password protected asset access services such that the asset access interfaces can recognize either a primary password or secondary password and apply distinct rules responsive to recognition of a primary password or secondary password according to the user-defined security rules. In such a system, the account information can be specify the account number and/or user credentials of the account owner, including credentials containing a secondary password or credentials comprising an overt password component. A contractual relationship may exist between the provider of the central service for managing security rules and the account providers of the various services protecting an asset, such that the respective services and the corresponding asset access interfaces respond according to the user-defined security rules when there is an attempt to access the respective asset via the respective service.

Conversion to Systems of the Present Invention

Conversion of an existing password system, including known static password systems, OTP systems and other two-factor or dynamic password systems, to a system of the present invention can be done in any of several ways. For example, an agency providing an existing password system can contract with a third party providing a server and/or Website adapted to provide means for defining primary and secondary passwords and associated rules to define actions such as security measures in response to either primary or secondary passwords or both. Secure information transferred between a server of the agency with the system of the third party can then allow the agency to provide the security access dictated by use of primary or secondary passwords for a given account, as configured by an administrator and/or an authorized user of the system, with custom configuration for individual users being available in some versions, while agency-wide (e.g., corporate-wide) or group-wide rules may be implemented for multiple users in other versions, with some degree of customization still available even then in some versions.

In some versions, conversion to systems of the present invention involves simply installing suitable software on a server of the agency adopting the system, wherein the software includes means for providing a user interface for identifying security rules, and means for establishing a database of security data related to primary and secondary passwords. Training of users may also be needed, but this can also be provided with training software installed on an agency server as part of the conversion. In some versions, installing an embodiment of the present invention may also comprise providing users with a security device such as a security token or smart card capable of generating OTPs, or capable of providing wireless security data that may include an OTP or other data. In such cases, installing a system of the present invention can involve many of the same steps involved in upgrading a static password system to a two-factor authentication system. See, for example, "AuthEngine: Embedding Strong Authentication in Existing Applications," available at http://www.cryptocard.com/site/CryptoCard_2.0_41/pdf/SSAuthengine20070126A4.p df, as viewed Feb. 4, 2007. This describes CRYPTOCard's AuthEngine system (CRYPTOCard, Ottawa, Ontario) Ottawa, Ontario, which comprises an authentication module that an agency's code calls to authenticate users accessing the system using OTP tokens, and an initialization module to configure individual tokens with seeds for random number generation, specification on password length, and other factors related to the OTP token. The software system can be installed as a .COM object (for Microsoft Windows), a .SO object for Linux or a JRE object for Javascript applications. The system is said to allow an agency to embed the AuthEngine system in existing applications without the need for a third party server. Such a system, for example, can also be adapted to operate within the scope of the present invention, also allowing agency's to provide primary and secondary passwords and associated security rules and optional customization features for use with existing enterprise systems or other existing password protected systems of the agency.

In one version, existing file servers such as network-attached storage (NAS) devices can be pointed at a third party server for servicing authentication requests according to the present invention. Use of any known Remote Access Solutions (RAS) can be implemented for use with the third party server, including VPN systems such as the Cisco VPN 3000 or Juniper SSL VPN, the Cisco PIX Firewall, the Citrix Access Gateway/Citrix Web Interface 4.0, Microsoft's Remote Routing and Access Service (RRAS), WatchGuard Firebox, and a variety of Web servers.

In general, the security management system of the present invention can be managed in-house by the client, back-end outsourced, or partly managed in-house and partly outsourced.

Signature Readers

Authorizing charges to credit card accounts or other account access systems can involve the use of signature readers. Signature readers typically simply record a signature and associate it with a transaction, but in some cases they can be configured to discriminate between authorized and unauthorized attempts at account access, such as by comparing a stored signature with a signature provided to the signature reader.

PIN pads may also be used with credit card or debit card entry (here the term "credit card" refers to account access in general and can include debit cards). A PIN plus a signature may be required for account access (e.g., to charge the account), or a PIN or signature alone may be used. By way of example, a signature reader that can be used within the scope of the present invention is the Abanco Credit Card Reader, Model OPABMSR2, of Abanco International, LLC (Rosemont, Ill.). Abanco offers a plug-in to extend the capabilities of Microsoft's Retail Management System (RMS) to handle payments. With the Abanco RMS Plug-in, the merchant has the ability to process credit card, PIN-based debit, electronic check verification and conversion, EBT and gift card transactions directly and can use signature capture and check imaging features supported by peripheral devices. Such systems can be extended, within the scope of the present invention, to further include means for providing secondary passwords or to convey security status information, optionally via covert means, to better protect the security of the account owner.

For example, with a credit card signature reader, the point-of-sale payment system may be configured to compare a portion of the signature image with information stored on a database to determine if there are grounds to suspect the validity of the transaction. For example, the system may be configured to require a covert marking that is not part of the user's normal signature. Such a covert marking may be a vertical line on the left-side of the signature, or a line across the top of the signature pad, a circle in the lower right hand corner of the signature pad, etc. Absence of the covert marking can signal that the user may not be authorized, and may trigger a challenge and response system, or a request to show additional identification, etc.

In one case, the covert marking can be made substantially undetectable to an observer, such as someone watching from behind the account user. For example, the covert marking made by a stylus on an electronic marking zone with LCD or other display means responsive to the motion of the stylus may be detected but not displayed when it is on the margins of the signature pad. In a related embodiment, reading of the account information prior to receiving the signature may trigger access to database information indicating that the display of a portion of the signature pad is to be turned off, such that a mark in the inactive portion can be read but will not be shown. Thus, for example, the scanning of credit card may result in reading a preconfigured rule indicating that a covert circle must be entered in the lower right-hand corner of the signature pad. That section may be inactivated automatically for display but remain active for reading, allowing the motion of a stylus in the lower right-hand corner to be read and compared to the required shape for covert validation without letting others readily detect what shape has been drawn. Alternatively, signature readers may be routinely provided with a region for a covert marking to be provided that is not displayed, much as passwords are typically not displayed as they are typed in a login-field. In any case, the covert marking can be used to further validate the identity of the account user, and failure to receive the required covert marking can then trigger alerts or other restrictions as preconfigured by the user, account owner, or system administrator. In one example, the validation system can merely determine whether a particular region of the signature pad received a mark or not, a simpler task than comparing the form of the mark to a database entry. Thus, for example, a covert component of the user validation entry can be the requirement to have a marking entered on the left edge of the signature pad, or some other region, which may be inactive or active relative to display of the marking. If the required covert mark is not received, then any one of the following actions could be implemented, by way of example:

(a) The account may be limited to no more than $100 in transactions within a 24-hour-period;

(b) An email alert can be sent to the credit card company, the owner, and a spouse of the owner, and an automated telephone call can be transmitted to the owner.

(c) An alert can be displayed to a teller or other agent requiring that the user of the card provide additional information.

(d) The transaction can be rejected and the card temporarily inactivated, requiring alternative payment means.

In addition to entries on the signature pad, other hidden actions can also be required and associated with use of the credit card or other device involved in a payment. For example, the signature pad may have buttons for identifying the type of card or for other purposes, such as "credit", "debit", "other", "cancel", "PIN", and "enter". A hidden action may be required involving the buttons, such as pressing "debit" once prior to entering "credit" twice.

In related embodiments, the hidden or covert actions such as displayed or undisplayed markings or deliberate "errors" with button entry may be used as secondary passwords, in essence, that covertly convey information about the security status. Thus, if a user is under duress, an undisplayed line drawn along the left margin of the signature entry, or the pressing or "debit" twice prior to entering "credit", may correspond to preconfigured rules to indicating an emergency condition such as duress, resulting in preconfigured account restrictions and other actions specified by the user or other agent. Such actions can include notification to authorities and other designated persons, deactivation of accounts, alerting of store security agents to investigate the situation, etc.

Methods and apparatus for the verification (sometimes miscalled "authentication") of handwritten signatures in order to provide security in financial transactions, access to buildings and areas, and the like, are known in the prior art. Such prior art methods and apparatus are disclosed for example, in the following U.S. Pat. Nos. 3,676,000; 3,781,109; 3,178; 3,166,625 issued to Brumley; U.S. Pat. No. 3,955,178 issued to Warfel; U.S. Pat. No. 3,620,590 issued to Barker; U.S. Pat. No. 3,579,186 issued to Johnson; and U.S. Pat. No. 3,806,704 issued to Shinal. See also U.S. Pat. No. 6,996,547.

Signature related systems can include signature verification based upon measurements relating to authentic signatures of the user, and may be coupled with a "gravity" prompt feature to alert the signatory as to the nature, seriousness and/or contents of what is being signed, as discussed in U.S. Pat. No. 6,381,344, "Method and System for the Capture, Storage, Transport and Authentication of Handwritten Signatures," issued Apr. 30, 2002 to Smithies and Newman, herein incorporated by reference to the extent it is non-contradictory herewith. The gravity prompt can be stored in the signature envelope as part of the record of the signing event. Rules governing the gravity prompt with covert information, especially in non-secure situations, may be implemented in the system.

Systems for capturing, transmitting, storing, and authenticating signatures include the following US patents, each of which is herein incorporated by reference to the extent that it is noncontradictory herewith: U.S. Pat. No. 6,381,344, "Method and System for the Capture, Storage, Transport and Authentication of Handwritten Signatures," U.S. Pat. No. 6,250,549, "Method for Authenticating Signatures and Memorabilia Kit Employing Same"; U.S. Pat. No. 6,091,835, "Method and System for Transcribing Electronic Affirmations"; U.S. Pat. No. 6,064,751, "Document and Signature Data Capture System and Method"; U.S. Pat. No. 5,818,955, "Document and Signature Verification System and Method"; U.S. Pat. No. 5,680,470, "Method of Automated Signature Verification"; U.S. Pat. No. 5,647,017, "Method and System for the Verification of Handwritten Signatures"; U.S. Pat. No. 5,241,600, "Verification System for Credit or Bank Card or the Like"; and U.S. Pat. No. 5,195,133, "Apparatus and Method for Producing a Digitized Transaction Record Including an Encrypted Signature."

Information regarding the signatures or other actions associated with primary and secondary passwords may be stored on a central server used by the credit card agency, or it may be stored electronically in the credit card itself using, for example, the card technology disclosed in U.S. Pat. No. 5,241,600, "Verification System for Credit or Bank Card or the Like," issued Aug. 31, 1993 to W. D. Hillis, previously incorporated by reference. Described in the Hillis patent is a verification system for verifying authorized use of a credit or bank card or other identification card. The verification system makes use of an image embossed on or laminated onto a card, and information stored on a magnetic strip or other storage arrangement laminated onto or otherwise affixed to the card. The information stored on the card is related to the image embossed on the card. A card reader reads the image and generates a information defining the image. In addition, the card reader reads the information and compares it to the image signature to determine if they conform. Further use of the card may be based on the degree of comparison between the information read from the card and the image signature. When such systems or other systems for verifying signatures are adapted to the present invention, then, in one embodiment, an electronic signature reader may obtain the stored information regarding the signature from the data stored on the credit card and compare it to the signature provided. The system may then determine if the signature provided corresponds to a primary or secondary password, and then conveys a signal to a security system indicating the status of the password so generated, thereby authorizing the transaction, applying limitations regarding the transaction, feigning acceptance of the transaction, or openly denying the transaction, as defined by preconfigured security rules associated with the account.

In such systems, the user's ability to customize the security rules may be done using an interface that provides information from the user to a central database associated with the credit card agency or other account provider, according to previously discussed principles for an administrative security management system, with information regarding signatures for primary and secondary passwords being provided through the interface across the Internet or other connection means to be stored on a central database. Alternatively, signature-related information may be stored on the credit card itself, including rules for distinguishing between a primary and secondary password based on the use of an electronic signature device. In such cases, a central database can still contain information about security rules in response to receipt of primary or secondary password, but the criteria for distinguishing primary from secondary passwords (and for rejection of unauthorized password entry, i.e., improper signatures) need not be known by the agency providing the account or by any other agency than the user, with the distinguishing step being done in RAM by the card reader or signature reading device responsive to criteria provided by the card itself. In such cases, the user may use a credit card configuration device such as an electronic reader with download means and a computer interface to receive the user's customized rules for interpreting signatures or other acts with the signature reading device or other devices associated with card use.

Similar principles apply to other aspects of using cards or other devices for "object present" account access, with information stored on the card being used to distinguish primary from secondary password entry.

Location Sensitive Rules

Security systems can be responsive to the location of a user. For example, accounts accessed via a cell phone for payment or other purposes may be preconfigured to be responsive to the location of the cell phone, as determined by triangulation, proximity to cell phone towers, by a GPS unit associated with the cell phone, etc. For example, the account can be programmed to only accept transactions placed while the cell phone is an approved region, such as Chicago, or in a known commercial district, or within 100 yards of a previously identified route on a map that may correspond to the typical path of travel for the user. The position information that can affect account access can also include information about the orientation of the cell phone (or other object), such that account access may require that the cell phone be at a particular angle relative to horizontal, or that the phone be subjected to a particular motion such as shaking twice just prior to entering a PIN, etc., based on the use of sensor chips (accelerometers, inclinometers) or other sensing means that can provide information for use in accessing or using an account.

In several such embodiments, covert validation of account access can include location-specific information, such as a physical location electronically determined, or information related to a type of location, such as distinguishing between types of background noise to characterize an valid location or environment for use.

In the case of sound providing validation information for an overt component of a password, the cell phone may an constantly monitor noise levels or characteristic sounds in the background that can be processed and used to create one or more parameters that can be compared to validation parameters in a database associated with an account. In one embodiment, such as in making a financial transaction, the background sound levels may be required to resemble a favorite type of music that the user enjoys at home or while driving, such as violin music. If key characteristics of violin music are present, then the transaction may be placed. If not, a warning light or message on the cell phone, either easily detected or cryptic or hard to notice may alert a trained user that the transaction cannot be done.

Thus, in one embodiment, a characteristic type of sound must be received by the cell phone player to validate account access or certain types of transactions.

An example of a portable electronic device responsive to sound is described in United States Application 20040005914, "Wireless Communicator with Integral Display," published Jan. 8, 2004 by Dear, herein incorporated by reference to the extent that it is noncontradictory herewith. Dear's device comprises voice recognition circuitry and, according to the present invention, can be adapted to recognize a voice command for logging in to a secure system via wireless means, wherein primary and secondary passwords can be recognized. In one version, hidden actions by the user giving a voice command can be recognized by the portable electronic device and discriminated as a components of a primary or secondary password in addition to overt actions (e.g., the spoken characters of a password) to form a two-part password. The hidden action, for example, may involve motion or orientation of the device, voice pitch, timing between spoken words or characters, actions such as buttons depressed before, after, or during speaking of a password or login information, etc. Information identifying a password as primary or secondary may also be transmitted wirelessly to a receiving processor associated with the user account and security rules.

OTP Cards

An example of a payment card with a built-in OTP (one-time password) system is the ICT DisplayCard of Innovative Card Technologies (Los Angeles, Calif.). The ICT DisplayCard can serve as a credit card, corporate ID, or smart card, with the added feature of providing one-time passwords on demand. At the push of a button on the card, a small screen on the front of the card displays a one-time-passcode. During an electronic transaction, the customer enters the passcode in addition to a static password, providing a dual-factor authentication method. Related technology is described in U.S. Pat. No. 6,902,116, "Method for Making a Financial Transaction Card with Embedded Electronic Circuitry," herein incorporated by reference to the extent that it is noncontradictory herewith. In related proposed embodiments, the PIN need not be limited to characters displayed visually, but can include other signals that are generated such as acoustic signals (e.g., musical tones), wireless signals conveying PIN data (e.g., AM or FM signals), infrared or ultrasonic signals, ultra wide band pulses, or other techniques, such as release of combinations of chemical compounds such as aromas to create a measurable gaseous signal with a characteristic spectroscopic fingerprint that can be detected by a suitable reader.

Innovative Card Technologies' Power Inlay Technology involves a small, thin and flexible inlay containing a battery, circuit and switch that can allow payment cards to power a mini-flashlight, play melodies or other sounds, or display information. When such cards are modified to serve within the scope of the present invention, it is proposed that the powered circuits may allow hidden actions to also be included in user authentication, or to distinguish between a primary and secondary password. For example, there may be two or more ways to depress a button on a card to obtain a one-time password. One way results in an OTP that corresponds to a primary password, when combined with the static password. The other way can result in a secondary OTP that, when combined with the static password, results in a secondary OTP that can be recognized as describing an insecure situation, with opportunities to trigger previously configured actions such as alerting authorities or restricting the account. By way of example, pressing a button on the card for a very brief time may result in display of a primary OTP, where pressing the button for, say, over one second before releasing pressure may result in a secondary OTP.

Other means of distinguishing secure from insecure settings using a single button can include pressing the button once versus twice (e.g., two staccato pulses), or using low pressure versus high pressure, or using a large contact area versus small, focused contact area. Those skilled in the are will understand how to design a switch or button to permit one or more such factors to be used as criteria for covertly distinguishing between two or more security settings in pressing the button.

The OTP generated by the card may also be sensitive to other covert factors, such as the orientation of the card, physical shaking of the card, depressing the card in an area that does not appear to be a button, holding the card by one pair of opposing edges such that a pressure-sensor recognizes the small load applied and interacts with the OTP circuit to trigger generation of a secondary password, etc. Thus, in one version, the invention comprises a security system for controlling access to an asset, wherein the system employs an electrically powered security object, particularly a portable object such as a smart card or other card capable of presenting or providing user credentials or components thereof, such as an OTP password or OTP password component that can be differentiated as either a primary password or secondary password (or a component of a primary or secondary password), depending on an action of the user with the card, wherein the action can be either pressing a pressure-sensitive region on the card, touching a touch-sensitive region of the card, holding the card in a particular orientation, placing a finger on a finger print reading zone, modifying the amount of light received by a photosensitive portion of the card, opening or closing a switch associated with the card, and the like.

In an alternative system, a powered card can provide an OTP in the form of a sound that can be received by a microphone. The audio OTP can be further coupled with a users PIN to create a two-part password. One example is the nC AudioCard of nCryptone (Boulogne Billancourt, France). This card contains an internal power supply that drives circuitry and a sound generator to allow it to serve as an authenticator in ISO banking card format. It may further comprise an EMV chip, a magnetic stripe or a wireless ID chip. The nC AudioCard is said to be capable of simultaneously acting as a banking card and as a company badge (see http://www.ncryptone.com/produits/ncaudiocard.asp, as viewed Jan. 19, 2007).

Another example of an interactive card that can be used according to various aspects of the present invention is the PIN-on-Card device, a contactless smart card with an integrated keypad and a PIN, marketed by Cypak (Stockholm, Sweden). The card is placed on a card reader that connected to a computer by a USB connection or other means, including by RF identification (e.g., 13.56 MHz systems) or other wireless data transfer means. A browser application is automatically launched and the card directs the user to a pre-stored Internet site where authentication is carried out using the keyboard on the card. Applications include secure data log-in and secure access to Internet services such as electronic transactions, digital signatures and license management, access to buildings and machinery, etc. The card-reader may also be connected to a physical entity such as a door, cupboard, machine or copier as part of a security system to protect the associated assets. Other cards or portable mechanical devices that permit input of a password may be used in suitable embodiments of the present invention.

Cards or other security devices within the scope of the present invention can use batteries for power or rely on energy harvesting of radiowaves, including use of Energy Signal Processing technology or Direct2RFPower (d2p) from Parkervision (Jacksonville, Fla.). They may also use fuel cells such as direct methanol microfuel cells or other means for converting fuel to electricity such as microturbines, power generation techniques that convert kinetic motion into electricity, etc. (Such power sources can also be considered for any portable device or other electronic device used within the scope of the present invention.)

In one embodiment, an alarm input is generated in a two-part authentication scheme involving a static PIN and a synchronized OTP. Covert information to provide the alarm input is provided by a smart card or other token, and is generated in response to squeezing a portion of the device or performing some other predetermined mechanical act (e.g., holding it vertically, when an orientation-sensing device is in the token). In that case, the normal algorithm being used to generate synchronous OTPs or other OTPs is not used, and a new algorithm is applied to generate an alarm input (for example, a string such as "33245" when "38903" may be the expected OTP at that moment, or alternatively, a string that differs in a simple manner from the expected OTP, such as might be obtained by adding 1 to the digits or transposing the last two digits, such that the user could manually compute the new OTP based on the correct current OTP, for cases in which it is not possible to physically squeeze the device but wherein it may be possible to manually enter the adjusted OTP). The mechanical action may generate an alarm input only during the time that the mechanical action is applied, or it may be a trigger that changes subsequent OTPs to be alarm inputs until the user resets the device (optionally by calling an administrator to verify that there is no longer a security threat). Thus, for example, an RSA SecurID® card may be modified to have pressure-sensitive section that, upon squeezing, can change the algorithm being used to generate OTPs that will cause an alarm and possibly limit access to an account.

Other examples of credit cards with memory features for one-time passwords or related security systems that may be used with the present invention include those of U.S. Pat. No. 5,627,355, "Transaction Device, Equipment and Method for Protecting Account Numbers and Their Associated Personal Identification Numbers," issued May 6, 1997 to Rahman et al., and U.S. Pat. No. 5,478,994, "Secure Credit Card Which Prevents Unauthorized Transactions," issued Dec. 26, 1995, also to Rahman et al., which disclose a system that uses a plurality of random PIN numbers in a known series which are associated a credit card and stored in memory on a central server and another device, providing a form of OTP/two-part authentication. Sections of the Rahman et al. patents dealing with memory elements in credit cards and verification methods using the memory elements are herein incorporated by reference to the extent that they are noncontradictory herewith.

Voice-Based Systems

In one aspect of the invention, a user employs verbal communication to access a secure system that requires a password. The system may employ telephony (e.g., via a telephone network using a cell phone, landline, Internet telephony, etc.) or verbal communication directly to an operator or automated system, or employ a voice transmission means such as wireless transmission, transmission over a closed circuit, digital or analog voice transmission, etc. In essence, the user verbally issues one or more commands that includes a password. An overt password may be present, which can be readily recognized as a password by an eavesdropper or other observer. Any number of additional methods can be employed to also convey an overt component of a password, including timing of commands, non-lingual sounds such as coughing, voice pitch, the placing of stress on particular words or syllables, correction of a deliberate error, seemingly non-substantial content such as "chit chat" or greetings, and so forth.

In one aspect, an automated or computer-assisted system is used to recognize overt components of passwords. For example, a covert component of a primary or secondary password can be based upon the length of a pause or pauses in providing a predetermined item of information, or can include a cough, the saying of a superfluous word such as "um" or "uh" in a predetermined place in a verbal response, or an audible inhalation or exhalation, a smacking of lips, etc. For example, a user may call a bank to access an account to obtain information or make a transaction. After providing the account number or user name, to verify the user's identity, the bank may request provide a challenge and response system in which correct responses from the user are required and, for the purposes of the present example, may be considered as a password for access (e.g., Social Security number, mother's maiden name, pet's name, etc.), or a conventional password may be requested. In either case, the bank operator's computer interface may show information pertaining to the selected account indicating that the user has configures the system to involve a hidden action to control the level of access. The hidden action can be considered a covert component of a password for purposes of the present invention.

The operator's computer display, conveying information from a database of security information, may indicate, for example, that in giving the response to a challenge, that a deliberate error must be made and then corrected, and that without the error and correction, the providing of "correct" user information is to be considered as a secondary password invoking restrictions on account access or optionally a security alert. Thus, when asked for the mother's maiden name, and the maiden name is Jones, the user may reply "Susan—no, I mean Jones. Susan Jones." The error followed by a correction validates the user and provides full access—i.e., the level of access normally available for a validated user of that account accessing under that user name. However, if the user were in an insecure setting, such as being compelled to make a call to execute an unwanted transaction, then failure to make a deliberate error in providing the maiden name would signal to the operator that the access was under the restrictions associated with a secondary password. The restrictions could be default restrictions automatically imposed for such situations, or may be previously customized selections determined by the user, such as providing feigned access only relative to any transactions made, or limiting transactions to $100, or requiring a subsequent authorization under a primary password to completely authorize the transactions. In one version, the fact that these requirements were in place would not be conveyed in the verbal communication with the caller during that session, such that a thief or someone compelling a user to carryout a transaction or an eavesdropper would not clearly recognize that account access was limited or feigned, though in some versions the impact of limitations on the account might be apparent, such as the fact that transactions over $100 were not permitted, or the fact that certain types of transactions might not be available, but this can also be done without indicating that access to the account has occurred under a secondary password rather than the primary password.

The example above dealt with a deliberate error being required as part of a covert password for full access, with failure to make (and correct) the error resulting in entry of a secondary password, in effect. The opposite case can also be considered, in which the step of making and correcting an error is used to enter a secondary password, when entry of the information without the corrected error in effect enters a primary password for full access.

In another version, a specific sound is required other than that apparently requested in the challenge and response system in or a password entry system. That sound may be, for example, a cough or the word, "hey", which can be entered at a specific time (such as between the first and second digits of an account number, overt password, or other information) or over a range of places (such as anytime during entry of a password or within 5 seconds after being granted tentative or apparent access to an account). Two or more sounds may be defined to interchangeable, so a password (PIN) of 33456 could be spoken as "three, three, four, um, five, six" to convey a primary password with a covert component, or could also be spoken as "three, three, four, let's see, five, six", in which case "um" and "let's see" would be interchangeable sounds. In a related version, any word or phrase, or any of a large number of words or phrases, could be spoken in the designated place (e.g., between the "four"

and "five" of the password) to qualify as a primary password (or as a secondary password, if so configured). The location and duration of pauses between the spoken components of the overt password could also be used to distinguish a primary from a secondary password. Thus, the presence or absence of, say, a one-second pause between the fourth and fifth spoken characters of the password could be used to determine if a primary or secondary password is intended. One or more sounds or other actions could be assigned to be null states that have no effect. Thus, with a cough as a null state entry, "3-cough-34-pause-59" could be parsed as "334-pause-59" which may be distinguished from a rapidly spoken "33459" to identify one as a secondary and one as a primary password.

The hidden action could also be based upon the letters or sounds beginning the first word or first two words after giving the password. For example, there could be a requirement that after giving the overt component of the primary password, that there is a covert component requiring that speaker speak a phrase that begins with the letter "W" or the word "Well." Thus, when asked to enter the user's password or other authenticating information (e.g., in a challenge and response query), after conveying the correct information and being told that access has been granted, the user could then say, "Well, thank you" to complete the covert part of the primary password. Failure to do so could result in the recognition of a secondary password being entered, with the corresponding account limitations based on preconfigured rules. This could involve a human or could be a machine that listens and recognizes voice.

For examples of techniques for speech information processing, see U.S. Pat. No. 7,155,390, issued Dec. 26, 2006 to T. Fukada et al., herein incorporated by reference to the extent that it is noncontradictory herewith.

The user need not use normal speech, but may also use any other means of making sounds, such singing, shouting, clicks, etc., or other sounds made with the body or with tools. Other forms of communication may be used, such as Morse code, sign language, hand gestures, body motion (e.g., dance, shifting of weight, etc.).

Voluntary Password Sharing

The use of primary and secondary passwords with predefined restrictions on account access can provide important levels of security to account owners. For example, the owner of an account may have a primary password for full access, and two secondary passwords, one for limited access to non-sensitive information, and one for access to a feigned account where a user cannot make changes to the owner's account or access sensitive information, but may be provided the appearance of access to an account that actually does not provide sensitive information or transactional rights relevant to the owner's account.

In one case, for example, the owner of an email account may wish to label certain messages or classes of messages as sensitive (e.g., all email from selected friends, companies, or containing selected words in the subject or main body of the message). All email classified as sensitive can be hidden when someone logs in to the account using the secondary password for limited access. This can be useful, for example, when the account owner is away from a computer and wishes to allow another party, such as a parent, sibling, or friend, to open the account to allow them to read and retrieve an email message that is not sensitive, or to temporarily use the account to send an urgent message in their behalf. With this system, the other party, who is only given the secondary password for limited access, can be provided access to the account and the ability to complete actions such as reading, receiving, and sending email, but without the risk that sensitive emails (received and/or sent) will be read. The other party need not know that the password they are given is a secondary password, or that they are unable to see some email messages. The secondary password for such uses may be a form of the primary password, such as the primary password minus one or more characters (e.g., "batman" as the shared password when the primary password is the stronger string, "bat^man!23"). The use of secondary passwords in this manner can do much to help maintain privacy for the user. Alternatively or in addition, for full access to the account, the primary password may comprise an overt portion (such as the part that is entered into the password field of a login screen) and a covert portion, which can be any hidden action, including the use of entry timing (timing the submission of the password relative to, say, the display of seconds on the computer's clock), mouse motion, secondary actions before or after entry of the overt portion of the password, etc., or modified CAPTCHA entry.

Timing as a Hidden Action in Primary or Secondary Passwords

In some aspects of the present invention, the timing of user actions can be used to provide a hidden action to confirm the identity of the user or to otherwise convey information about security status of the current session and/or to call for other actions such as emergency alerts, restrictions on the account, etc. The use of timing can be implemented in many ways, including any of the following:

(a) The timing of keystrokes in entering login information. This can include the use of pauses of specified length between entry of characters in a password, such as a pause of at least one second between the penultimate and last character of a password, or a pause of about three seconds between entry of the last digit of a password and pressing the Enter key, or a specific pause between two actions after the password has been entered and the account has apparently been accessed (but is really in a provisional status pending completion of a predetermined hidden action to grant full account access, with failure to complete the hidden action resulting in denied access, feigned access, limited access, or other actions as previously configured for the account).

(b) The timing of actions after logging in, such as the pause between the next two key strokes or key clicks after apparently gaining access to the system.

(c) The timing of actions in responding to a challenge and response system.

(d) The timing of actions with the mouse (cursor action, for example, or clicks) prior to logging in or shortly thereafter.

Covert means of validating a user can also be obtained from dynamic keystroke analysis, in which the characteristics of a user's typing style can be analyzed. The timing of keystrokes or combinations of keystrokes can provide statistical information that can help verify the identify of a user. In a sense dynamic keystroke analysis can be viewed as a form of biometrics that does not require additional hardware like iris scanners or fingerprint analyzers, but can be done with software alone monitoring dynamic typing on a keyboard. See, for example, Gláucya C. Boechat, Jeneffer C. Ferreira, and Edson C. B. Carvalho, Filho, "Using the Keystrokes Dynamic for Systems of Personal Security,"

Transactions on Engineering, Computing and Tech., Vol. 18, December 2006, available at http://www.enformatika.org/data/v18/v18-38.pdf, as viewed Jan. 15, 2007. Analysis of Keyboard dynamics can be applied to any text as it is being typed, relying on statistical patterns from analysis of large amounts of previously entered text, or, most easily, can be applied to a specific string of text that the user has previously typed a number of times. It is often proposed, for example, the keyboard dynamics be applied to the login information (i.e., the password itself) to authenticate the user. Such systems can be used within the scope of the present invention to add further covert means for conveying security status information. For example, in a login system that measures and transmits keyboard dynamics to complete verification of user identity (a two-part password, in essence, with a covert keyboard dynamics component), the rhythm of entering a password can be deliberately altered to create a secondary password with control over the resulting level of access. In previously proposed systems, failure to replicate the expected keyboard dynamics at login could result in denial of access. Under the present invention, the "failure" could be interpreted according to previously configured rules as a deliberate entry of a secondary password. In one version, entry of the correct overt password with any form of incorrect keyboard dynamics could result in feigned access to an account. In another version, a particular alternative keyboard dynamics pattern could be used to create a specific secondary password. For example, for a password that is normally typed with a rapid, staccato pattern that increases in speed as the password is typed could, in an emergency setting, be typed with a slower rhythm that decreases in speed as it is typed. This deliberate act could signal that an emergency alert is needed, resulting in feigned access to the account and an alert sent to authorities or others.

The software to monitor keyboard dynamics can be resident on the local machine such as a laptop or personal computer, or can be provided via the login service that is being accessed. For example, a Javascript program or applet may be provided as part of the login page such that the timing between keystrokes during login is monitored and transmitted with the login information (e.g., with the username and the hash of the entered password).

Commercial examples of keyboard dynamics for security applications include the Trustable Passwords system of iMagic Software (Solvang, Calif.) using keyboard dynamics for two-factor authentication. Also offered is iMagic's Trustable Presence system, which combines Trustable Passwords with wireless ID systems (e.g., personnel carrying scannable identification tags) to provide three-factor authentication, which can also be adapted for use according to various aspects of the present invention. BioPassword (Issaquah, Wash.) also markets the BioPassword® system using keystroke dynamics to restrict access. Another commercial biometric authentication system product is TypeSense of Deepnet Security (London, England) which is said to use auto-correlative training and adaptive learning to characterize the typing of user. Such systems or other keyboard dynamic systems of timing-based systems in general may be applied before or after logging in.

Smart Pages and Secured Records

Sensitive documents such as medical records often have portions that are not needed for some who must use the document, yet may be needed for others. Such documents may be encrypted to prevent unauthorized use. There is a need to provide access to some aspects of the information to some parties, such as medical insurers, without allowing them to gain access to everything in the document. In the past, merely unencrypting a document would make the entire document readable, but there is a need to restrict access to only those parts of a document that a party needs to read. One effort to secure medical records and other sensitive sources of information is the development of encoded "smart pages" that protect information in a way that permits selective revelation of what is needed by a party. This prevents the need for multiple versions of a documents to be stored. See, for example, "Smart Pages," *Technology Review*, Vol. 109, No. 4, September/October 2006, p. 15.

Such systems can benefit password protection according to the present invention. For example, a doctor who needs to access sensitive records from an insecure setting may have a secondary password (including a one-time password) that can be used for access from a less-trusted facility. In one embodiment, use of the secondary password may result in screening of sensitive information, such as display of an illegible record for information previously noted as sensitive. Only after entering a primary password, such as one comprising a covert component, can a selected portion of the medical record become viewable. Alternatively, after entering an overt primary password or secondary password, sensitive information may remain hidden until the user enters a secret command or provides a hidden action to display the sensitive information. The display of sensitive information may only be momentary, if desired.

Biometrics and Other Non-Text Channels of Authentication

Biometrics is one form of additional information used in some systems to improve the security in authenticating users. Biometric authentication may requiring hardware and software for scanning and analyzing a unique physiological characteristic such as a fingerprint, handprint, retinal image, and the like. Other biometric approaches for user identification include facial recognition, hand geometry, retinal scan, iris scan, vascular pattern, signature dynamics, and voice dynamics. While biometric authentication is often proposed as a one-part authentication scheme, it can be a hardware-based component of a two-part authentication scheme in combination with a user-supplied password.

Biometrics may be used as one channel in a system with two or more channels of information flow to authenticate user credentials. A non-text-based channels using biometrics or other forms of information exchange may be covert. For example, in gaining access to a secure room, a user may be required to wear a badge with a wireless smart tag for RF scanning to convey encoded information to verify identify, and may be required to also speak a word or phrase to a microphone. The spoken word or phrase may be a unique password that further authenticates the user. Authentication may include not only verification that the correct word or phrase was spoken, but may also include voice recognition to authenticate the user. The entry system may also be provided with means for recognizing covert password components with a plurality of predetermined rules specifying actions responsive to receipt of the covert password components (e.g., a secondary password with a covert component).

A covert password component may comprise a particular stance of the body or physical action of the user (e.g., left foot forward, majority of the weight on the heel of the right foot, right arm scratching the left should, head tilted to the left, sniffing twice, biting the upper or lower lip, wriggling the nose, closing both eyes for about 0.5 seconds, approaching the portal with a shuffling gate or staggering gate, etc.), or combination of such actions in a particular sequence that can be recognized by sensors, cameras, or other surveillance and monitoring means. It may also comprise requirements for what is worn or physically visible to a camera (e.g., a button of the shirt unbuttoned, a tie being twisted or out of place, a blue pen emerging from a pocket, a left shoelace united, a glove worn on only one hand, mismatched socks, etc.).

Computerized systems for detecting gestures such as hand motion have advanced considerably in recent years. Further information on the operation of such systems is provided in by H. Guan, J. Chang, L. Chen, R. Feris, and M. Turk, "Multi-View Appearance-Based 3D Hand Pose Estimation," IEEE Workshop on Vision for Human Computer Interaction, New York, N.Y., June 2006, Available at http://ilab.cs.ucsb.edu/publications/GuanV4HCI06.pdf, as viewed Jan. 6, 2007; and Y. Zana, R. M. Cesar-Jr., R. Feris, and M. Turk, "Local Approach for Face Verification in Polar Frequency Domain," to appear, Image and Vision Computing, 2006, available at http://ilab.cs.ucsb.edu/publications/IVC-ZanaEtAl06.pdf, as viewed Jan. 6, 2007.

In biometric systems that interact with a portion of the body to identify that portion as uniquely associated with a user (e.g., a fingerprint scanner or iris scanner), secondary and primary passwords may be distinguished by changing which part of the body is identified. Thus, a security system with a fingerprint sensor may be configured to accept the user's right thumbprint as part of a primary password, while recognition of the left thumb or right index finger may be recognized as part of a secondary password with lower access privileges, optionally including feigned access. A user interface may associated with the scanner itself or auxiliary equipment (e.g., a graphical display built into the scanner or elsewhere in electronic communication with the scanner) for configuring the choice of fingers to be used for components of primary versus secondary password, and specifying the associated security rules or other actions to be taken responsive to which fingers are identified.

A related system that can be adapted for use with the present invention or used to supplement the present invention is that of U.S. Pat. No. 7,039,812, "System and Method for User Authentication," issued May 2, 2006 to Kawan et al., the material dealing with biometrics coupled to PINs being herein incorporated by reference to the extent that it is noncontradictory herewith, as well as the material dealing with the flow of validation data between a user, a merchant, and a mutually trusted third party such as a bank or other agency in a network of trust. Kawan et al. propose, for example, a biometrics system based on reading multiple fingerprints from a person by having a secret sequence of the fingers scanned. Another example of a biometrics device that can be used for several embodiments of the present invention is that of U.S. Pat. No. 7,155,416, "Biometric Based Authentication System with Random Generated PIN," issued Dec. 26, 2006 to Shatford, the portions of which dealing with fingerprint reading and with electronic cards being herein incorporated by reference to the extent that it they are noncontradictory herewith. Shatford discloses a card-like device having an internal battery, a CPU and other circuitry for reading biometrics information, comparing the read information to stored information in the memory of the card to verify identify of a user, and for generating a pseudorandom number to serve as PIN for an authenticated user. The card has a magnetic strip on one side and credit-card information, a PIN display, and a biometrics sensing area on the other side (see, for examples FIGS. 1A and 1B of Shatford). After activating the card's battery-powered system, a finger is placed on the biometrics sensing area, and when the identify of the user is confirmed, an LCD display area shows a randomly generated PIN that can then be entered to validate a transaction (see FIG. 3 therein). A customer database receives the customer information when the credit card is used, generates an expected PIN with a pseudorandom number generator related to the generator used in the card, compares the received PIN with the expected PIN, and determines if the transaction is accepted or denied (see FIG. 4 therein).

The system of Shatford can be adapted for use under the present invention by adding additional information to the memory of the card corresponding to two or more fingerprints and providing automatic means for determining the PIN responsive to which fingers have been scanned. Additional security rules can be added to the customer database or other databases to specify rules responsive to the different PINs that may be received, depending on which fingers were used in the biometrics scan. Such rules may provide for account restrictions, spending limits, security alerts, feigned access, system delays, etc. Thus, a user with a biometrics-enabled credit card or other biometrics-enabled device may, in an emergency setting such as compelled use of the security device under the threat of physical harm from a thief, be able to placate the thief by apparently cooperating and providing the desired access to an account or other asset, while in reality providing substantial restrictions or only feigned access, and possibly also creating a security alert that calls for help and intervention by authorities. In this process, the thief may have no discernible indication that anything other than full compliance by the victim has been provided. In one related version, the card may be marked with indicia specifying that a particular finger is to be used (e.g., "right thumb only") when in reality, the specified finger is for generating a secondary password. For full access, a different finger such as the right index finger should be used. In this case, changing the specified finger to gain a higher level of access could be considered as a hidden action. A more covert approach could be to require that the right index finger first be scanned, followed by scanning of the right thumb to result in a PIN that is a primary password or component thereof. The scanning of the right index finger first can be done covertly and need not result in an obvious change in the display section of the card (though a pixel or other subtle marking may be changed to indicate to a trained user of the card that the hidden action has been received and that the system is waiting for the overt act of scanning the right thumb). Thus, a user may covertly "prime" the card by allowing a right index finger (or other specified finger) to be scanned while pretending to simply hold the card prior to use, followed by overtly (relative to bystanders) allowing the thumb to scanned to generate a (primary) PIN. Failure to prime the card in this manner will still result in a displayed PIN after the thumb is scanned, and the PIN will appear to be recognized and accepted by the authorization system for the card, but in fact it is a secondary PIN with associated access limitations and security rules. Alternatively, the covert scanning of the index finger can be configured such that the PIN generated by subsequent scanning of the thumb will be a secondary password, with the overt scanning of the thumb alone (without a covert previous scan of the index finger) resulting in a primary password. However, the previous case of priming the card with a covert scan to generate a primary PIN after the overt thumb scan may be preferred when dealing with security threats from a physically present source, for no possibly suspicious covert acts would be required to yield a secondary password when in duress.

Another example of a security system using biometrics to supplement password entry is U.S. Pat. No. 7,161,468, "User Authentication Method and Apparatus," issued Jan. 9, 2007 to Hwang and Lee. Described therein is a user authentication apparatus that authenticates a user based on a password input by the user and the user's biometrics information. The user authentication apparatus includes a password input unit which determines whether a password has been input; a storage unit which stores a registered password and registered biometrics; a threshold value setting unit which sets a first threshold value if the input password matches with a registered password and sets a second threshold value if the input password does not match with the registered password; and a biometrics unit which obtains biometrics information from the outside, determines how much the obtained biometrics information matches with registered biometrics information, and authenticates a user if the extent to which the obtained biometrics information matches with registered biometrics information is larger than the first or second threshold value. As an example of how such a system could be adapted within the scope of the present invention, the biometrics input could be supplemented with a hidden action to either fully authenticate the user or convey a secondary password and associated actions, such as account restrictions, feigned access, or issuance of alerts, following previously configured rules.

Change of Status

A session that begins securely may experience a change in situation, resulting in a decreased security level. For example, a user may be accessing a brokerage account on a computer in a private setting when another person approaches. Rather than completely terminate the session, the user may wish to simply indicate that the status is currently insecure, perhaps only as a temporary precaution. The system may be provided with one or more means to rapidly indicate that an insecure situation has been encountered. This may be a keystroke, such as ALT-F-12, or control-alt-M. It may also be a menu selection, such as a menu item that may have a disguised label such as "NASDAQ status," or it may be accomplished simply by placing the cursor against the right side of the screen or over a particular icon. The action indicating decreased security status may, if desired, immediately clear the screen of sensitive information and bring up a non-sensitive display of information such as recent NASDAQ market activity, or links to news sites. Once the change in status has been indicated, the account remains under the restrictions associated with insecure status until the user modifies the security status. Modifying the status may be achieved through a menu selection that brings up a password entry screen (e.g., one that indicates: "Due to time lapse, please re-authenticate your account access," followed by a username and password entry field.

Integration with Other Systems

Numerous known security systems can be adapted according to the present invention, or the present invention can be used in combination with or in addition to existing systems. For example, previous fraud-detection systems for processing credit card payments may be enhanced with the systems of the present invention. Examples of such prior systems include that of U.S. Pat. No. 7,165,051, "Electronic Commerce System and Method for Detecting Fraud," issued Jan. 16, 2007 to Ronning and Wical, portions of which dealing with fraud detection mechanisms and e-commerce methods being herein incorporated by reference to the extent that they are noncontradictory herewith. The Ronning and Wical patent describes an electronic commerce system having a server and an end user machine interacting through a network during an electronic commerce transaction. The server includes a software module configured to receive user-entered information via the network including an electronic purchase order for a product within the electronic commerce system, and has a fraud detection mechanism active during electronic commerce transactions. The fraud detection mechanism determines a likelihood that the electronic purchase order is attempted fraud based upon (i) information associated with the user-entered information and (ii) factors relating to a users real-time interaction with the server during a transaction to process the electronic purchase order. A method performed by an electronic commerce system for determining a likelihood that the electronic purchase order is attempted fraud based is also provided.

When suitable, the embodiments of the present invention can employ a wide variety of known hardware and software systems for authenticating user credentials, storing password information and recognizing entered passwords, providing password-protected access interfaces, electronically controlling access to an asset, etc. For example, U.S. Pat. No. 7,205,883, "Tamper Detection and Secure Power Failure Recovery Circuit," issued Apr. 17, 2007 to D. Bailey, describes a security system employing non-volatile random access memory (NVRAM) for storing security data for use during a step of secure authentication; an interface for providing communication between the token and a host system when coupled thereto; and a processor for performing the steps of: (a) receiving authentication data via the interface; (b) authenticating a token for performing security functions in response to correct authentication data; (c) providing secure information via the interface in response to the correct authentication data; (d) storing security data relating to the secure information within the NVRAM of the token in response to correct authentication data; and (e) re-authenticating the token for performing security functions using the security data stored in the NVRAM of the token in response to receipt of the secure information after a reset of the token has occurred. The hardware systems and authentication system of the Bailey patent may be used within the context of the present invention, when suitable, and such portions of the Bailey patent are herein incorporated by reference to the extent that they are noncontradictory herewith. See also US Pat. Application No. 20070061266, "Security Systems and Methods for Use with Structured and Unstructured Data," published Mar. 15, 2007 by Moore and Labovitch, wherein those portions describing hardware, software and electronic service components and systems for managing password-protected security systems are herein incorporated by reference to the extent that they are noncontradictory herewith. Additional description of password protected systems is found in U.S. Pat. No. 7,200,761, "Method to Use Secure Passwords in an Unsecure Program Environment," issued Apr. 3, 2007 to J. W. Freeman et al., from which FIG. 1 and the related text in the specification are herein incorporated by reference to the extent that they are noncontradictory herewith.

The methods and systems of the present invention can be adapted for use with known content management systems of many kinds. For example, U.S. Pat. No. 7,152,693, "Password Security Utility," issued Dec. 26, 2006 to K. H. Man et al., describes a resource manager of a content management system that is configured to receive a client request pertaining to information and to access at least one of a plurality of data servers to execute the client request. An encryption engine encrypts passwords associated with the plurality of data servers using a key-based encryption algorithm and stores a ciphertext corresponding to each password in a passwords storage system. A server identifier module identifies a ciphertext in the passwords storage system that is associated with the at least one of a plurality of data servers. A decryption engine decrypts the ciphertext using a key-based decryption algorithm corresponding to the key-based encryption algorithm. Such a system can be adapted according to the present invention to include rules in memory for recognizing and accepting primary or secondary passwords, with differing levels of access to information provided in response to receiving primary or secondary passwords, and optionally with covert and overt components of passwords in at least one of the primary or secondary passwords to covertly convey information regarding security status. Portions of the Man U.S. Pat. No. 7,152,693, dealing with content management systems and password management are herein incorporated by reference to the extent that they are noncontradictory herewith.

Intelligent telephony systems can be used within the scope of the present invention, and known telephony systems may be made more secure by integration with features of the present invention. For example, user-defined covert password components or differentiated primary and secondary passwords may be integrated with systems in which a caller interacts with a telephone system to place orders, make financial transactions, access confidential data, update sensitive records, request actions such as shipments or destruction of stored goods, transfer items or information, etc. Numerous known cell-phone-based systems can be used with the present invention. One example of an intelligent telephone-based system that can be enhanced with aspects of the present invention is that of U.S. Pat. No. 7,167,553, "One Number, Intelligent Call Processing System," issued Jan. 23, 2007 to Shaffer and Moore, portions of which dealing with Voice Response Units (VRU) and Interactive Voice Response (IVR) being herein incorporated by reference to the extent that they are noncontradictory herewith. The Shaffer and Moore patent describes a one number, multi-application, intelligent call processing system that provides service benefits to a caller by using a database to link a caller's number to a spatial key which in turn can help automatically direct a caller from a vanity number (e.g., an easy-to-remember 800 number) to a particular service requested. The system employs Voice Response Units (VRU), also known as Interactive Voice Response (IVR) technology, which automates the process of receiving and processing information from the caller via Computer Telephone Integration (CTI) to a virtual telephone number database containing a nationwide master list of telephone numbers with attribute data items associated by spatial key linkage to each telephone number. Shaffer and Moore describe a process that is initiated by a caller dialing a selected telephone number to request information and/or services. Based on the number dialed, a caller or network provided ten-digit telephone number and VRU prompted for and received caller input, the system retrieves the application requested data from the virtual telephone number database and provides it to the network. In conjunction with the present invention, such a system could also comprise customized security information in a database for use with the telephony system, wherein primary and secondary passwords could be automatically distinguished based on user input, optionally comprising covert data transmitted via actions such as correcting an error in a predetermined way or using other secondary information such as voice pitch, timing of input, superfluous phrases such as "uh" or "um" used in a predetermined manner, etc. Security rules associated with the primary or secondary passwords or other actions associated with either the primary or secondary passwords could then be automatically executed.

The security measures of the present invention can also be implemented to authenticate users or to verify the authenticity of documents or other assets by adding requirements for hidden actions in the presentation of credentials or covert information to be provided in challenge and response systems associated with authentication of documents or information. In such systems, a software database associated with identifying codes for the user or for documents or other assets of the user can be provided to specify primary or secondary passwords comprising a covert component required for full authentication. An example of a document system that can be expanded or supplemented through addition of the security measures of the present invention is given in U.S. Pat. No. 7,170,391.

While feigned access is a feature in some embodiments of the present invention, in one embodiment, feigned denial of access can be used. In such a system, entry of a secondary password returns an error message indicating that the account has been frozen because of recent failed attempts to enter the system, as if it has recently been the subject of attempted fraud. In reality, though, access is still possible by providing an additional covert element which, in combination with the previously supplied secondary password, forms a primary password or a secondary password providing a higher level of access.

Other financial transaction systems using cards or other information delivery means that can be coupled with the security means of the present invention include the transaction systems described in U.S. Pat. No. 7,167,924, "Financial Transaction Processing System and Method," issued Jan. 23, 2007 to Symonds et al., portions of which describing uses of relational databases, the use card activated terminal devices, and data transfer and storage methods being herein incorporated by reference to the extent that they are noncontradictory herewith.

Known limited-use credit card systems can also be used within the scope of the present invention, including the system of U.S. Pat. No. 7,136,835, "Credit Card System and Method," issued Sep. 18, 2000 to Flitcroft and O'Donnell, the portions of which pertaining to limited-use "card remote" and "card present" systems being herein incorporated by reference to the extent that they are noncontradictory herewith. Described therein is a credit card system that provides additional limited-use credit card numbers and/or cards that can be used for a single transaction, including "card remote" transactions such as by phone or Internet, or "card present" transactions to reduce the risk of so-called "skimming" fraud. One aspect of the system involves maintaining a pool of credit card numbers which share identical formatting; assigning at least one credit card number from the pool of credit card numbers to be a master credit card number; assigning at least one credit card number from the pool of credit card numbers to be a limited-use credit card number which is deactivated upon a use-triggered condition subsequent; and associating the master credit card number with the limited-use credit card number, while ensuring that the master credit card number cannot be discovered on the basis of the limited-use credit card number.

While conventional credit cards typically comprise an embossed plastic substrate with a magnetic strip, it should be recognized that many additional technologies can be used to function in effect as credit cards and still be within the scope of related aspects of the present invention. For example, cell phones and other portable devices for wireless transaction authorization, such as wireless tokens, can be used within the scope of the present invention, and may have information pertaining to primary and secondary passwords stored in memory in the device or be used to convey information to another device such as a server that can then recognize the information as a primary or secondary password or component thereof. Such devices may or may not require signatures and/or additional text-based passwords to be entered, and may also be adapted to recognize a hidden action related to motions of the device, pressure applied to parts of the device, orientation of the device, and so forth, to distinguish primary from secondary passwords, or to achieve other aspects of the invention described herein. Also to be considered are smart cards, signal transmitting badges or tokens, or a variety of contactless payment devices that transmit a wireless signal conveying a unique identification code and other data to authenticate a user and confirm a transaction.

The systems and methods of the present invention can also be used with systems in which one party seeks access to an asset or account on behalf of another user, or for systems using methods and devices for authenticating a remote service to another service on behalf of a user. One such system is described in US Application 20070005964, "Methods and Apparatus for Authenticating a Remote Service to Another Service on Behalf of a User" by Gross and Zandy, published Jan. 4, 2007, portions of which are herein incorporated by reference to the extent that they are non-contradictory herewith, said portions comprising the figures and paragraphs 18-38. In the system of Gross and Zandy, a user client authorizes a remote application client to perform one or more actions on behalf of the user client. The user client provides one or more keys to a remote authentication service; receives an identifier of the remote application client; and notifies the remote authentication service that the remote application client is authorized to obtain a response based on at least one of the one or more keys using the identifier. The remote application client provides a challenge that is received from a server that the remote application client is attempting to access for the user client and an identifier of the user client to a remote authentication service; and receives a response to the challenge from the remote authentication service that is based on one or more keys stored by the remote authentication service on behalf of the user client. Such a system can be extended to include user-configurable primary and secondary passwords to govern access and security rules, and may also comprise complex passwords comprising overt and covert components, including hidden actions as part of the credentials required to gain access to an asset or account, or portion thereof, on behalf of a user, and may further comprise audit means to track details of actions and access levels provided for subsequent review and final authorization of the user. Access under such conditions and audit-related information may be provided via an administrative security system, such as a Web based administrative security system according to the present invention. Access rules for remote parties or other third parties to access an account on behalf of user may also be configured using such an administrative security system, which may also assign primary or secondary passwords or other credential related information for use by third parties.

Systems of the present invention can also be incorporate with or added to digital watermarking techniques for authentication of identification, such as the IDMarc digital watermark inspection systems provided by Digimarc Corporation (Beaverton, Oreg.).

In one embodiment, a password checking function based on password-related data in a directory server system is modified to provide primary and secondary password systems for a user. The system to be adapted according to the present invention can be, for example, the system described in U.S. Pat. No. 7,165,182, "Multiple Password Policies in a Directory Server System," issued Jan. 16, 2007 to Excoffier and Bryne, portions of which dealing with a directory server system and methods for managing multiple passwords herein incorporated by reference to the extent that they are non-contradictory herewith. Excoffier and Bryne discuss a directory server capable of interacting with entries organized in a tree structure in a directory server system. The directory server has a password checking function capable of checking the password for a user entry, based on password-related data. The password checking function is responsive to a user entry having extra data associated thereto, and identifying an additional entry, for executing a distinct password checking based on the password related data defined in that additional entry.

In Excoffier and Bryne, there is also proposed a directory server capable of interacting with entries organized in a tree structure in a directory server system. The directory server has a password checking function capable of checking the password for a user entry, based on password-related data. The password checking function is responsive to a user entry having extra data associated thereto, and identifying an additional entry, for executing a distinct password checking based on the password related data defined in that additional entry. As adapted for the present invention, a directory server can also have a security status checking function to identify over or covert security status information provided during login, or before or after login, where preconfigured rules specify levels of account access and/or actions to automatically take responsive to the security status information provided. In one embodiment, the directory server comprises means for recognizing a secondary password that may be configured to provide limited access, feigned access, simulated denied access, and/or to initiate other actions such as a security alert to authorities or other parties, initiation of surveillance of the account or physical location of access, and the like.

PROPHETIC EXAMPLES

Example 1: Programming Rules for Multiple Accounts at a Security Service Website Regarding a hypothetical security service provided by a Website such as PINSafety.com with security relationships with other entities, a hypothetical user is envisioned having two Website domains, four email services, two blogs, one bank account and two brokerage accounts. Using PINSafety.com, the user supplies the service with a common password that has been set up for the two Websites, the two blogs, and the two email services, and a distinct common password for the two brokerage accounts, and separate distinct passwords for the other two email services and the bank account, along with any other needed user info (account names, for example) for PINSAfety.com to communicate with proper credentials with the accounts of concern. A graphical user interface allows the user to select the services and then enter passwords or password rules. For example, even though multiple passwords are in place, the user may select all the services and enter rules that can be applied regardless of the distinct passwords involved. The user interface may allow the user to select portions of existing passwords to replace (eliminating one or more characters of the password and replacing it with one or more replacement characters) or augment (adding an additional string into the password), and to then specify actions to apply when such a modified password is encountered. Exemplary resulting rules applied to one or more accounts could be any of those shown hereafter in Table 1.

In the rules, a programming convention is used. $PWD refers to the original password, which may be a string of three or more characters. The symbol "/" refers to replacement of a character or string in the password. Replacement and addition rules are shown in brackets (or between other selected enclosure symbols if one wishes to sue brackets in the password). For replacements, the first element in the bracket indicates which position of the password is being replaced. This is followed by a comma (or another selected separator if one wishes to use commas in the password) and then the replacement term. In replacement terms, the character % (or other selected symbol) can indicate the identity operator, thus representing the character or string being replaced. For example, $PWD/(1,#%) means that the first character is replaced by any digit followed by the first character itself, which in effect adds a digit before the original password. Similarly, $PWD/{2,g}{4,%%} means that the second character of the password is replaced with the letter "g", while the fourth character is repeated a second time. In the coding convention herein, the term "L" refers to the last character of the password. "L-1" refers to the next-to-last character, "L-2" refers to the second-last-character, etc. "?" refers to any position in the password, if entered in the position indicator position within brackets, or to any character if entered in the replacement position. An asterisk can indicate a string of any length. If no character is entered between the comma and the closing brace, this indicates that a character is deleted (replaced with nothing). Thus, $PWD/{?,} refers to deletion of any character in the password. $PWD/{1,?} refers to replacing the first character of the password with any character. A consecutive string is denoted by a double hyphen between the first and last position indicator of the string. For example, $PWD/{L-2--L,#*} refers to replacing the last three characters of the original password with a string beginning with a digit followed by one or more additional characters. Thus, $PWD/{1-3,a#?} refers to replacing the first, second, and third characters of the password with a three-character string consisting of "a" followed by a digit and any character. A set of choices can be indicated by inclusion between brackets separated by commas (or another selected separator if one wishes to use commas in the password). Thus, $PWD/{[1, 3,5,L],[xy,yx,xz,zx,yz,zy,xx,yy,zz]} refers to replacement of either the first, third, fifth, or last position of a password with any two letter string selected from x, y, and z. Two or more sets of brackets can be used. For example, $PWD/{1,#}{L, [,?]} refers to a password in which the first character is replaced with a digit and the last is replaced with any character or simply deleted.

Other operators can be used. For example, the "/oO" operator can indicate a change of case: $PWD/oO{3} indicates that the case of the third character is changed. This operator could be considered as an option in brackets to handle cases where a case change may not be possible (e.g., the character in question may be a non-alphabetical character). For example, $PWD/(3,[/oO,x]) can indicate that the third character is replaced with either its change of case (e.g., "u" becoming "U" or "Y" becoming "y") or with "x" (e.g., "&" becoming "x").

Other programming rules can be devised to indicate inverting of two or more characters in the original password string (e.g., switching the first and the last characters, or the first and second), or replacing vowels with numerals, plosives with non-plosives, digits with the letters they begin with ("1" becomes "o", etc.), etc. Character may also be inverted, or any other rule can be implemented within the scope of this invention.

Table 1 provides a hypothetical example of several rules and a short description of exemplary rules that could be associated with each of the password variants shown.

TABLE 1

Example of rules to respond to several secondary password options.

| Password or Password Modification | Action |
|---|---|
| $PWD/{2,#}{L,?} (Replace the second character with a digit and the last character with any other character) | One-time full access, then invalidate this rule for subsequent access. |
| $PWD/{L-1,*} (Replace penultimate character with any character) | Limited access: transactions limited to $1000. |
| $PWD/oO{3} (Case of third character is changed.) | Feigned access only: template 2. Issue security alert. |
| Google5 | Feigned access with a server crash 30 seconds after log in. |
| Sorbitol45{#}11 (Any digit inserted in the string "Sorbitol4511") | Limited access: no external transfer of cash. Create a unique one-time password: up to 10 variants can be used. |

Use of the site may require a feel from the user, such as a fee per use or a monthly or annual fee. Alternatively, payments for use of the service may be provided by credit card companies or other agencies provided password-protected access to accounts or other assets.

Using such configuration tools, a security service Website such as PINSafety.com could also serve as a configuration tool to configure one-time passwords or one-time credentials for use with various systems, as previously described with respect to FIG. 13.

When a single Website is used to manage multiple passwords, the site may be further protected with software analysis of keyboard dynamics to continuously monitor account use for possibly fraudulent or unauthorized use, and may periodically impose a challenge and response test or prompt for other means of verifying identity.

Example 2: Credit Card Orders and Verification Code Systems

Many variations of previously described security system involving the use of verification codes on credit cards are within the scope of the present invention. In one version, for example, the primary password or component thereof (i.e., the correct verification code) has some relationship to the printed verification code of a credit card, such as the printed verification code followed by the number "7" (e.g. the primary password could be a four-digit string related to the printed three-digit secondary password), or only the last three digits of a printed four-digit verification code. In another version, the primary password is related to the printed secondary password in a variable way by an algorithm that may depend on the date, time, price to be charged, or other variable factors. For example, the algorithm may specify that the correct verification code is the first two digits of the printed verification code plus a number corresponding to the day of the month (e.g., an order on July 24 for a credit card with the printed verification code of 877 could require 8724 as the entered verification code, while entry of the printed verification code would be recognized as a secondary password or component thereof with associated rules limiting account access and possibly flagging security measures). In another example, the correct verification code could be a number between 1 and 7 corresponding to the day of the week, followed by the printed verification code. In another example, the correct verification code is obtained by dividing the displayed verification code by 2. These and the following card-related examples can apply to conventional printed verification codes, which are inherently static, as well as one-time verification codes such as changing codes (similar to OTPs in electronic security cards) that are displayed electronically on the card or electromagnetically transmitted from the card.

In another version, the correct verification code is not directly related to the printed verification code, in which case the printed verification code may simply be viewed as a "decoy" to identify potential misuse of a card. In such cases, the correct verification code could be another number, such as 432 when 811 is printed on the back of the card. The correct verification code can be static or variable. Variable verification codes can include those produced by an algorithm, such as entering the date and hour as the verification code (e.g., on August 23 at 5:10 pm, the correct verification code be 8245), or entering the first three digits of the price and then the hour.

In another version, a password comprising entry of a verification code can also comprise a hidden action to distinguish a primary and secondary password. The hidden action, for example, may be an deliberate error in entering a verification code (or other user information). As preconfigured by the user or by an administrator on behalf of the user, full access for an online entry or for other selected environments or all settings, as determined by the user, may require a primary password comprising entry of the printed verification code coupled with a covert component comprising a deliberate error in entering information, followed by correction of the error. Thus, in one case, the user may deliberately enter an incorrect verification code in attempting to authorize a purchase, and only after receiving an error message and entering the verification code (which may be the printed verification code or other "correct" verification code) will the transaction be fully authorized (otherwise it may be feigned or limited, such as on hold pending further verification under a primary password later). The choice of an incorrect code to enter as part of an error-and-correction scheme may follow any of the principles previously described for distinguishing the printed verification code from a "correct" verification code. For example, in one version, the credit card account for the user may be configured to require that an incorrect verification code first be entered, resulting in an error or rejection of the attempted transaction, followed by entry of the correct verification code.

The principles of modifying a verification code to confirm user identity or to distinguish a primary and secondary password also apply to entry of other user information, such as the expiration date. Such a system may be especially useful for online transactions in which the embossed or printed expiration data cannot be seen. The user may modify the expiration date, according to any of the principles and examples set forth herein for the verification code, to distinguish a primary and secondary password comprising the expiration date (and possibly also comprising the verification code or other information).

Also within the scope of the present invention is a credit card security management system for user specification of security rules involving verification codes, expiration dates, or other information provided during credit card use to increase account security, wherein a primary password (in effect) can be specified involving a covert component, and/or wherein primary and secondary passwords can be distinguished with corresponding security rules to direct actions or security limitations responsive to the nature of the password provided. The credit card security management system can be provided with any known interface for allowing an authorized user to select security rules and procedures involving the credit card. Such an interface can be a graphical user interface for use with a computer display (e.g., a display provided on a home computer, a laptop, a personal data assistant, a cell phone, a computer terminal at a kiosk such as a kiosk at a bank or other secure setting, etc.) or an audible interface for allowing a user to specify security settings using voice commands or other audible signals. In the latter case, an automated telephony system may be provided allowing a user to select options to configure the credit card security system using a telephone, wherein input data can be entered using spoken commands coupled with a voice recognition system, or with touchtone signals, or other audible signals such as programmed musical tones from a handheld device adapted for rapidly conveying information through a telephone system. A telephone system may also be provided with a human operator receiving instructions from an authorized caller, wherein the operator then enters commands into a computer system to implement the instructions of the caller. Alternatively, written instructions may be received with proof of user identity (optionally requiring a phone call, physical visit from, electronic authentication, or other interaction with the user to confirm that the written instructions represent the intent of the authorized user) and then entered into a computerized system.

In one version, the credit card account for the user may comprise a graphical interface to allow a card owner to configure a database with security information about the user's account, wherein rules to distinguish primary and secondary passwords may be selected, and wherein actions to be taken in response to entry of secondary password may be selected. For example, a company such as Visa, MasterCard, or American express can provide a feature on their Websites linking to one or more pages for customizing rules involving the verification code of a user's credit card, or other security rules according to the present invention. The user interface may be hosted on the credit card company's respective site or may be provided through a third-party site that may be linked to or accessible via logging in to the credit card company's site (as discussed in reference to FIG. 17). Various security features, such as those described herein or known challenge and response systems, dynamic keyboard systems, or other user authentication systems may be in place to ensure that only authorized users are given access to a credit card security management system.

Example 3: Credit Card Use Under Duress

As a prophetic example, consider a user under duress such as a person being threatened by a companion with a hidden weapon, compelled to make a credit card transaction with an electronic pen to record the signature. In so doing, the user enters a particular series of strokes, dotes, or other symbols in addition to the normal signature, or enters a pre-arranged alternative signature that can be readily recognized by a machine reader to generate an alarm condition. The modified signature may include a flourish beneath the regular signature, a crossed "t" many times longer than normal, two dots to the side of the signature, and so forth. The system may be tested under non-duress conditions on actual electronic signature readers to ensure that it is operating properly. The credit card transaction is approved but a silent alarm or other request for assistance is provided. In one version, a security guard may stop the client leaving a retail environment on pretended suspicion of shoplifting to force separation of the user from a thief. This example can be applied to purchases made with cell phones, credit cards (in this case, instead of a special PIN as a secondary password, a particular set of marks in the signature field when signing with an electric pen may trigger the alarm or invoke other actions as configured beforehand by the user), and other device where an password or specific act for user authorization is required.

Example 4: A Home Safe

In this prophetic example, a thief enters a home and forces the owner to open a safe. What the thief does not know is that there are two combinations that work for the safe, a normal combination and a second combination that serves as a secondary password. The second combination opens the safe, but also automatically sends a signal to police alerting them that a robbery may be in progress. The second combination may be an easy-to-remember variation of the primary combination (e.g., add 5 to the first digit, or leave off the first digit of a four-number combination). While other aspects of opening the safe may be used to trigger the alarm condition, such as the length of time a button or lever is depressed, a particular advantage of the second combination serving as the secondary password and alarm trigger is that the alarm can be activated by anyone who uses the safe. Thus, if the owner is forced to disclose the combination but is not allowed to operate the safe, the thief dialing the combination will set off an alarm. Unlike security systems for expensive bank vaults, this could be provided as a low-cost benefit in safes for home use, using wireless or wired techniques to relay an alarm.

Example 5: A Brokerage Account

In this prophetic example, telephone access to a user's stock brokerage account is preconfigured to require an error in the initial attempt to enter a password as a hidden action preceding entry of the correct password. Thus, using a telephony system using voice recognition or touchpad entry of data, a user enters the account number and then an erroneous password that is recognized as serving as a validating factor, complying with previously established rules. The rules governing the erroneous password as a validating password may require that it be a permutation of the correct password, or a truncation, or have a random string of three characters replacing the first three characters of the correct password, or that it be a specific password substantially different from the correct password. Alternatively, it may follow a predetermined pattern, such as having four 9s in the password, or ending in "23", or having only odd digits, or having a length of 12 characters. In any case, entry of an incorrect password under the account name is compared with preconfigured rules for the account, and if the incorrect password fits the rules as a validating factor, then a flag is toggled in the data associated with the account such that upon a subsequent login attempt using the correct password (a primary or secondary password, as appropriate), the user can gain the desired level of access to the account based upon previous receipt of the validating factor, which can serve as a covert component of a primary or secondary password. The entry of the correct password after the receipt of the validating factor optionally can be required to be within a predetermined time span from the login activity with the rule-compliant incorrect password, otherwise the toggled flag is reset. (This example, of course, can be extended to other forms of accessing an account, such as logging in through a computer interface in which the rule-compliant incorrect password or hidden action may be entered using a CAPTCHA system, text-based password, spoken phrase, key stroke sequence, mouse movement, clicking behavior (location on a button or image where a mousedown, mouseup, or other event occurs), etc.

Example 6: Use of Physical Devices

In presenting a physical object associated with an account or otherwise providing identification to gain access to an account, physical location, information, or other permission, status, or benefit, the device may contain identification means to permit machine reading of an account number or other code. The code is then used to retrieve information from a database, or otherwise conveys or points to information that specifies a hidden action required from the user for full validation. For example, after scanning of the user's credit card at checkout in a retail store, a clerk is presented with a display on a user interface or with an audible message or other communication means indicating that hidden action is to be expected from the user. The specified hidden action may be, for example, holding the credit card upside down or sideways when it is presented to the clerk, or saying, "Is that necessary?" when the clerk asks to see the card, scratching one's chin, or winking at the clerk.

Example 7: Computerized System for Managing Hidden Actions

In this prophetic example, a use logs in from a secure setting to establish authentication rules. A table of hidden actions associated with various accounts is created, as well as secondary passwords, including emergency passwords. The table of hidden actions and passwords (which may be encrypted) is stored on a secure server. Information on this server is used to update account information on other server associated with the various accounts being protected. During subsequent account access, a secure computer system being accesses the stored information of hidden actions and/or passwords for the account to validate an attempt to access the account. The requirement of a hidden action is sent to a computer system or human operator, as appropriate, to verify that the hidden action takes place. For example, a credit card may be configured such that use of that credit card outside a specified geographical area (e.g., outside of the user's town, county, or state) triggers a requirements for a hidden action to validate the credit card. Thus, for a card configured to require higher security outside of Wisconsin, a hotel clerk in Florida may see information displayed on a computer monitor when the user attempts to check in indicating that the clerk should say, "I see you are from Wisconsin," at which point the user should reply "Yes, the cheesehead state." Failure to do so may indicate that the credit card has been stolen, which can lead to a prompt for further identification, a alert sent to the user or others, freezing of the credit card account, etc.

Also, failure to enter an expected hidden action or hidden password can result in a limit to charges on the card, such as a drop from an initial $10,000 credit line to no more than $100 per day billed against the card. Hidden actions associated with credit card, bank cards, or other machine-readable cards can include swiping the card a second time in a new direction, or pressing "no" shortly after swiping the card, etc.

Example 8: Phone System

In this prophetic example, a user calls into an operator-assisted phone system to access an account. In response to a username, the operator examines the associated computer file and sees that full access requires an predetermined error or other subtle action in providing a password or other personal information. For example, the operator's computer interface may indicate that in response to a request for the user's Social Security number, this user needs to cough after the third digit in his or her Social Security number. If the correct Social Security number is given without the cough, the instructions indicate that the operator is to report that the computer system is having difficulty and account activity is not possible at the moment. If the cough is properly placed, then full access to account information is provided.

In a related version of this example, a user establishes voice communication with an agent. The agent may be a machine, a human operator, a combination of humans and machines, etc. When the conversation begins, the user is allowed to indicate the security status. There may be an overt prompt, such as "Are you in a secure setting?" or an opportunity for a hidden action to indicate the security status. When there is a prompt for security status, three cases can be considered:
  (1) The user is in a secure setting and answers to indicate, "Yes, I am in a secure setting."
  (2) The user is in an insecure settings and answers to indicate, "No, I am not in a secure setting." In this case, the user may be prompted for a one-time password that cannot be reused if overheard, and that provides a limited or temporary degree of access to the system, optionally with the opportunity for the user to review and override requested transactions later after accessing the system again from a secure setting.
  (3) The user is in an insecure setting but does not wish to overtly indicate this. The user may answer, "Yes, I am in a secure setting," but it is not an accurate portrayal. In this case, there is a need to covertly indicate that the setting is insecure or to covertly impose restrictions in transactions. For example, the computer system being accessed by the telephone operator may indicate that a double cough after "setting" is a covert cue indicating that the setting in insecure and that duress may be a factor.

Alternatively, there may be two or more numbers that can be dialed, at least one of which is for secure settings and at least one of which is for insecure settings. Calling a number intended for insecure settings automatically indicates that the user is not in a secure setting or may be a fraudulent user or attempting to make an unauthorized transaction.

In one example, the user may wish to gain full access to an account in an insecure setting without using the primary password. The account may be preconfigured to permit a single use or limited number of uses (or use during a limited time period, or both) of a secondary password that can be "sacrificed" in an insecure setting because of restrictions associated with it and because it is also only the overt portion of a two-part password comprising a second covert portion. The covert portion can be a hidden action that must be provided in a prescribed manner to provide the desired level of access. For example, upon request of a the login information (typically a user ID and password), information for an insecure setting can be provided (a secondary user ID and/or password, which may but need not have restrictions on the number of times it can be used or the time period in which it can be used, including a freeze on the ability to use it again until a certain period of time has lapsed). In one example, after entering the user ID into a security system comprising computer and optionally human elements, the system can determine that the login information is for an insecure setting and that an additional covert cue is needed. The preconfigured data file associated with the user ID can indicate, for example, that a spoken secondary password needs to contain a corrected error after the character corresponding to the day of the week, with the first day, Sunday, corresponding to the first character of the password, Monday to the second, etc. Thus, if the user chooses to use the secondary password of, say, "4431541" on a Wednesday, the password would be spoken as "4432—no, I mean 1-541." With touchtone, keyboard, or PINpad entry (all of which can be considered within the general scope of "keypad" entry), the password can be entered in two tries: the first try being 4432541, conveying an error in the fourth digit, followed by the corrected secondary password 4431541. Additional hidden actions can be required, such as pressing a particular key twice after apparently having been granted access to the system, with failure to do so resulting in denied access, feigned access, or other actions, including an additional challenge and response to verify the identify of the user and the security status.

Example 9: Hotel Room Access

For hotel patrons or others given access to a secured room, enhanced security can be provided in terms of room access using principles of the present invention. In addition to the normally issued key cards (room cards) for access to their rooms, users may have the option of adding an extra level of security that requires a hidden action to validate user access. This may be provided to selected customers, such as frequent users of the hotel or members of a promotional program. The hidden action may involve acts executed with the key card or the door, such as entering and removing the key three times before turning the handle to enter the room, or pushing the handle up twice while the key card is inserted before removing the key card, or inserting the key upside down twice before inserting the key card properly, or rapidly moving the key card up and down two or three times before attempting to open the door. Any number of other actions may required before the lock is released and access is possible, based on what the door system or key card reader system can detect. The required hidden action for access can be established as part of the customer's profile with a hotel chain during a configuration process that may be done online or with the help of a human agent, or with a smart door that can record the user's preferred hidden action during a configuration phase of check-in. The user's selections for the hidden action are stored in memory that can be compared with the observed actions during attempted entry to the room. If the actions comply with the preconfigured hidden actions, then access can be granted. Failure to execute the hidden action may result in denial of access, or a security alert issued to security staff, an alert issued to the user of the room, etc. Access may be granted with an alert issued.

This system can also be extended to vehicle access or access or other hardware systems such as safes, homes, etc. In cases when a PIN pad or combination system is used to gain access to a room, vehicle, or other item, including secured entrances at airports, the device may comprise means to detect pressure applied or timing of actions, and use such sensing to receive additional information that may comprise required hidden information for access. For example, in entering a PIN of 99652 to gain access to a room with a push-button combination lock with pressure sensors for the buttons, there may be a required hidden action that the pressure on the last two digits must be substantially greater than the pressure on the first three. Failure to apply the correct relative pressures, in spite of entering the correct digits, could result in denied access, limited access (the immediately present door opens but a second door after that remains locked), a security alert, etc. Alternatively, instead of monitoring pressure, the entry of the combination may be sensitive to timing, and may require, for example, a two-second or longer pause after the second digit, with other digits entered rapidly. Combinations of pressure and timing may also be required. The combination entered may also be supplemented with a hidden action not directly related to the combination entry, such as interaction with a hidden array of load cells beneath the floor that can detect where the weight of the user is. The hidden action may require a shifting of weight during entry of the combination, or standing in a particular position (e.g., both feet off of a blue tile on the floor in front of the combination lock), etc.

Example 10: Dual Channel System

A dual-channel security system is proposed in which two or more channels of information transfer are provided in a single device such as a cell phone. The cell phone, for example, may be equipped with a tactile signal generator such as a vibratory mechanism that act can serve as a cue to a user that a security status input is requested in the form of a hidden action. This cue can be generated during a phone call with an account management service that employs a security system according to the present invention. In response to the vibration, the user in a secure setting is expected to take one of two or more recognizable actions to convey the security status. In a cell phone equipped with an accelerometer, inclinometer, or vibration-sensitive sensor, a physical motion may be used to provide input such as shaking the phone once or twice, turning the phone upside down, tilting the phone at a new angle (e.g., a 45 degree angle), etc., resulting in the inaudible and optionally digital transmission of information to wirelessly and inaudibly convey information. The signal by itself may have no meaning except when immediately preceded by the inaudible prompt for security status information. The user may also be expected to touch or tap (as with a stylus) a portion of a contact-sensitive screen, to press a button (not necessarily one of the keys—it could be to make a volume adjustment to increase or decrease volume), etc. The hidden action can serve as a covert component of a password. The absence of the specified hidden action, for example, or a significant error in executing the hidden action, can serve as a covert component of a secondary password to indicate that the status is insecure.

Example 11: Garage Door System

In another prophetic example, enhanced security is provided for those using wireless door openers to gain entry to a an area such as a garage or other vehicle storage area or building access area. For a homeowner with an electric garage door opener, for example, the wireless device used to open the garage door may be part of a security system that also requires a hidden action to cause the door to open. The hidden action may involve the manner in which a button on a garage door opener is pushed (i.e., the portable transmitter that sends a security code to the garage door opening device to authorize opening of the door). The hidden action may require pressing one or more buttons in a preconfigured manner (e.g., large button twice, small button once), or holding the opener in a particular manner (e.g., vertical orientation while squeezing the sides), etc., or executing actions not directly linked to the portable transmitter, which may require the use of additional sensors to detect the hidden action. The hidden action may involve revving the engine as the garage is approached, allowing a microphone to receive an acoustic signal matching a preconfigured pattern), or moving the car forward and then back before pressing the transmitter, wherein load sensors, motion sensors, or a video camera can detect the motion of the car, or activating windshield wipers, with video camera detection or other detection of such action, or opening one or more windows (in one case, opening both front windows could allow an IR beam to pass through the car to detect the act of opening the windows), or other actions. Failure to do so may result in an alert to security personal to come and manually verify the credentials of the person attempting access, or a denial of entry, or other preconfigured actions.

An electronic interface is provided to allow the user to configure the rules and password options for the opening system. This may include use of a computer with a cradle connected to the computer that can receive a memory device that can be used to transfer rules and/or password information from the computer to the garage door opening system via the device. Alternatively, the computer system may communicate directly with a smart door opening system to specify operational protocols including rules and/or passwords.

Example 12: Limited Use Credit Cards

In this prophetic example, a Limited Use PIN-Protected Account Card provides a secure card technology for credit cards, ATM, public transportation, or other purposes requiring a user account. The account card uses one or more of the security systems of the present invention to permit a child, relative, associate, or other person to take a credit card from the owner to be used for a specific purpose or within given constraints. The card normally requires entering a PIN for use by the owner, which may be a PIN for entry into an ATM or other device, or a verification code for remote transactions that differs from the printed verification code on the card. Secondary PINs (e.g., the printed verification code on the card, or a PIN given verbally or in writing to a user) are used when given to another person. These secondary PINs indicate that the person is not the owner and that there are predetermined to-be-determined constraints on use of the card. For example, use of the card with a secondary PIN may impose a limitation of purchase of gasoline only, or a maximum spending amount of $50 per day or per other fixed time period or for a particular location or class of locations. A configuration interface is provided that allows the card owner to specify what the secondary PINs are and the rules associated with their use. The configuration interface may communicate with a central security service, which in turn communicates with the credit card company and/or associated banks to implement the user-customized security rules.

Example 13: ATM Machine

In accessing an ATM machine, the user's account is configured to have a secondary password that can convey duress or other insecure situations, and a primary password with a covert component so that even a user who through covert observation has learned the primary password may be unable to fully access the account. The cover component can be a hidden action such as pressing a button twice when prompted with a "yes or no" query or when the "Enter" key needs to be pushed, or entering a cash amount with too many zeroes (e.g., an amount over the account withdrawal limit), such that the backspace/cancel button needs to be pushed to clear a zero from the amount before pushing enter. The hidden actions in this case may be separate from the entry of the overt portion of the primary password, with several intervening actions therebetween. Should a user attempt to withdraw money from the account using the overt primary password but failing to enter the hidden action, it is possible that the user is unauthorized. Several responses may be considered and optionally preconfigured for such cases, including any of the following, given by way of example only:
  (a) The account is temporarily inactivated until the user contacts a bank official in person or by phone to confirm that there has not been an attempt to compromise the account.
  (b) An emergency alert is initiated, possibly resulting in action by local authorities, automated emails and phone calls to the user and others, etc.
  (c) An error message is displayed indicating that there has been an error and that access is denied.
  (d) A fake error message is displayed indicating that there are insufficient funds available.
  (e) A fake error message is displayed indicating that the account has been frozen by a Federal agency and that all actions pertaining to the account are being monitored, or with some other message intended to discourage a would-be thief from avoid tampering with this account. In reality, the user can simply repeat the request and include the accidentally skipped hidden action to withdraw the desired funds or perform other transactions.

Example 14: Alternative Primary Password Structure

In this example, a primary password is used with a security system of the present invention, wherein the primary password consists of a two-password such as "47bat^man!" plus a random string such as a prefix or suffix. For example, any of the following could be validated as a primary password in this case: "^wild47bat^man!", "47bat^man!movie$$", or ( )2jYW"47bat^man!0_.!@". With the combination of a static "core" string and one or more variable "garbage" strings, a short memorized password can in affect become much longer, at least in appearance. Further, a rule can be in place requiring the garbage strings to be new (or at least not previously used within a set period of time prior to the current access attempt), such that if someone slavishly reproduces a previously entered password, an attempt at unauthorized access via a stolen password can immediately be detected.

With a garbage string added to a core password, the garbage string can be a convenient means of conveying additional information to either further validate a user via a hidden challenge and response, or to convey information about the security status. For example, a login system may display a number or other symbol that can be interpreted as a number, secretly referring to the number of garbage digits that should be added to the core password. Thus, in effect, a covert challenge and response system is provided with the response being entered through the selection of the number of garbage characters to add. Further, rules can be established for the garbage characters to convey information about security status. For example, entry of the garbage characters first followed by the core can convey a different status than entering the core password first, or than entering the core sandwiched between or interlaced with garbage characters. In one case, such as when the core is at the trailing end of the entered password, a low-security alert can be provoked, resulting in an appropriate response that is pro-configured or determined on the fly based on the information provided or other aspects of the context. Rules regarding the garbage characters may also specify that a garbage string begins with, say, "9," then low security should be assumed, where if the garbage string begins with, say, "X", then good security is available. These rules can be learned be or determined by the user in preconfiguration steps, such as in setting up an account.

Example 15: Hidden Action Responsive to Variable Content

In one prophetic example, a login page for a security system provides variable content such as stock quotes, displays of the date and time, news items, and weather information. A portion of the variable content has been preconfigured by the user to provide a challenge requiring a responsive hidden action to serve as a covert component of a primary password. For example, the last digit of a stock quote may be configured to serve as a challenge indicating how many times the cursor must be moved in loops around the Enter button on the page before clicking it, or may refer to which of ten graphical elements across the top of the page must be clicked on before clicking on the Enter button. Stock quotes or other variable content may also be configured to describe regions of the screen, specific elements on the screen, actions to be made relative to objects on the screen, number of additional characters to enter in a password, length of time to wait between two actions, which key should be pushed, where the mouse should be (e.g., over which graphical element) when the Enter key is pushed, etc., providing a covert challenge to which the authorized user can provide an accurate response. Failure to provide an accurate response can result in denial of service or in limited service. The entry of an otherwise correct overt component of password without the covert component can serve as a secondary password.

The use of hidden actions responsive to variable content may be helpful in providing a common portal from which multiple accounts can be accessed and controlled. Logging in to the portal with a primary password comprising one or more challenge and response scenarios, optionally including hidden actions responsive to variable content, can provide a high level of security to authenticate a user. Access to additional accounts from the portal, after login, can also comprise hidden actions responsive to variable content to further validate the user. The ability to configure security rules or otherwise access various accounts having a relationship with the portal may be provided by clicking on icons or other hyperlinks, wherein login information is automatically provided by the portal to simplify account management. In one version, clicking on the hyperlink takes the user to a screen that appears to provide access to the account, but the access is actually feigned or limited until the user provides a hidden action responsive to variable content, thus adding a covert component of a primary password to the information automatically provided by the portal in logging in another account from the portal.

Remarks

The order in which steps are executed in any method of the present invention described herein is not essential, unless otherwise indicated. Embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions, and the instructions may be provided or stored on a computer-readable medium, in a carrier wave that can be interpreted and executed by an electronic device, in computer memory, or in other forms of machine executable instructions. The machine-executable instructions may be organized into one or more machine-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

While the foregoing description makes reference to particular illustrative embodiments, these examples should not be construed as limitations. The inventive system, methods, and devices can be adapted for many other uses not explicitly listed above, and can be modified in numerous ways within the spirit of the present disclosure. Thus, the present invention is not limited to the disclosed embodiments, but is to be accorded the widest scope consistent with the claims below.

I claim:

1. A security management system providing controlled access to a secure electronic account accessible via an electronic account access interface in communication with an account server, the security management system comprising:

a computerized administrative interface having security rules for governing account access via the electronic account access interface, the security rules being stored in a memory in communication with a processor operably associated with the account server, wherein the computerized administrative interface is programmed to receive commands from an authorized user to customize the security rules to provide different levels of account access responsive to entry via the electronic account access interface of user credentials, the user credentials comprising a user ID and either a primary password or a secondary password selected from one or more secondary passwords, wherein the computerized administrative interface provides selections in the security rules for both a primary password and one or more secondary passwords, and wherein the computerized administrative interface provides a selection for a covert cue method to serve as a component of a primary password.

2. The security management system of claim 1, wherein the covert cue method includes entry of a predetermined covert cue in a challenge and response system.

3. The security management system of claim 2, wherein the computerized administrative interface is programmed such that the selection of a covert cue to serve as a component of a primary password also includes a selection to modify the security rules to specify that the entry of a predetermined response other than the predetermined covert cue in the challenge and response system will be treated as a component of a secondary password providing one of limited or feigned access to the secure electronic account.

4. The security management system of claim 1, wherein the covert cue method includes entry of an alphanumeric string differing in a predetermined manner from a printed code requested by the account access interface.

5. The security management system of claim 4, wherein the printed code is on a portable object associated with the secure electronic account.

6. The security management system of claim 4, wherein the printed code is on a card selected from a credit card, a bank card and an identification card.

7. The security management system of claim 1, wherein the covert cue method includes entering a modified version of a visibly displayed one-time password from a security device.

8. The security management system of claim 1, wherein the computerized administrative interface provides a selection for specifying an algorithm to recognize a covert cue that qualifies as a component of a primary password.

9. The security management system of claim 8, wherein the covert cue that qualifies as a component of a primary password varies with at least one of time or date.

10. The security management system of claim 8, wherein the covert cue is entered in a CAPTCHA system.

11. The security management system of claim 8, wherein the algorithm involves transformation of no more than two alphanumeric characters in the user credentials to create a covert cue that qualifies as a component of a primary password.

12. The security management system of claim 1, wherein the computerized administrative interface is programmed to provide the authorized user with a Limited Use Credential from an authorizing agency to use in accessing the secure electronic account or associated services, the Limited Use Credential taking the place of a permanent unique credential from the authorizing agency.

13. The security management system of claim 1, wherein the covert cue method involves altering at least one alphanumerical character of a printed verification code.

14. The security management system of claim 1, wherein the computerized administrative interface provides for selection of a covert cue according to an algorithm that varies with at least one of time and geographical location.

15. The security management system of claim 1, wherein the secure electronic account comprises a payment system associated with a wireless phone.

16. The security management system of claim 1, wherein the different levels of account access comprise providing degraded electronic performance of the electronic account access interface in response to a secondary password, wherein the degraded electronic performance simulates a slowdown in the account server to hinder activity by a user with respect to the electronic account.

17. The security management system of claim 1, wherein at least one of the primary password and the secondary password comprises an overt component and a covert component.

18. The security management system of claim 1, further comprising:
a reverse challenge and response system to allow the user to verify that the security management system is a trusted security system,
wherein the challenge and response system in response to an incorrect password entered by the user provides an error message and a customized confirmation clue according to previously configured security rules, whereby the user can verify through the confirmation clue that the security management system is a trusted security system.

19. The security management system of claim 1, wherein the security rules specify criteria for a primary password that vary with time according to a predetermined algorithm.

20. The security management system of claim 1, wherein the computerized administrative interface is provided by a first party and the secure electronic account is provided by a second party, the first party and the second party each having an independent relationship with an external authorizing agency, wherein the security management system is configured to accept a Limited Use Credential as part of the user credentials, the Limited Use Credential being accepted in place of a permanent credential from the external authorizing agency.

21. The security management system of claim 1, wherein the electronic account access interface comprises a challenge and response system in which a challenge is presented requesting an alphanumeric input having one or more characters, wherein the security rules specify that entry of the requested alphanumeric input will be recognized as a component of a secondary password, and that a modified form of the requested alphanumeric input will be recognized as at least part of the covert cue method, in which at least one character of the requested alphanumeric input has been changed according to predetermined instructions specified by the security rules.

* * * * *